(12) United States Patent
Nelson

(10) Patent No.: US 8,715,421 B2
(45) Date of Patent: May 6, 2014

(54) WIPER WITH SCRUBBER ASSEMBLY THAT IS RAISED AND LOWERED

(75) Inventor: James Q. Nelson, Salt Lake City, UT (US)

(73) Assignee: Nelson and Nelson Enterprises, LLC, Salt Lake City, UT (US)

(*) Notice: Subject to any disclaimer, the term of this patent is extended or adjusted under 35 U.S.C. 154(b) by 197 days.

(21) Appl. No.: 13/351,976

(22) Filed: Jan. 17, 2012

(65) Prior Publication Data

US 2013/0180544 A1    Jul. 18, 2013

(51) Int. Cl.
*B08B 1/00*    (2006.01)

(52) U.S. Cl.
USPC ............ 134/6; 134/42; 15/250.4; 15/250.41; 15/250.361; 15/250.01; 15/250.02; 15/250.03; 15/250.04; 15/250.23

(58) Field of Classification Search
CPC .......... B08B 1/00; B08B 1/002; B08B 1/005; B60S 1/00; B60S 1/02; B60S 1/04; B60S 2001/38321; B60S 1/482; B60S 1/3801; B60S 1/38
USPC ............................ 15/250.4, 250.41, 250.361, 15/250.01–250.04, 250.23; 134/6, 42
See application file for complete search history.

(56) References Cited

U.S. PATENT DOCUMENTS

| | | | |
|---|---|---|---|
| 1,197,763 | A | 9/1916 | Plotnitzky |
| 2,289,545 | A | 4/1940 | Horton et al. |
| 2,648,087 | A | 8/1953 | Kiker, jr. |
| 2,712,148 | A | 7/1955 | Cheshire |
| 2,719,994 | A | 10/1955 | Dorsey |
| 2,784,437 | A | 3/1957 | Haas |
| 2,787,803 | A | 4/1957 | Cella |
| 3,080,592 | A | 3/1963 | Hassage |
| 3,422,484 | A | 1/1969 | Carpenter |
| 3,790,083 | A | 2/1974 | Redifer |
| 3,887,955 | A | 6/1975 | Jarvinen |
| 3,892,006 | A | 7/1975 | Yasumoto |
| 3,906,583 | A | 9/1975 | Murphy |

(Continued)

FOREIGN PATENT DOCUMENTS

| | | |
|---|---|---|
| DE | 2700527 | 9/1978 |
| DE | 3934460 | 8/1990 |

(Continued)

OTHER PUBLICATIONS

U.S. Appl. No. 12/248,732, Mar. 31, 2011, Office Action.

(Continued)

*Primary Examiner* — Bibi Carrillo
(74) *Attorney, Agent, or Firm* — Workman Nydegger

(57) ABSTRACT

A windshield wiper includes a wiper assembly, a scrubber assembly, and an engaging assembly. The wiper assembly includes a wiper support structure and a wiper blade attached to the wiper support structure. The scrubber assembly includes a scrubber support structure, an elongated scrubber element and a motor. The scrubber element is movably attached to the scrubber support structure and extends between a first end and a spaced apart second end along a central longitudinal axis. The motor is mounted to the scrubber support structure and is engaged with the scrubber element to reciprocally move the scrubber element along the central longitudinal axis. The engaging assembly is coupled with the wiper assembly and the scrubber assembly and is configured to raise and lower the scrubber assembly with respect to the wiper assembly. Also, an automated method of using a windshield wiper.

15 Claims, 34 Drawing Sheets

(56) References Cited

U.S. PATENT DOCUMENTS

| | | |
|---|---|---|
| 3,939,524 A | 2/1976 | Knights |
| 4,019,216 A | 4/1977 | Priesemuth |
| D257,339 S | 10/1980 | Ellinwood |
| 4,342,129 A | 8/1982 | Thompson |
| 4,567,621 A | 2/1986 | Alley, Jr. |
| 4,611,364 A | 9/1986 | Grubner |
| 4,649,593 A | 3/1987 | Gilliam, III et al. |
| 4,719,661 A | 1/1988 | Hanselmann |
| 4,745,653 A | 5/1988 | Bliznak |
| 4,754,517 A | 7/1988 | Aldous |
| 5,166,587 A * | 11/1992 | Smart .................. 318/444 |
| 5,168,595 A | 12/1992 | Naylor |
| 5,235,720 A | 8/1993 | Kinder |
| 5,255,407 A | 10/1993 | Yang |
| 5,301,384 A | 4/1994 | Perry |
| 5,323,508 A | 6/1994 | Sheldrake |
| D349,082 S | 7/1994 | Brabender |
| 5,406,672 A | 4/1995 | Hipke |
| 5,442,834 A | 8/1995 | Perry |
| 5,463,790 A | 11/1995 | Chiou et al. |
| 5,497,528 A | 3/1996 | Wu |
| 5,634,841 A | 6/1997 | Gold |
| 5,778,483 A | 7/1998 | Dawson |
| 5,802,661 A | 9/1998 | Miller et al. |
| 5,979,010 A * | 11/1999 | Dockery et al. .......... 15/250.04 |
| 5,983,440 A | 11/1999 | Remington |
| 5,996,168 A | 12/1999 | Watkins |
| 6,279,193 B1 | 8/2001 | Cheng |
| 6,505,378 B1 | 1/2003 | Squires |
| D469,731 S | 2/2003 | Geer |
| 6,536,069 B1 | 3/2003 | Neag et al. |
| 6,687,946 B2 | 2/2004 | Reddoch |
| 6,748,621 B1 | 6/2004 | Root |
| 6,763,546 B1 | 7/2004 | Smith |
| 7,111,355 B1 | 9/2006 | Sorensen |
| 7,140,064 B1 | 11/2006 | Woolstenhulme |
| 7,302,732 B2 | 12/2007 | Alley |
| 7,334,288 B2 | 2/2008 | Rudd et al. |
| 7,461,429 B2 | 12/2008 | Huang |
| 7,503,091 B2 | 3/2009 | White et al. |
| 7,574,769 B1 | 8/2009 | Nemeth |
| 7,707,681 B1 | 5/2010 | Cabak |
| 7,827,652 B2 | 11/2010 | Yang et al. |
| 7,836,541 B2 | 11/2010 | Harita et al. |
| 7,845,044 B2 | 12/2010 | Park |
| 7,900,312 B2 | 3/2011 | Chaise |
| 8,028,368 B2 | 10/2011 | Chien |
| 8,032,976 B2 | 10/2011 | Nelson |
| 8,104,137 B2 | 1/2012 | An et al. |
| 8,181,308 B2 | 5/2012 | Kwon et al. |
| 8,261,405 B2 | 9/2012 | Kim et al. |
| 8,375,504 B2 | 2/2013 | Kim et al. |
| 8,413,291 B2 | 4/2013 | Wu |
| 8,505,153 B2 | 8/2013 | Nelson |
| 2002/0073493 A1 | 6/2002 | Walton |
| 2002/0092114 A1 | 7/2002 | Reddoch |
| 2002/0129458 A1 | 9/2002 | Hsieh |
| 2003/0141622 A1 | 7/2003 | Winters |
| 2003/0229960 A1 | 12/2003 | Stouder |
| 2004/0177465 A1 | 9/2004 | Steffee |
| 2006/0000044 A1 | 1/2006 | de La Pena Razquin |
| 2006/0064840 A1 | 3/2006 | Park |
| 2006/0282972 A1 | 12/2006 | Huang |
| 2007/0017055 A1 | 1/2007 | Simko |
| 2007/0022558 A1 | 2/2007 | Petkov |
| 2007/0044259 A1 | 3/2007 | White et al. |
| 2007/0094831 A1 | 5/2007 | Huguley |
| 2007/0266516 A1 | 11/2007 | Cakmak |
| 2008/0034528 A1 | 2/2008 | Bourke |
| 2008/0034531 A1 | 2/2008 | Beaver |
| 2008/0276402 A1 | 11/2008 | Chaise |
| 2010/0139027 A1 | 6/2010 | An et al. |
| 2010/0242204 A1 | 9/2010 | Chien |
| 2011/0197381 A1 | 8/2011 | Nelson |
| 2011/0197387 A1 | 8/2011 | Nelson |
| 2013/0180074 A1 | 7/2013 | Nelson |
| 2013/0180544 A1 | 7/2013 | Nelson |

FOREIGN PATENT DOCUMENTS

| | | |
|---|---|---|
| DE | 102008042706 | 4/2010 |
| EP | 1034992 | 9/2000 |
| GB | 2047524 | * 12/1980 |
| GB | 2201585 | 9/1988 |
| GB | 2267816 | 12/1993 |
| JP | 9-76881 | 3/1997 |
| WO | 83/02756 | 8/1983 |
| WO | 89/00396 | 1/1989 |
| WO | 93/09979 | 5/1993 |

OTHER PUBLICATIONS

U.S. Appl. No. 12/248,732, filed Aug. 1, 2011, Notice of Allowance.
U.S. Appl. No. 13/044,132, filed Jun. 16, 2011, Office Action.
U.S. Appl. No. 12/705,265, filed Jun. 13, 2012, Office Action.
U.S. Appl. No. 12/705,265, Nov. 28, 2012, Final Office Action.
U.S. Appl. No. 12/705,265, filed Jun. 2, 2013, Notice of Allowance.
U.S. Appl. No. 12/705,221, filed Aug. 30, 2013, Office Action.
U.S. Appl. No. 12/705,265, filed Jul. 1, 2013, Notice of Allowance.
U.S. Appl. No. 13/351,912, filed Jun. 28, 2013, Office Action.

* cited by examiner

WIPER WITH SCRUBBER ASSEMBLY THAT IS RAISED AND LOWERED

CROSS-REFERENCE TO RELATED APPLICATIONS

Not Applicable.

BACKGROUND OF THE INVENTION

1. The Field of the Invention

The present invention relates to wipers having a wiper blade and an additional movable scrubber element attached thereto.

2. The Relevant Technology

Safety is a critical issue in today's world of fast vehicles. In particular, an operator of an automobile must be able to clearly view everything happening around the vehicle and make split-second decisions based on what he sees. In particular, the automobile operator must be able to clearly see through the windshield to view the road ahead. If the view through the windshield becomes blocked or even obscured for whatever reason, it can impact the driver's view and create a dangerous situation.

To help provide clear vision through the windshield, almost all motor vehicles sold today come with a standard set of windshield wipers. Conventional windshield wipers typically include a wiper blade which is attached to a wiper support structure designed so as to cause the wiper blade to remain in contact with the windshield surface. The wiper support structure is attached to a wiper arm that attaches the windshield wiper to the motor vehicle. During use, the wiper arm causes the wiper support structure to move back and forth across the windshield.

A conventional windshield wiper blade is approximately 0.030 inches (0.7 mm) in width and is composed of smooth rubber held in contact with the automotive windshield by spring tension. It was specifically designed to squeegee fluid from the windshield's surface, thereby providing clear vision through the windshield during wet weather. To accomplish this function, the material of the conventional wiper blade is designed to be soft, flexible and smooth.

As noted above, if the view through the windshield becomes blocked or even obscured for any reason, it can impact the driver's view and create a dangerous situation. This can occur, for example, when the windshield wiper stops working or when the wiper blades become worn and lose their ability to squeegee, as discussed above. This can also occur when something hits the windshield that the windshield wiper is not able to remove by the squeegee action, even when the windshield is wet. The latter can occur, for example, when a car passes through a swarm of insects that splatter all over the windshield. This can also occur when ice builds up on the windshield, such as when the vehicle has been left outside for an extended period of time in the winter.

Due to the compound curvatures that vary over most windshields, the wiper support structure is not enough, of itself, to cause the wiper blade to remain in contact along its entire length with the windshield as the wiper support structure moves across the windshield. To combat this inherent flaw, the wiper blade is made of a flexible material, such as rubber or the like, and is very thin. The flexibility and thinness of the wiper blade allow the wiper blade to follow the contours of the windshield, making up for the inherent flaw of the wiper support structure. As a result, the wiper blade squeegees the windshield as the wiper blade passes over the windshield, thereby removing liquid, such as rain, away from the forward field of view of the driver. The squeegee action generally causes other light debris, such as dust, leaves, or light dirt, to also be removed with the water. Removal of liquid and debris, of course, is necessary so the driver can see the road ahead while driving during inclement weather.

However, due to its design, the conventional windshield wiper has a number of inherent flaws. For example, the squeegee action is not particularly useful in removing debris when the windshield is dry. Squeegees are designed to remove liquids. When the surface is dry, the squeegee may simply flex or pass over the top of debris and can make matters worse by smearing the debris or causing streaks to occur. For this reason, conventional automobiles include fluid that can be sprayed onto the windshield. When the windshield becomes dirty while there is no precipitation, the driver can activate a washer pump that causes washer fluid to flow through a fluid line and spray onto the windshield to provide liquefaction of the debris to help the windshield wipers squeegee the debris. This works well on certain debris, such as, e.g., dust, light dirt, and light road salt.

Even with liquefaction, however, certain types of debris may still be non-removable from the windshield. For example, insect residue, bird droppings and tree sap, among other things, can adhere to the windshield almost instantaneously and may not be removable by the squeegee action of the windshield wiper.

To allow the squeegee action to take place, the wiper blade must be flexible and thin. As a result, the width of the portion of the wiper blade that contacts the windshield is very small, as noted above. This means that for every sweep of the conventional windshield wiper over the windshield, the wiper blade will contact any one spot of the windshield only very briefly and with little force. As a result, debris that has adhered to the windshield, such as, e.g., insect residue, bird droppings, and sap, will remain on the windshield even after repeated attempts to remove the debris.

In fact, in many cases, repeated attempts to remove the debris by the conventional windshield wiper has a detrimental effect on the clarity of the windshield. The foreign matter tends to be smeared over a larger surface of the windshield and further foreign matter will accumulate over the period of time the vehicle is in motion, further degrading the clarity of the windshield resulting in reduced visual clues to the operator.

A further complication of cleaning a vehicle's windshield while the vehicle is in motion is the variety of the organic compounds and the viscosity of the organic compounds striking the windshield. For example, insects that are comprised of chitin, which is only partially dissolved in the windshield cleaning cycle, results in a smearing/spreading effect as the windshield wiper attempts to squeegee the partially dissolved viscous insect material from the windshield. The spreading effect caused by the squeegee action of the windshield wiper reduces the thickness of the insect material. This, coupled with the airflow over the vehicle, will evaporate any liquid located within the insect that is capable of evaporation, resulting in a dry and hard organic residue. This effect begins at the point of windshield impact in a line consistent with the travel of the windshield wiper, and is commonly referred to as smearing.

A further consideration is that by design, a conventional windshield wiper blade tends to squeegee all of the applied cleaning solution from the surface of the windshield on the first wiper sweep after activation. The time available for the cleaning solution to work is equivalent to approximately 0.75 second. The removal of the cleaning solution from the windshield is further facilitated by the airflow moving over the windshield caused by the motion of the vehicle through the atmosphere. At interstate speeds, a substantial portion of the cleaning solution may fail to strike the windshield and is carried away or evaporated by the high-speed airflow.

Finally, exacerbating the problems discussed above, due to the small width of the wiper blade, the blade can wear out quickly and/or lose its smooth edge so as to lose its ability to squeegee, thereby causing the blade to not be effective in removing water, let alone debris, from the windshield.

Various attempts have been made to design windshield wipers that will solve the above problems. For example, windshield wipers have been designed that include scrubbing pads meant to passively scrub the windshield as the windshield wiper passes back and forth over the windshield. The scrubbing pads are supposed to help remove the foreign matter from the windshield, but do not appear to be enough to remove all of the foreign matter. Applicant notes that he is aware of no commercially available wiper that even has a scrubbing pad.

As a result, many drivers operate their vehicles even when the windshields of those vehicles are at least partially obstructed from debris on the windshield that the wipers are not able to remove. This severely impacts the safety of the drivers.

Another problem with conventional wipers is that they are not designed to remove ice buildup on the windshield, thereby causing further safety problems in cold weather. As a result, drivers will either drive with ice obscuring their vision or start their vehicles and turn on the heater so the windshield can be heated to melt the snow and ice from the windshield before driving. For the ice to melt, the engine must first warm up so that waste heat from the engine can then be directed toward the inside surface of the windshield. After another significant amount of time, the ice melts due to the warmth of the windshield. As a result, the vehicle engine must idle for a significant amount of time to remove the built up ice. This wastes fuel and releases a significant amount of exhaust products, such as, e.g., carbon dioxide into the atmosphere.

In fact, according to some estimates, each year in the United States during inclement or cold weather hundreds of millions of tons of carbon dioxide are released into the atmosphere by internal combustion engines that are idling for the purpose of "warming up". This widely accepted practice is detrimental to engine longevity and harmful to the environment.

Accordingly, what is needed are windshield wipers that alleviate one or more of the above problems.

BRIEF DESCRIPTION OF THE DRAWINGS

Various embodiments of the present invention will now be discussed with reference to the appended drawings. It is appreciated that these drawings depict only typical embodiments of the invention and are therefore not to be considered limiting of its scope. In the drawings, like numerals designate like elements. Furthermore, multiple instances of an element may each include separate letters appended to the element number. For example two instances of a particular element "20" may be labeled as "20a" and "20b". In that case, the element label may be used without an appended letter (e.g., "20") to generally refer to every instance of the element; while the element label will include an appended letter (e.g., "20a") to refer to a specific instance of the element.

DETAILED DESCRIPTION OF THE PREFERRED EMBODIMENTS

As used in the specification and appended claims, directional terms, such as "top," "bottom," "left," "right," "up," "down," "upper," "lower," "proximal," "distal" and the like are used herein solely to indicate relative directions and are not otherwise intended to limit the scope of the invention or claims.

Figure 1:
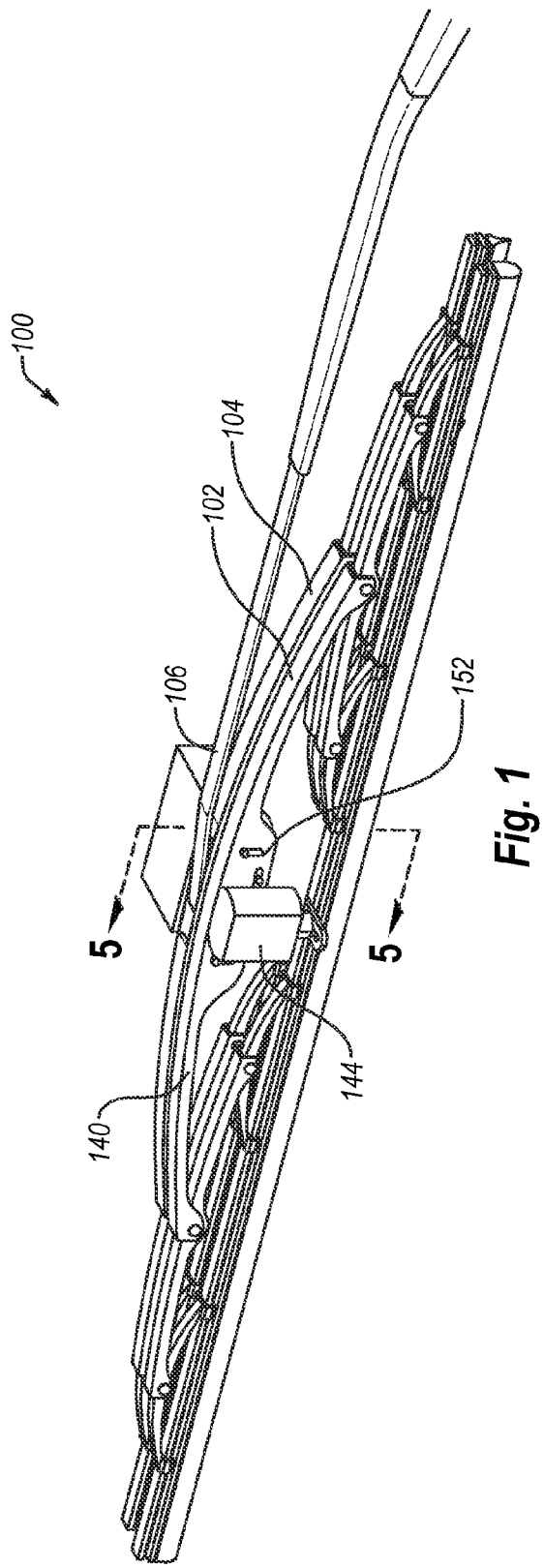
FIG. 1 is a front perspective view of a windshield wiper according to one embodiment of the present invention.
Figure 2:
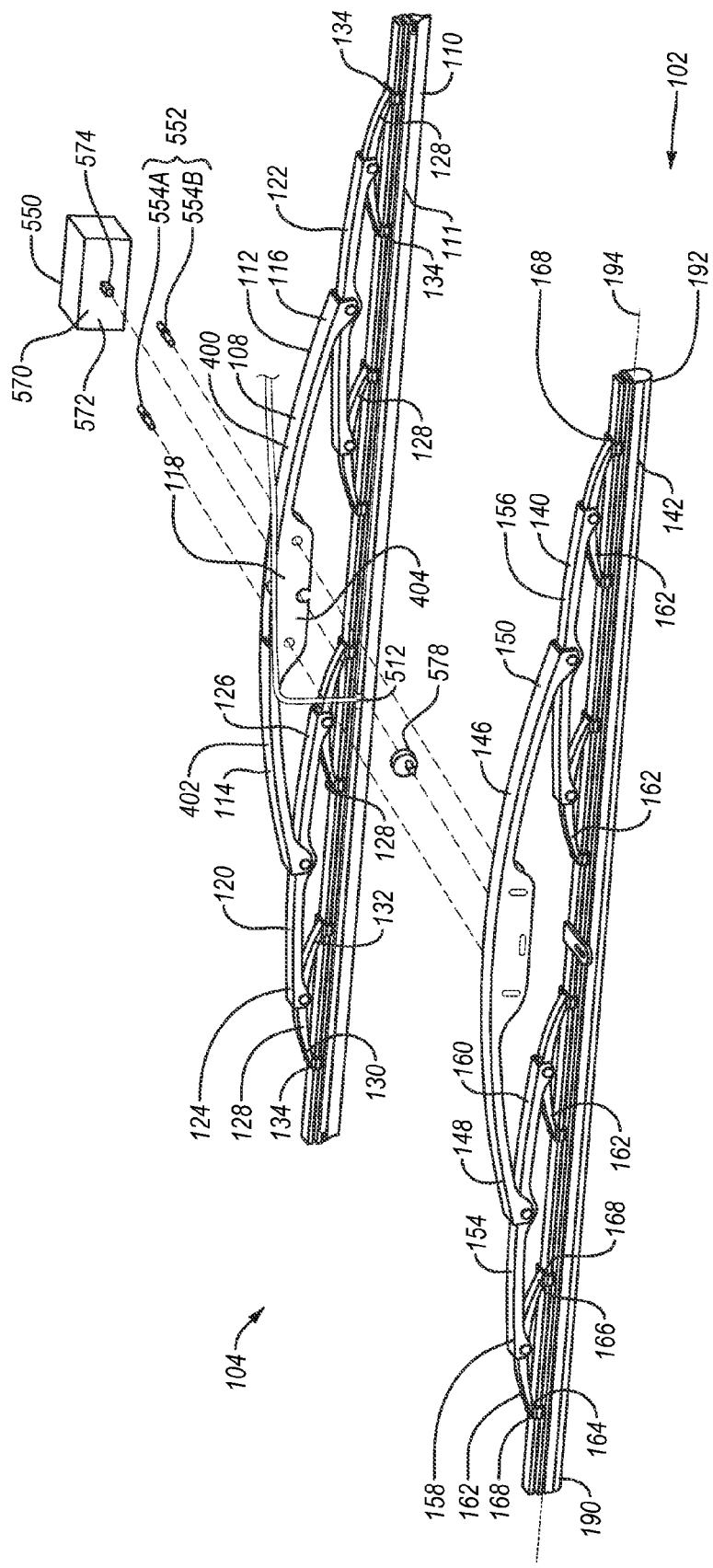
FIG. 2 is an exploded perspective view of the windshield wiper shown in FIG. 1 with the motor removed for clarity.

Depicted in FIGS. 1 and 2 is one embodiment of a windshield wiper 100 incorporating features of the present invention. Windshield wiper 100 comprises a scrubber assembly 102 movably attached to a wiper assembly 104 of the type generally known within the art and configured to attach to a wiper arm 106 of a vehicle. Windshield wiper 100 further comprises an engaging assembly 107 that raises and lowers scrubber assembly 102 with respect to wiper assembly 104 to facilitate one or the other assembly contacting the windshield.

As shown in the exploded view of FIG. 2, wiper assembly 104 comprises a wiper support structure 108 having a wiper blade 110 attached thereto. An optional washer fluid line 111 can also be included in wiper assembly 104. Wiper support structure 108 has an articulated main cross arm 112 extending between a first end 114 and a spaced apart second end 116.

Figure 3A:
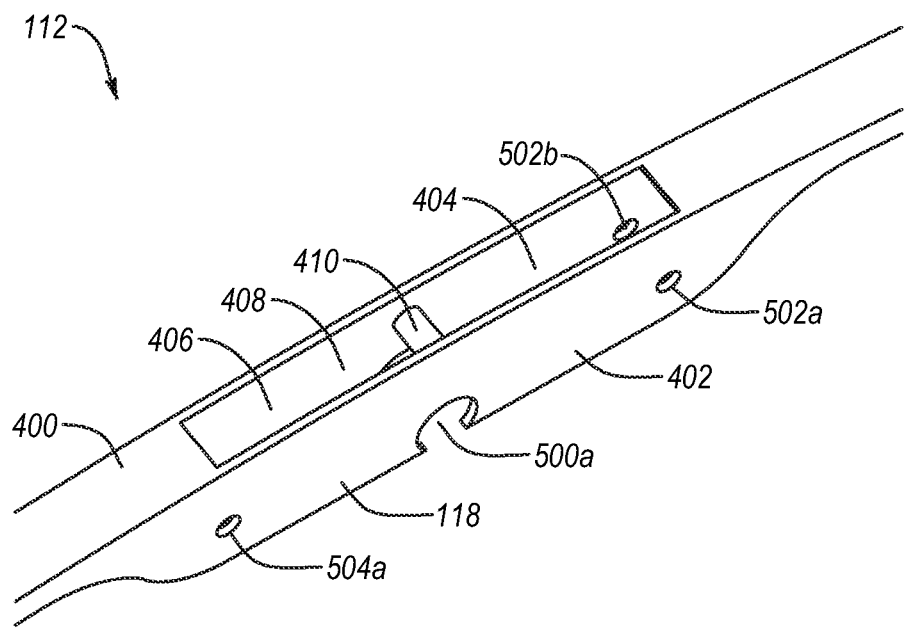
FIGS. 3A and 3B are close up perspective views of a portion of the main cross arm of the wiper assembly shown in FIG. 1.
Figure 3B:
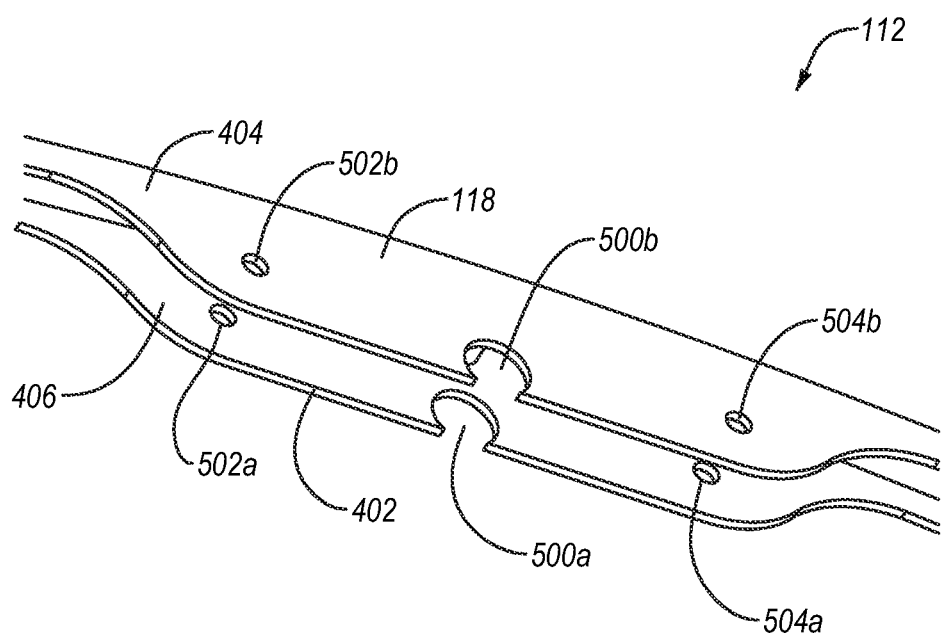

Turning to FIGS. 3A and 3B, main cross arm 112 comprises a top wall 400 with a first side wall 402 and an opposing second side wall 404 extending down from either side of top wall 400 so as to form a channel 406 therebetween. As shown in FIG. 2, top wall 400, first side wall 402, and second side wall 404 all extend between first and second ends 114 and 116. Returning to FIGS. 3A and 3B, main cross arm 112 includes a center section 118 wherein the side walls 402 and 404 extend further down than at the rest of main cross arm 112. A portion of top wall 400 is omitted at center section 118 so as to form a mouth 408 that permits open access to channel 406. A cylindrical cross member 410 extends between first and second side walls 402 and 404 within channel 406 in center section 118. As is known in the art, cross member 410 is designed to receive an end of wiper arm 106, thereby securing wiper assembly 104 to wiper arm 106. Cross member 410 can be attached to or integrally formed with main cross arm 112.

Side walls 402 and 404 include apertures extending therethrough that are used in conjunction with elements of the engaging assembly to assist in raising and lowering the scrubber assembly with respect to the wiper assembly, as discussed in more detail below. For example, as shown in FIG. 3A, a primary aperture 500a and a pair of secondary apertures 502a and 504a are formed on sidewall 402. Primary aperture 500a is positioned at about the longitudinal midpoint of main cross arm 112 below cross member 410, although other locations on main cross arm 112 can also be used. Primary aperture 500a is depicted as having an open bottom portion although this is not required; in some embodiments, primary aperture 500a is completely bounded by an encircling sidewall.

Secondary apertures 502a and 502b are formed in sidewall 402 on either lateral side of primary aperture 500a. Primary aperture 500a and secondary apertures 502a and 502b are configured to allow engaging elements to be received therein while substantially preventing lateral movement (i.e., movement orthogonal to the plane of side wall 402) of those elements. As such, primary and secondary apertures 500a, 502a, 504a can be circular, oval, square, or any other shape that will allow them to perform their intended functions, as discussed below.

As shown in FIG. 3B, primary aperture 500a has a corresponding primary aperture 500b formed on side wall 404 and each secondary aperture 502a, 504b has a corresponding secondary aperture 502b, 504b formed on side wall 404. The corresponding aperture pairs 500, 502, and 504 are aligned across channel 406 so as to allow elements of engaging assembly 107 (FIG. 1) to pass therethrough, as discussed below.

Returning to FIG. 2, wiper support structure 108 also includes a pair of primary cross arms 120, 122, flexibly attached to first and second ends 114, 116 of main cross arm 112. Each primary cross arm 120, 122 extends between a first end 124 and a spaced apart second end 126. A plurality of secondary cross arms 128 are also included, each extending from a first end 130 to a spaced apart second end 132. Each of the secondary cross arms 128 is positioned at a different one of the first and second ends 124 and 126 of each primary cross arm 120 and 122. As such, there are four secondary cross arms 128 in the depicted embodiment. A mounting bracket 134 is formed at each end 130, 132 of each secondary cross arm 128. Wiper support structure 108 is configured such that all of the mounting brackets 134 are aligned. Other configurations of wiper support structure 108, as are known in the art, can also be used. All or portions of scrubber support structure 140 can be made of metal, plastic, or other substantially rigid materials. In some embodiments, scrubber support structure is made of plastic using an injection molding process. In some embodiments, a conventional wiper support structure is used with the apertures 500, 502, and 504 being cut out therefrom. In other embodiments, the apertures are formed in the wiper support structure during the manufacturing process.

Wiper blade 110 is a thin, typically rubber squeegee-type blade that is received within mounting brackets 134 so as to face the windshield of a vehicle and contact the windshield when the wiper assembly 104 has been installed. Virtually any wiper blade known in the art can be used with the present invention.

If used, washer fluid line 111 can extend longitudinally along wiper support structure 108 so as to be positioned just above the windshield. In one embodiment, washer fluid line is attached to the outside surface of mounting brackets 134. In other embodiments, washer fluid line is attached to one or more of the cross arms. Other attachment points may also be possible. In another embodiment, washer fluid line 111 fluidly couples with the scrubber element so that a portion 136 of the washer fluid line is positioned or formed within the scrubber element (see FIG. 5C).

A plurality of apertures 510 (FIGS. 5A and 5C) are formed in washer fluid line 111 to allow the washer fluid to pass therethrough and be deposited onto the windshield when the vehicle's washer pump is activated. If a portion of washer fluid line 111 is positioned or formed within the scrubber element, the washer fluid will pass through the scrubber element before being deposited on the windshield. As discussed below, when washer fluid line 111 is adjacent to the windshield and adjacent or within the scrubbing element, less fluid is required to clean the windshield than with conventional systems.

One or more couplers, such as coupler 512, can be used to couple different sections of washer fluid line 111 together, as is known in the art, and/or to couple fluid line 111 with the scrubber element. The line 111 extends up to wiper arm 106 to be coupled with an existing vehicle fluid line positioned thereon, or to further extend along wiper arm 106 into the vehicle.

Having washer fluid line 111 just above the windshield or within the scrubber element and using a plurality of apertures therein yield a number of benefits. For example, because fluid line 111 is just above the windshield or within the scrubber element, the fluid that flows through apertures 510 or through the scrubber element is deposited immediately onto the windshield. Very little of the fluid is lost due to evaporation or errant spray. Furthermore, as discussed below, the scrubber member material can be selected that requires even less fluid to clean the windshield. The scrubber member can be comprised of a material that partially absorbs the washer fluid, either as the washer fluid passes therethrough or after the washer fluid has been deposited on the windshield. As such, in those embodiments, a small amount of washer fluid is all that is needed to dampen the scrubber member, and then the damp scrubber member can clean the windshield without any additional washer fluid.

In contrast, conventional washer lines are typically positioned further away from the windshield and must spray the washer fluid from only one or two sprayers. As a result, much of the washer fluid is lost due to evaporation or errant spray or to the air flow at high speeds, which can cause the washer fluid that is in contact with the windshield to separate from the windshield. In many cases much of the fluid simply flies over the top of the vehicle. Either way, much of the spray is lost to the environment. Most washer fluids contain methyl alcohol, a poisonous chemical known to be harmful to the environment. Methyl alcohol cannot be made nonpoisonous. As a result, any amount of washer fluid that can be saved is beneficial to the environment. As such, the washer fluid line design in the present application is beneficial to the environment over conventional designs.

Continuing with FIG. 2, scrubber assembly 102 comprises a scrubber support structure 140, a scrubber element 142 movably attached to scrubber support structure 140, and a motor 144 (shown in FIG. 1) mounted to scrubber support structure 140.

Figure 4A:
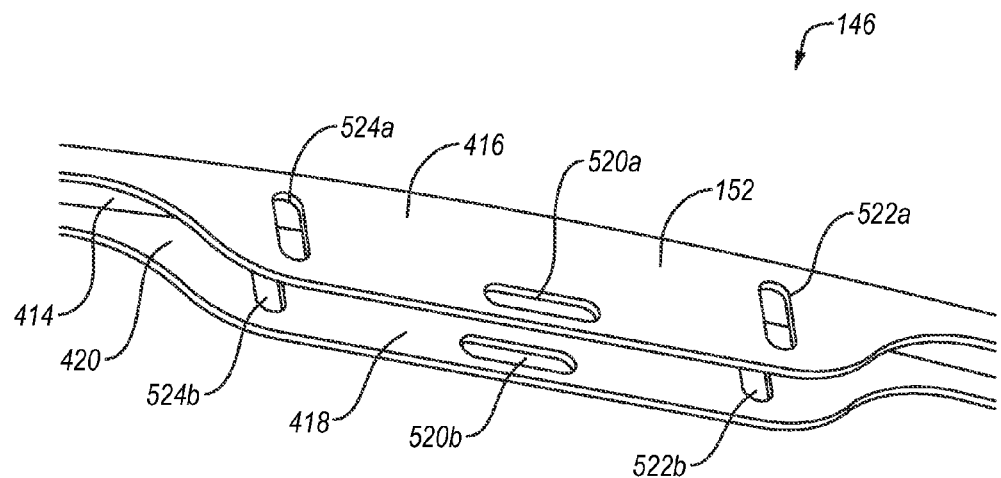
FIG. 4A is a close up perspective view of a portion of the main cross arm of the scrubber assembly shown in FIG. 1.

Scrubber support structure 140 is similar in many respects to wiper support structure 108 discussed previously. For example, scrubber support structure 140 has an articulated main cross arm 146 extending between a first end 148 and a spaced apart second end 150. Turning to FIG. 4A, similar to main cross arm 112, main cross arm 146 comprises a top wall 414 with a first side wall 416 and an opposing second side wall 418 extending down from either side of top wall 414 so as to form a channel 420 therebetween. Also similar to main cross arm 112, main cross arm 146 also includes a center section 152 wherein the side walls 416 and 418 extend further down than at the rest of main cross arm 146.

Side walls 416 and 418 of main cross arm 146 include apertures extending therethrough that generally correspond to the apertures formed in main cross arm 112. The apertures are used in conjunction with the engaging assembly elements to assist in raising and lowering scrubber assembly 102 with respect to wiper assembly 104. However, unlike the apertures of main cross arm 112, the apertures formed in main cross arm 146 are configured to allow lateral movement of the engaging assembly elements during the raising and lowering of scrubber assembly 102. As such, the apertures formed in side walls 416 and 418 are generally formed as elongated slots.

For example, as shown in FIG. 4A, a primary slot 520a and a pair of secondary slots 522a and 524a are formed in side wall 416 of main cross arm 146 to generally correspond to the locations of primary apertures 500 and secondary apertures 502 and 504 of main cross arm 112. As such, primary slot 520a is positioned at about the longitudinal midpoint of main cross arm 146 and secondary slots 522a and 524a are positioned on either lateral side of primary slot 520a. If primary aperture 500a and/or secondary apertures 502a, 504a are positioned elsewhere on main cross arm 112, primary and secondary slots 520a, 522a, 524a can be positioned on main cross arm 146 to correspond thereto.

Figure 4B:
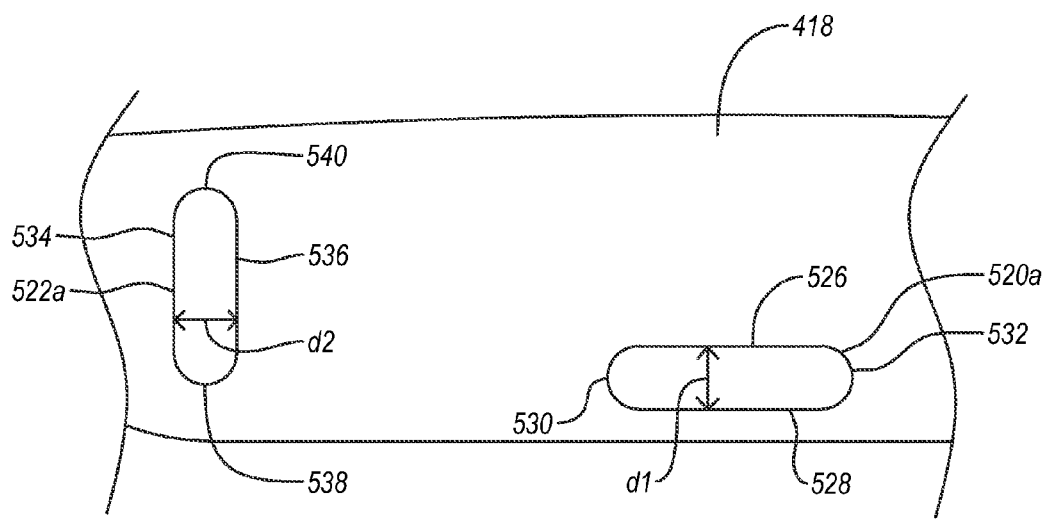
FIG. 4B is a close up front view of a portion of the main cross arm of the scrubber assembly shown in FIG. 4A.

As shown in the close up view of FIG. 4B, primary slot 520a is bounded by opposing side walls 526 and 528 that extend substantially horizontally between semicircular end walls at a first end 530 and a spaced apart second end 532. The opposing side walls are separated by a distance d1.

In contrast, each secondary slot 522a, 524a is bounded by opposing side walls 534 and 536 that extend substantially vertically between semicircular end walls at a bottom end 538 and a spaced apart top end 540. As such, secondary slots 522a, 524a are substantially orthogonal to primary slot 520a. The distance d2 between sidewalls 534 and 536 is substantially the same as the diameter of secondary apertures 502 and 504 in main cross arm 112.

Returning to FIG. 2, scrubber support structure 140 also includes a pair of primary cross arms 154, 156, flexibly attached to first and second ends 148, 150 of cross arm 146. Each primary cross arm 154, 156 extends between a first end 158 and a spaced apart second end 160. A plurality of secondary cross arms 162 are also included, each extending from a first end 164 to a spaced apart second end 166. Each secondary cross arm 162 is positioned at a different one of the first and second ends 158 and 160 of each primary cross arm 154 and 156. As such, there are four secondary cross arms 162 in the depicted embodiment. A mounting bracket 168 is formed at each end 164, 166 of each secondary cross arm 162. Similar to wiper support structure 108, scrubber support structure 140 is configured such that all of the mounting brackets 168 are aligned.

Figure 5A:
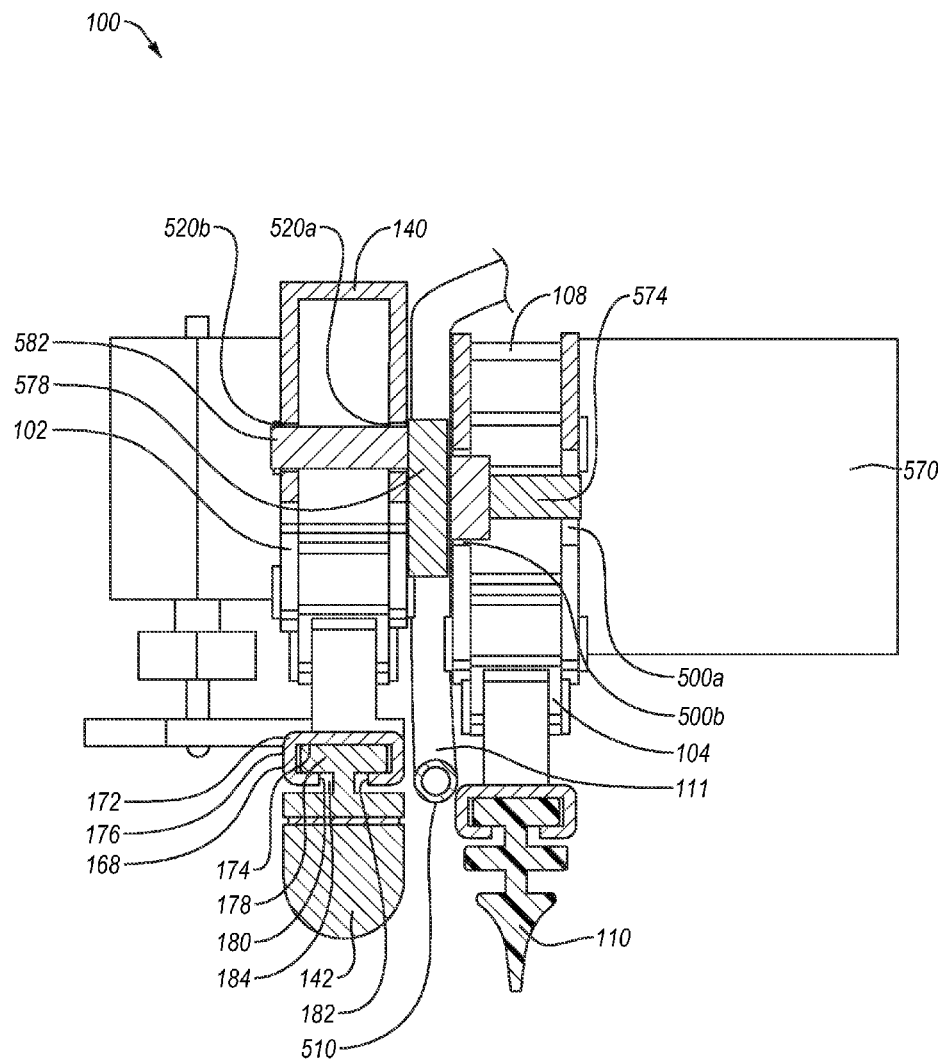
FIGS. 5A and 5B are cross sectional end views of the windshield wiper shown in FIG. 1 taken along the section line 5-5, with the scrubber assembly in a raised position and a lowered position, respectively.
Figure 5B:
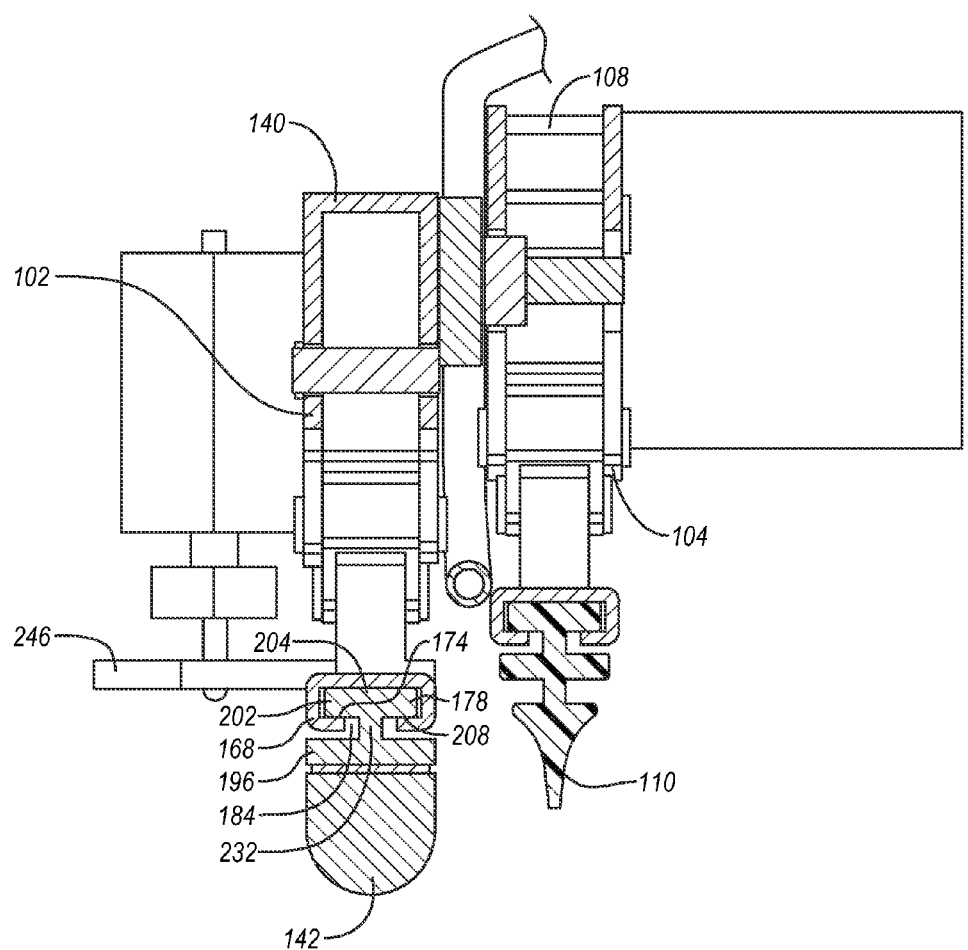
Figure 5C:
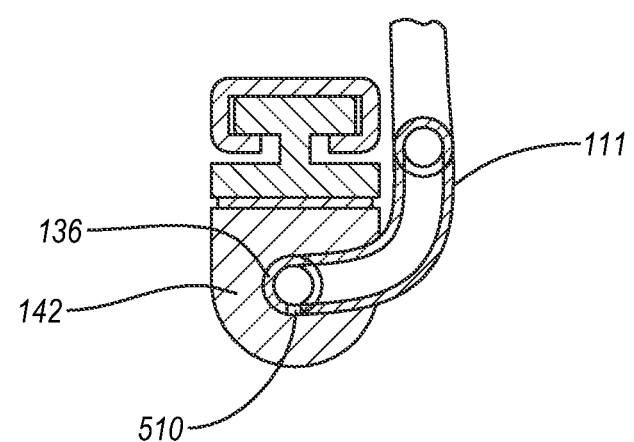
FIG. 5C is a cross sectional view of a portion of FIG. 5A, showing an embodiment where the wiper fluid line couples with the scrubber element.

FIGS. 5A and 5B show a cross sectional side view of windshield wiper 100 with the scrubber assembly in a raised position and a lowered position, respectively. Turning to FIG. 5A, each mounting bracket 168 is substantially "c" shaped, with the opening of the "c" facing downward and away from the cross members and cross arms. As such, each mounting bracket 168 comprises an encircling sidewall 172 having an inner surface 174 and an opposing outer surface 176. The inner surface 174 bounds a passageway 178 that extends laterally through the mounting bracket 168. Opposing end faces 180, 182 extend between the inner and outer surfaces 174 and 176 of the sidewall 172 so as to bound an opening 184 that extends through the wall 172 thereby giving mounting bracket 168 its "c" shape. The end faces 180, 182 face each other across opening 184. Mounting brackets 168 are aligned so that scrubber element 142 can be received within passageways 178 of all of the mounting brackets 168, as discussed below and shown in FIG. 2. Furthermore, brackets 168 are positioned so that the openings 184 of all of the mounting brackets 168 face the same direction.

Other configurations of scrubber support structure 140, including mounting brackets 168 as are known in the art, can also be used. All or portions of scrubber support structure 140 can be made of metal, plastic, or other substantially rigid materials. In some embodiments, scrubber support structure is made of plastic using an injection molding process. In some embodiments, a conventional wiper support structure is used as the scrubber support structure.

Returning to FIG. 2, engaging assembly 107 includes an actuator 550 used to raise and lower scrubber assembly 102 and linkages 552 that couple with scrubber assembly 102 and cause scrubber assembly to move substantially vertically with respect to wiper assembly 104.

In one embodiment, linkages 552 comprise one or more connector pins 554 configured to slidably couple scrubber assembly 102 and wiper assembly 102. Each connector pin 554 is configured to be received within aligned secondary apertures 502, 504 on main cross arm 112 and corresponding secondary slots 522, 524 on main cross arm 146.

Figure 6A:
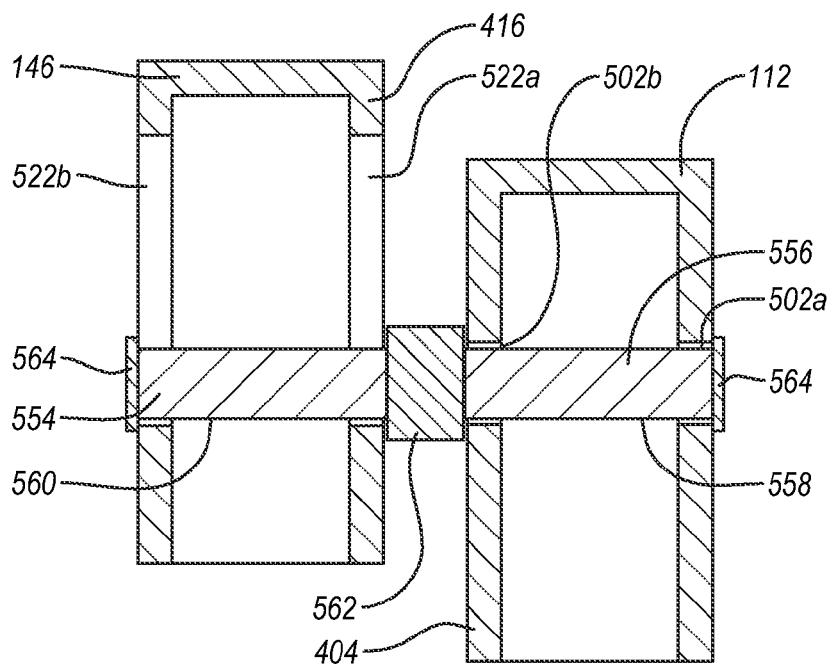
FIGS. 6A and 6B are cross sectional end views showing the positioning of the linkages when the scrubber assembly is in the raised and lowered positions, respectively.
Figure 6B:
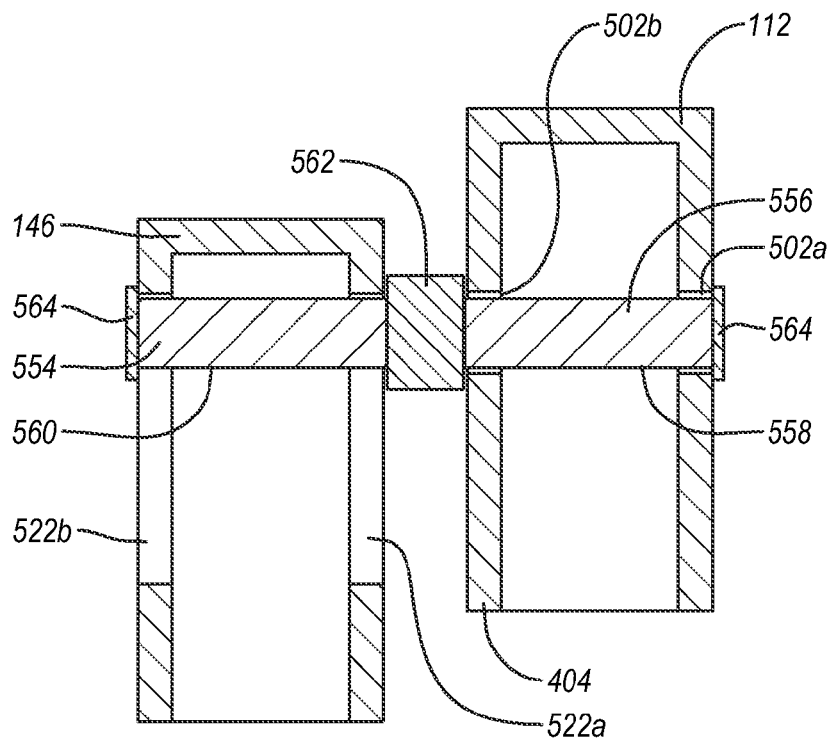

Turning to FIGS. 6A and 6B, each connector pin 554 has a main body 556 that is substantially cylindrical and extends longitudinally between a first end 558 and a spaced apart second end 560. The diameter of the main body 556 is equal to or slightly less than the diameter of the secondary apertures 502, 504 disposed on main cross arm 112 and the width d2 of secondary slots 522, 524 of main cross arm 146. As a result, main body 556 can be inserted within secondary apertures 502, 504 and secondary slots 522, 524 and is able to slide vertically along each slot 522 or 524 when main cross arm 112 is moved vertically. If desired, a central portion 562 of each main body 556 can be sized to have a larger diameter than the rest of the main body 556. By doing so, the opposite ends of central portion 562 will prevent side walls 404 and 416 of main cross arms 112 and 146 from extending over central portion 562. This ensures a desired separation between the cross arms 112 and 146. In addition, oversized end caps 564 can be positioned at each end 558 and 560 of main body 556 to secure connector pin within the corresponding apertures and slots. Each connector pin 554 can be rigidly attached to main cross arm 112 within each aperture 502, 504, or rotatably mounted therein.

Returning to FIG. 2, actuator 550 can comprise a standard dc type servo 570, as is known in the art, that is mounted to wiper support structure 108. For example, by way of example only, in one embodiment, servo 570 operates on a 7.2 V power source and has a 90 degree movement. To use such a servo with a typical 12-volt automobile battery, a simple voltage regulator circuit can be used. Other voltage and movement values are also possible. The servo should have enough force to lift the scrubber assembly and wiper assembly off the windshield. As such, in one embodiment, the servo can provide a force of between about 40 ounce inches and about 55 ounce inches. In another embodiment, the servo can provide a force of greater than 55 ounce inches. Other force values are also possible.

In the depicted embodiment, servo 570 is mounted to the first side wall 402 of center section 118 of wiper support structure 108 so as to be on the opposite side of wiper support structure 108 than scrubber support structure 140. In other embodiments, all or a portion of servo 570 can be mounted within wiper support structure 108, such as, e.g., within channel 406 (FIG. 3A). Servo 570 can be mounted to wiper support structure 108 by adhesive, mounting screws, fasteners, or other permanent or removable mounting means known in the art.

Figure 7A:
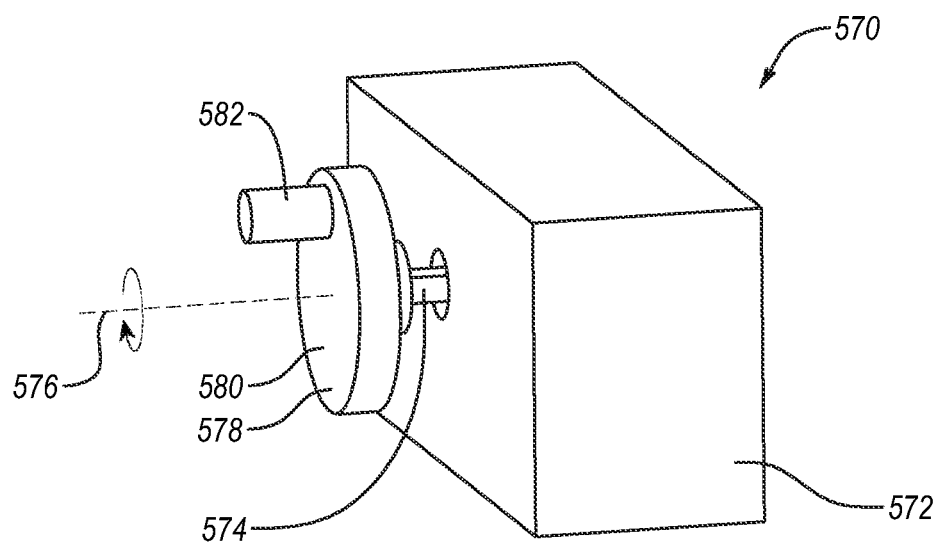
FIGS. 7A and 7B are perspective views of the servo and attached crank showing the positioning of the crank when the scrubber assembly is in the raised and lowered positions, respectively.
Figure 7B:
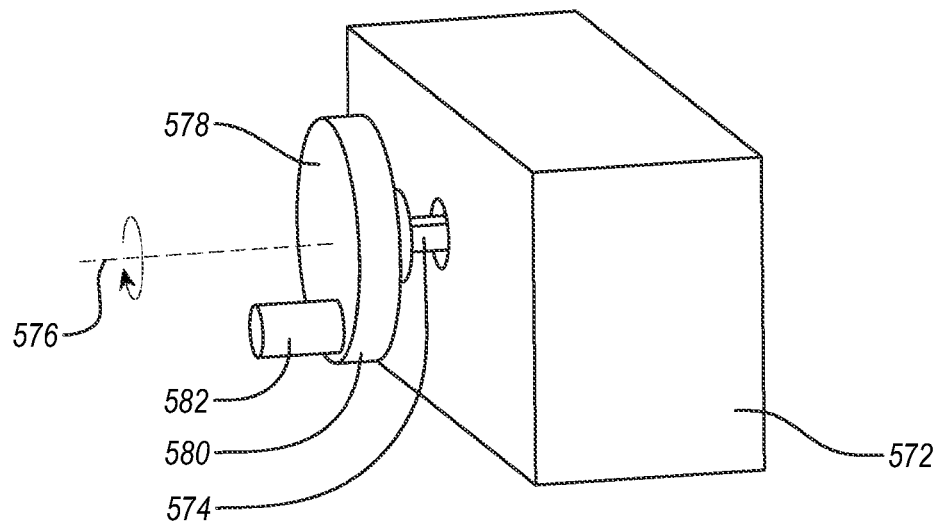

Turning to FIGS. 7A and 7B, servo 570 includes a motor 572 and a shaft 574 extending therefrom. Shaft 574 rotates about a central rotational axis 576 when the servo motor 572 is energized. Servo motor 572 is configured to be energized by the automobile battery or a portable power source, such as a battery pack, as discussed below. Other power sources may alternatively be used.

Returning to FIG. 2, servo 570 is positioned on wiper support structure 108 so as to engage with scrubber support structure 140 and thereby move scrubber assembly 102 with respect to wiper assembly 104. In so doing, servo 570 causes scrubber assembly 102 to raise and lower with respect to the windshield.

To do this, servo 570 is coupled with scrubber support structure 140 through a crank 578 that converts rotational motion of servo shaft 574 to linear motion of scrubber assembly 102. Crank 578 can be attached to servo shaft 574 or can be integrally formed therewith. Turning again to FIGS. 7A and 7B, crank 578 includes a main body 580 configured to attach to servo shaft 574 and rotate therewith about rotational axis 576. A crank pin 582 extends away from main body 580 generally parallel to rotational axis 576 but is positioned on main body 580 at a position offset from rotational axis 576. Due to its offset from rotational axis 576, crank pin 582 travels in a circle around rotational axis 576 as servo shaft 574 is rotated. Crank pin 582 can be attached to main body 580 of crank 578 or can be integrally formed therewith. Furthermore, crank pin 582 can be cylindrically shaped, as in the depicted embodiment, or have any other desirable shape. Crank pin 582 has a diameter that is less than the width d1 between side walls 526 and 528 that bound primary slot 520 (FIG. 4B).

As shown in FIGS. 5A and 5B, servo 570 is positioned on wiper support structure 108 so that servo shaft 574 extends through primary apertures 500 toward scrubber support structure 140. Crank 578 is positioned between wiper support structure 108 and scrubber support structure 140 such that crank pin 582 extends through primary slots 520 on scrubber support structure 140. By so doing, rotation of servo shaft 574 can cause scrubber assembly 102 to be raised and lowered with respect to the windshield as hereafter described with reference to FIGS. 8A-8C.

Figure 8A:
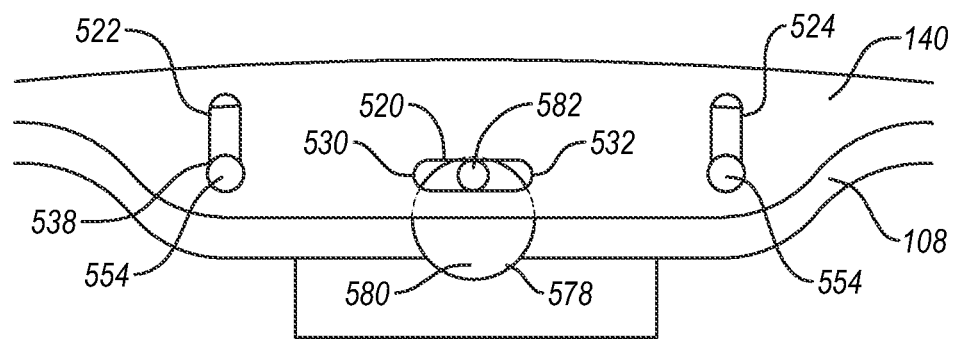
FIGS. 8A-8C are front views showing how the scrubber assembly raises and lowers as a direct result of the rotary movement of the servo shaft.
Figure 8B:
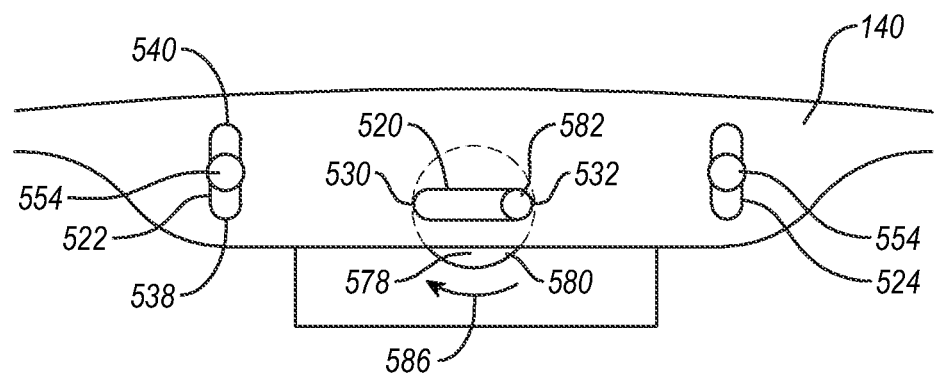
Figure 8C:
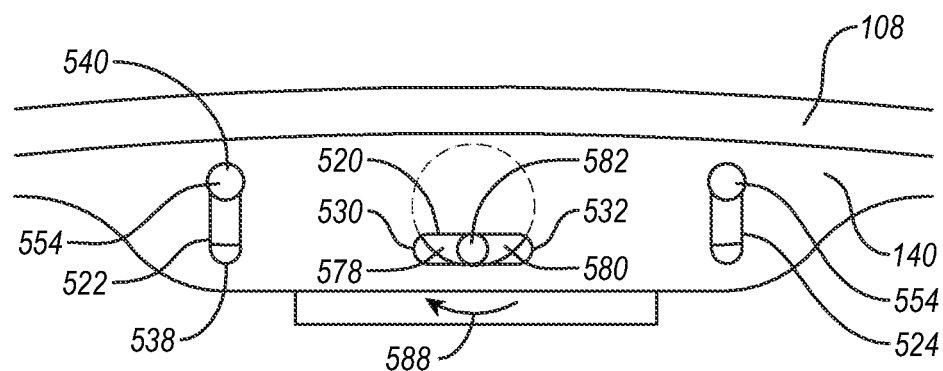

As described above, as servo shaft 574 rotates, crank pin 582 moves in a circle. As shown in FIGS. 8A-8C, this causes crank pin 582 to move back and forth between first and second ends 530 and 532 of primary slots 520 while scrubber support structure 140 moves up and down (i.e., orthogonal to the windshield). The portions of crank 578 that are positioned behind scrubber support structure 140 are depicted in dashed lines to show the relative position of crank pin 582 thereto.

FIG. 8A depicts the relative positions of wiper support structure 108 and scrubber support structure 140 when scrubber assembly 102 is in the raised position shown in FIG. 5A. As depicted, in the raised position crank 578 is disposed so that crank pin 582 is at its topmost position on crank main body 580. In this position, crank pin 582 is disposed about midway between first and second ends 530 and 532 of primary slots 520, connector pins 554 are positioned at or near the bottom ends 538 of secondary slots 522 and 524, and scrubber support structure 140 is positioned vertically higher than wiper support structure 108. As a result, as shown in FIG. 5A, scrubber assembly 102 is positioned higher than wiper assembly 104 allowing wiper blade 110 to contact the windshield while scrubber element 142 is raised above and thus does not contact the windshield.

As crank 578 is rotated ninety degrees clockwise by servo 570, as denoted by arrow 586, crank pin 582 moves arcuately downward to the intermediate position shown in FIG. 8B. As a result of the rotation, crank pin 582 moves to the second end 532 of primary slots 520 and causes scrubber support structure 140 to move downward with respect to its position in FIG. 8A. As scrubber support structure 140 moves downward, connector pins 554, which are attached to wiper support structure 108 and slidably received within secondary slots 522 and 524, guide the vertical movement of scrubber support structure 140. As a result, scrubber support structure 140 moves downward until connector pins 554 become disposed about midway between top and bottom ends 540 and 538 of secondary slots 522 and 524. Because of the interaction between connector pins 554 and secondary slots 522 and 524, scrubber assembly 102 moves substantially linearly vertically with respect to wiper assembly 104 as crank pin 582 moves horizontally within primary slots 520. When crank pin 582 is positioned near either end 530, 532 of primary slots 520, scrubber support structure 140 is at about the same vertical position as wiper support structure 108, as depicted in FIG. 8B. As a result, wiper blade 110 and scrubber element 142 may both contact the windshield when scrubber assembly 102 is at this intermediate position.

As crank 578 is further rotated clockwise another ninety degrees by servo 570, as denoted by arrow 588, crank pin 582 moves arcuately to the position shown in FIG. 8C, which depicts the relative positions of wiper support structure 108 and scrubber support structure 140 when scrubber assembly 102 is in the lowered position. In this position, crank pin 582 moves to the bottommost position on crank main body 580, which causes crank pin 582 to move back to about midway between first and second ends 530 and 532 of primary slots 520. This also causes scrubber support structure 140 to move further downward with respect to its position in FIG. 8B, with connecting pins 554 continuing to guide the vertical movement of scrubber support structure 140. As a result, scrubber support structure 140 moves downward with respect to wiper support structure 108 until connecting pins 554 become disposed at or near the top ends 540 of secondary slots 522 and 524 in scrubber support structure 140. Thus, scrubber support structure 140 becomes vertically lower than wiper support structure 108. As a result, as shown in FIG. 5B, scrubber assembly 102 is positioned lower than wiper assembly 104 allowing scrubber element 142 to contact the windshield while wiper blade 110 is effectively raised above and thus does not contact the windshield.

To return scrubber assembly 102 back to the raised position, crank 578 is simply rotated by servo 570 until crank pin 582 is once again at the topmost position of crank main body 580, as shown in FIG. 8A. This can be accomplished by rotating crank 578 clockwise or counterclockwise 180 degrees from the lowered position.

Although crank 578 is discussed above as rotating in a clockwise direction when moving scrubber assembly 102 from the raised to the lowered positions, it is appreciated that scrubber assembly 102 can also be moved from the raised to the lowered positions by rotating crank 578 in a counterclockwise direction. Furthermore, although connecting pins 554 are discussed above as being attached to wiper assembly 104 so as to be movable therewith and being received within corresponding slots 522 and 524 formed in scrubber assembly 102, it is appreciated that the opposite configuration can alternatively be used. That is, connecting pins 554 can alternatively be movable with scrubber assembly 102 and corresponding slots 522 and 524 can be formed in wiper assembly 104. Furthermore, connecting pins 554 can be rotatably or rigidly attached to either wiper assembly 104 or scrubber assembly 102 or integrally formed therewith. In some embodiments, connecting pins 554 are freely movable within secondary apertures 502 and 504.

Figure 9A:
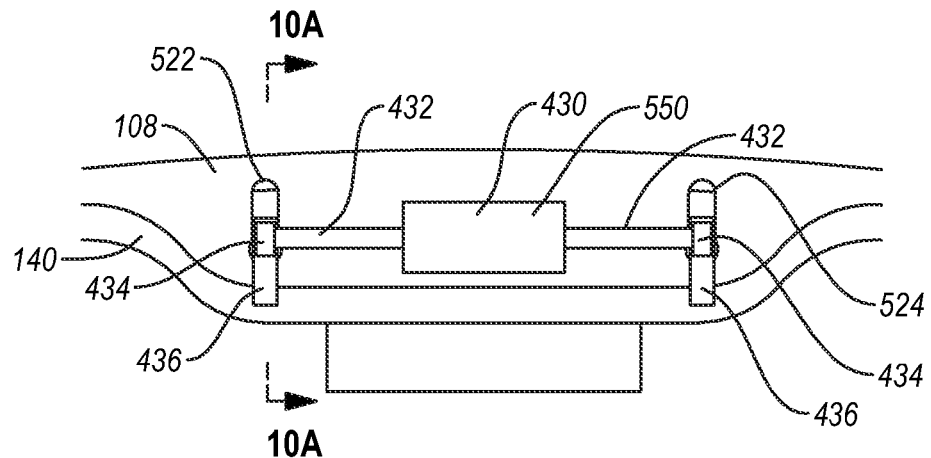
FIGS. 9A-9C are back views showing how the scrubber assembly raises and lowers using a rack and pinion mechanism.
Figure 9B:
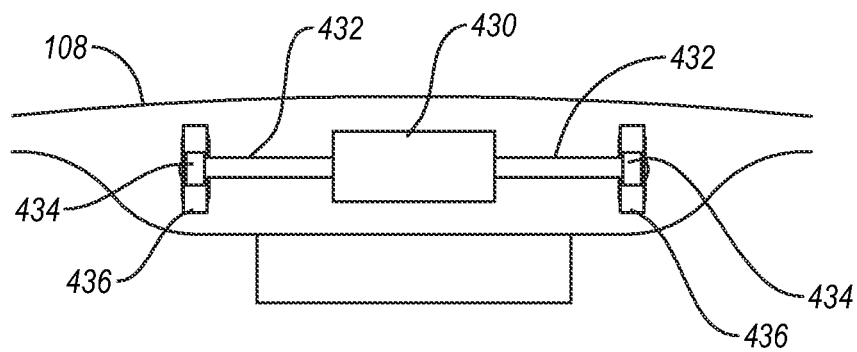
Figure 9C:
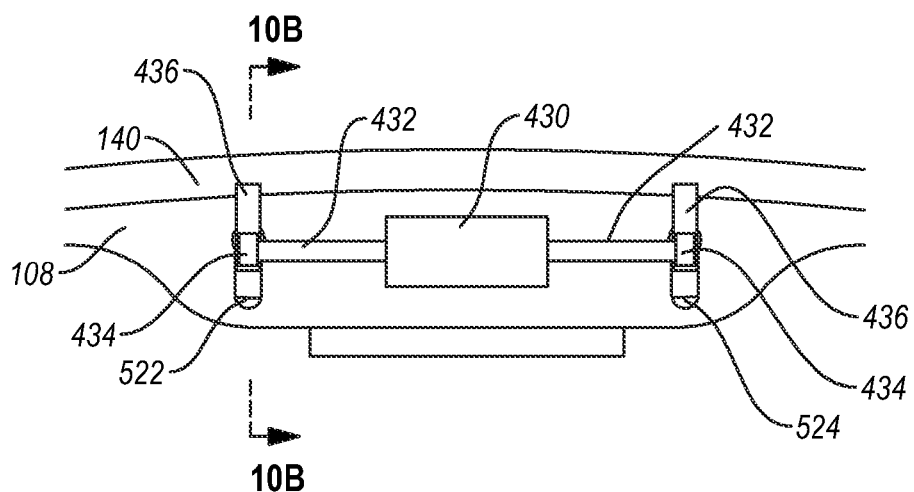

In another embodiment, engaging assembly 107 can comprise a rack and pinion mechanism. For example, as shown in FIGS. 9A-9C, actuator 550 can comprise a motor 430 rigidly attached to wiper support structure 108. Motor 430 has a pair of shafts 432 that extend in opposite directions from motor 430, substantially parallel to central longitudinal axis 194 (FIG. 2). Shafts 432 can be two separate shafts or a single shaft that extends in both directions. A pinion gear 434 is attached to or formed on the ends of each shaft 432 so as to rotate therewith. A toothed rack 436 is positioned between each pinion gear 434 and wiper support structure 108. As shown in the cross sectional views of FIGS. 10A and 10B, each rack 436 is aligned with its corresponding pinion gear 434 such that the individual gears 437 on pinion gear 434 mate with the teeth 438 on rack 436. Applicant notes that the individual gears and rack teeth have been omitted in FIGS. 9A-9C for clarity sake. Shafts 432 rotate together so that when pinion gears 434 rotate, racks 436 move up and down in sync with each other, as shown in FIGS. 9A-9C.

Figure 10A:
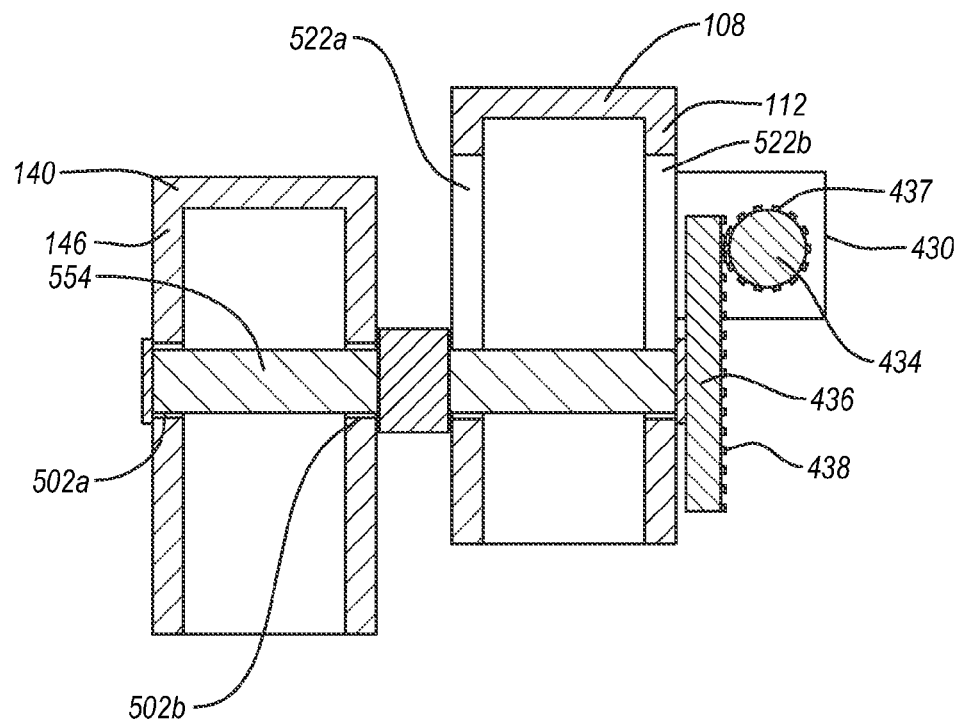
FIGS. 10A and 10B are cross sectional end views taken along the section lines 10A-10A and 10B-100B of FIGS. 9A and 9C, showing the positioning of the linkages when the scrubber assembly is in the raised and lowered positions, respectively.
Figure 10B:
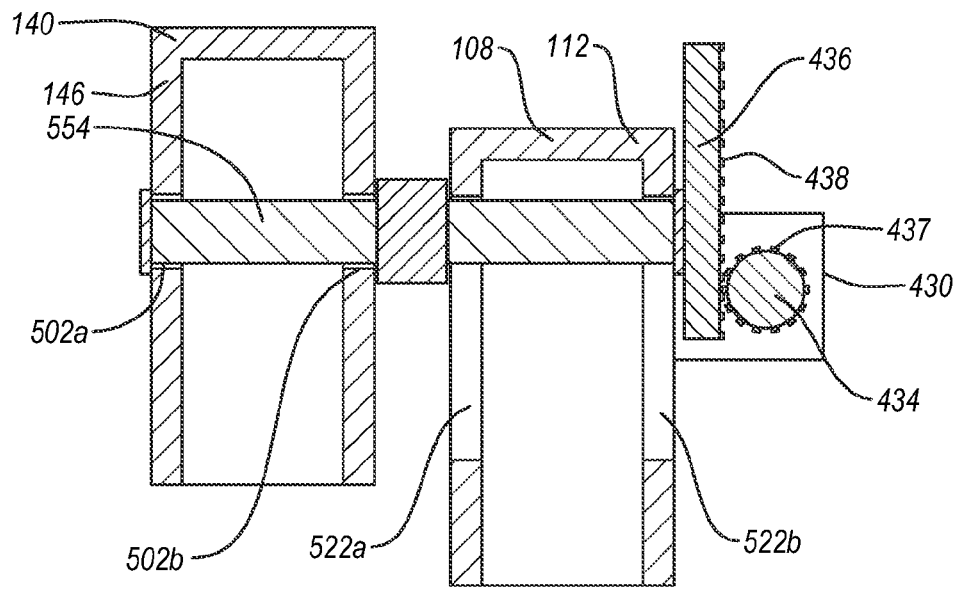

As shown in FIGS. 10A and 10B, connector pins 554 are used to aid in moving wiper support structure 108 and scrubber support structure 140 with respect to each other, similar to the embodiments above. Each connector pin 554 is rigidly attached to one of the racks 436 so that connector pins 554 move up and down with racks 436. Similar to the embodiment discussed above, the side walls of main cross arm 112 of wiper support structure 108 and main cross arm 146 of scrubber support structure 140 also include apertures extending therethrough. However, because of the rack and pinion arrangement, the primary aperture and primary slot of main cross arms 112 and 146, respectively, can be omitted. In addition, secondary slots 522 and 524 and secondary apertures 502 and 504 trade places with each other. That is, secondary slots 522 and 524 are moved to main cross arm 112 of wiper support structure 108 and secondary apertures 502 and 504 are moved to main cross arm 146 of scrubber support structure 140.

During use, as motor shafts 432 are rotated, pinion gears 434 also rotate. Due to the coupling between gears 437 and teeth 438, as pinion gears 434 rotate, racks 436 move up and down with respect to motor 430 and wiper support structure 108 to which motor 430 is mounted, as depicted in FIGS. 9A-9C and 10A-10B. This causes connector pins 554 to move up and down within secondary slots 522 and 524 on main cross arm 112. Because connector pins 554 extend through secondary apertures 502 and 504 of main cross arm 146, scrubber support structure 140 is raised and lowered with respect to wiper support structure 108 when connector pins 554 are respectively raised and lowered.

It is appreciated that the servo system and rack and pinion system discussed above are only two examples of engaging assemblies 107 and actuators 550 that can be used according to the present invention. Other types of actuators can also be used. For example, in other embodiments, actuator 550 can instead be comprised of a geared motor, a stall motor, or a solenoid that moves pins up and down to effect movement of scrubber assembly 102 between the raised and lowered positions.

Furthermore, although the actuators discussed herein are typically electrically powered, it is appreciated that actuators can be used that are fluidly driven, pneumatically driven, or driven by other means. For example, actuator 550 can be a water or air driven turbine or some other type of non-electrical device.

Figure 11:
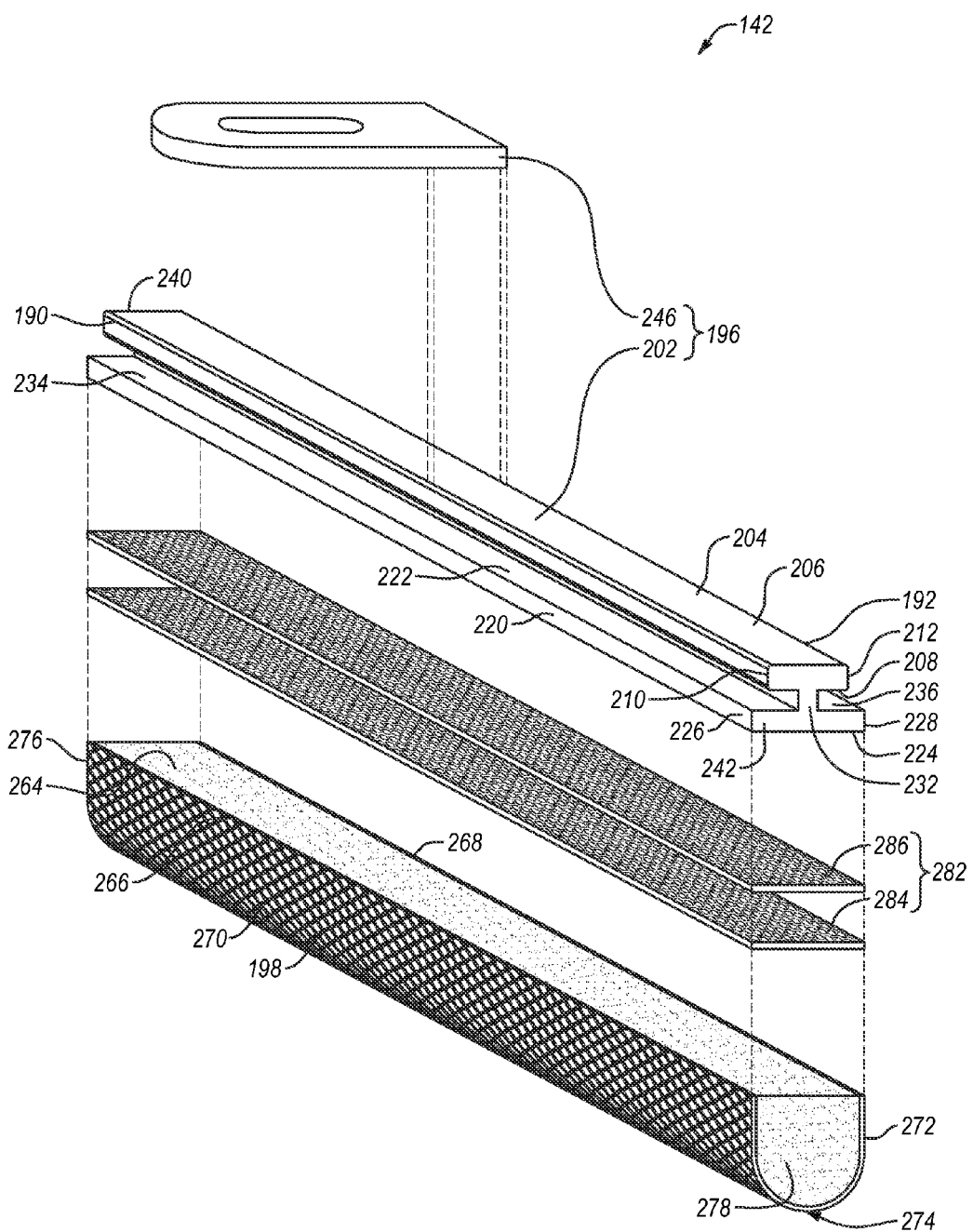
FIG. 11 is an exploded perspective view of the scrubber element shown in FIG. 1.

As shown in FIG. 2, scrubber element 142 extends between a first end 190 and a spaced apart second end 192 along a central longitudinal axis 194. Turning to FIG. 11, scrubber element 142 comprises an elongated reciprocating assembly 196 that includes a scrubbing member 198 and a reciprocating member 202, and means for removably attaching scrubbing member 198 to reciprocating member 202.

Reciprocating member 202 has a top portion 204 that is sized to be slidably received within passageway 178 of all of the mounting brackets 168. To that end, top portion 204 has a cross sectional shape that is generally the same shape as passageway 178. As such, top portion 204 comprises a top surface 206 and an opposing bottom surface 208 with two side surfaces 210, 212 extending therebetween. Top and bottom surfaces 206 and 208 and side surfaces 210 and 212 all extend along the longitudinal axis 194 between first end 190 and second end 192.

Reciprocating member 202 also comprises a bottom portion 220 also extending between first end 190 and second end 192. Bottom portion 220 has a top surface 222 and opposing bottom surface 224 with two side surfaces 226, 228 extending therebetween. In the depicted embodiment, bottom portion 220 is wider than top portion 204, although this is not required. A connecting portion 232 extends between bottom surface 208 of top portion 204 and top surface 222 of bottom portion 220 so as to form a pair of channels 234, 236 on either side of reciprocating member 202 that extends between first and second ends 190 and 192. Top portion 204, bottom portion 220, and connecting portion 232 combine at first and second ends 190 and 192 to respectively form a proximal end face 240 and a distal end face 242. The channels are formed such that the reciprocating member can be slidingly received within passageways 178 of mounting brackets 168. In the depicted embodiment, reciprocating member 202 has a generally "I" shaped cross section, as shown by the end faces 240 and 242, however any shape that allows reciprocating member 202 to be slidingly mounted within brackets 168 can be used.

Figure 12:
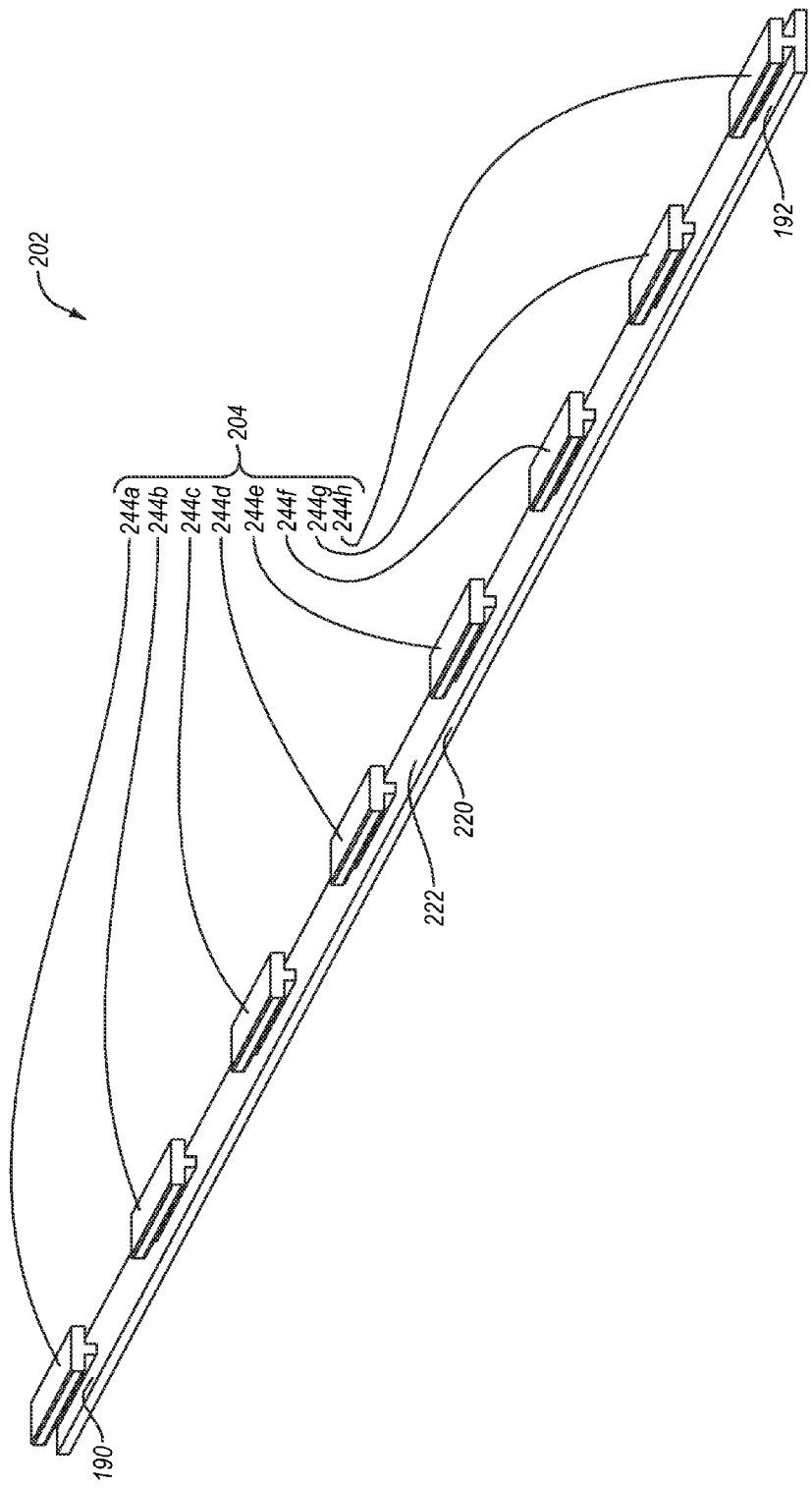
FIG. 12 is perspective view of an alternative embodiment of a reciprocating member.

In the depicted embodiment, top portion 204 and bottom portion 220 of reciprocating member 202 each extend as a single piece between first and second ends 190 and 192. In an alternative embodiment of reciprocating member 202, shown in FIG. 12, while bottom portion 220 remains extending as a single piece between first and second ends 190 and 192, top portion 204 is broken up into a plurality of spaced apart segments 244 extending up from bottom portion 220 between first and second ends 190 and 192. Segments 244 can be configured to align with brackets 168 (FIG. 5B) when reciprocating member 202 is mounted on scrubber support structure 140, as shown in FIG. 14A.

Breaking up top portion 204 into segments allows reciprocating member 202 to be more flexible, which aids in keeping scrubbing member 198 in contact with the windshield even as the wiper moves over the many contours in the windshield. It also saves material, thereby making scrubber support structure 140 lighter in weight. To further aid in flexibility, reciprocating member 202 can be made of a flexible material and/or can be very thin. For example, in one embodiment, reciprocating member is comprised of a polypropylene compound.

Returning to FIG. 11, reciprocating assembly 196 further comprises a receiving member 246 extending laterally away from top portion 204 of reciprocating member 202. Receiving member 246 can be attached to top member 204 or integrally formed therewith. Furthermore, although receiving member 246 is depicted as being disposed about midway between first and second ends 190 and 192 of reciprocating member 202, this is not required. For example, receiving member 246 may be offset from a midpoint of reciprocating member 202 so that motor 144 mounted above receiving member 246 does not interfere with the engaging assembly discussed above. Receiving member 246 is aligned with motor 144 when both are mounted on scrubber support structure 140, as shown in FIG. 2 and discussed in more detail below.

Figure 13:
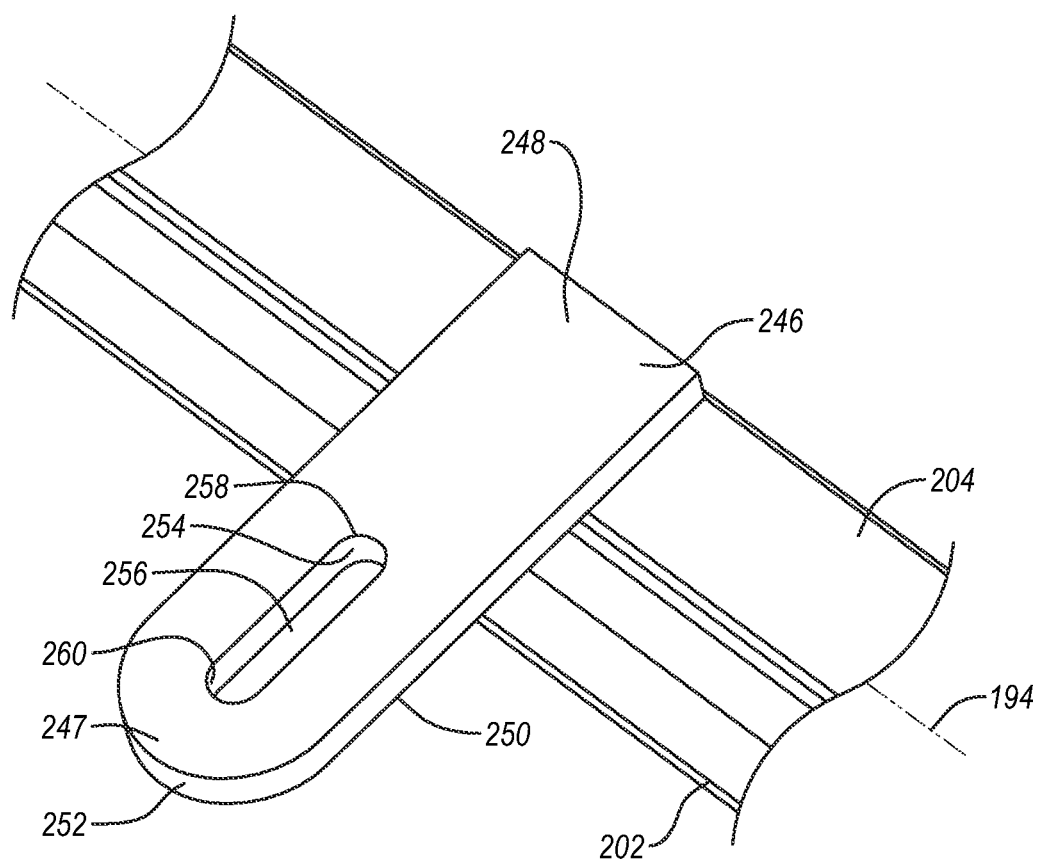
FIG. 13 is a top perspective view of a portion of the reciprocating assembly shown in FIG. 11, showing details of the receiving member.

Turning to FIG. 13, receiving member 246 comprises a tab that is positioned on top portion 204 of reciprocating member 202 and projects away from reciprocating member 202 to a distal end 247 in a direction orthogonal to the central longitudinal axis 194. During use, motor 144 couples with tab 246 to move reciprocating member 202. To withstand the forces associated with this, tab 246 is typically made of a strong and long-lasting material, such as hard plastic or metal, e.g., aluminum.

Tab 246 comprises a top surface 248 and an opposing bottom surface 250 with a perimeter side surface 252 extending therebetween. Tab 246 also includes an inner sidewall 254 extending completely through tab 246 between top and bottom surfaces 248 and 250 so as to bound an elongated aperture 256 running substantially orthogonal to the central longitudinal axis 194. Aperture 256 extends between a first end 258 and a second end 260. The length of aperture 256, defined as the distance between the first and second ends 258 and 260 and measured orthogonally to the central longitudinal axis 194, is substantially longer than the width thereof.

Returning to FIGS. 5A and 5B, reciprocating assembly 196 is installed on scrubber support structure 140 so that top portion 204 of reciprocating member 202 is inserted into the passageways 178 of mounting brackets 168. This can be done in a number of ways. In some embodiments, reciprocating member 202 is inserted into mounting brackets 168 after scrubber support structure 140 has been fully assembled. This can be done by starting at one end of scrubber support structure 140 and sliding top portion 204 of reciprocating member 202 through all of the mounting brackets 168 in series in a manner similar to how a new wiper blade is installed in a conventional wiper support structure 108. This approach to mounting reciprocating member 202 to scrubber support structure 140 can be used, e.g., if receiving member 246 is able to be attached to top portion 204 after reciprocating member 202 is mounted on scrubber support structure 140.

In other embodiments, reciprocating member 202 is inserted into mounting brackets 168 before scrubber support structure 140 has been fully assembled. In this approach, top portion 204 is inserted into mounting brackets 168 before secondary cross arms 162 are attached to primary cross arms 156. This approach may be desired to be used, e.g., if receiving member 246 is permanently attached to reciprocating member 202.

In embodiments where top portion 204 is broken into segments, reciprocating member 202 can be positioned so that each segment 244 is adjacent its corresponding mounting bracket 168 and then moved longitudinally so that all segments 244 are simultaneously inserted into mounting brackets 168. In addition, if reciprocating member 202 is flexible, any portion of reciprocating member 202 can be flexed toward or away from scrubber support structure 140 to aid in installation.

In some embodiments, reciprocating member 202 is removable from scrubber support structure 140. In one embodiment, receiving member 246 can be detached from reciprocating member 202 and reciprocating member 202 can then be removed by sliding top portion 204 out of mounting brackets 168. In other embodiments, reciprocating member 202 can be flexed away from scrubber support structure 140 sufficient for receiving member to uncouple from motor 144 and segments of top portion 204 can then be removed from mounting brackets 168 by sliding action. This manner may work especially well when using a segmented top portion. Other manners of removal are also possible.

As shown in FIGS. 5A and 5B, regardless of the manner in which reciprocating assembly 196 is installed, when fully inserted within mounting brackets 168, bottom surface 208 of top portion 204 of reciprocating member 202 rests against inner surface 174 of each mounting bracket 168 while connecting portion 232 extends through each opening 184. By being mounted thusly, reciprocating assembly 196 is able to reciprocally move (i.e., move back and forth) within mounting brackets 168 along central longitudinal axis 194. As such, when attached to a vehicle, the reciprocating motion of reciprocating assembly 196 is generally parallel to the windshield and generally perpendicular to the prescribed arcuate travel of the windshield wiper 100 across the windshield. Reciprocating member 202 and receiving member 246 can be comprised of metal, plastic, or other rigid material.

Returning to FIG. 11, scrubbing member 198 has a top surface 264 extending laterally between opposing sides 266 and 268. Extending down from top surface 264 at both sides 266 and 268 respectively, are a pair of scrubbing surfaces 270 and 272. Scrubbing surfaces 270 and 272 both extend down from top surface 264 and then curve toward each other until scrubbing surfaces 270 and 272 meet at the bottom, denoted as 274 in the depicted embodiment. As such, the scrubbing surfaces 270 and 272 together form a "U" shaped cross section. In some embodiments scrubbing surfaces 270 and 272 come together to form a ridge to form more of a "V" shaped cross section. In other embodiments portions of scrubbing surfaces 270 and 272 are flat so that scrubbing member 198 has a substantially flat bottom surface. In still other embodiments, other regular or irregular shapes are used. For example, as discussed in more detail below, in one embodiment used for removal of ice from a windshield, the bottom surface of scrubbing member 198 can have a serrated edge. Other shapes can also be used. In some embodiments, the width of scrubbing member 198 between sides 266 and 268 is between about 8 mm to about 50 mm, with between about 12 mm to about 25 mm being common. Other widths can also be used. In some embodiments, the width of scrubbing member 198 is substantially the same as the width of reciprocating assembly 196.

The top surface 264 and scrubbing surfaces 270 and 272 extend longitudinally from a first end face 276 to a spaced apart second end face 278. In some embodiments, the longitudinal length of scrubbing member 198 between first end face 276 and second end face 278 is between about 305 mm to about 700 mm, with between about 375 mm to about 640 mm being common. Other lengths can also be used. In some embodiments, the longitudinal length of scrubbing member 198 between first end face 276 and second end face 278 can be substantially the same as the longitudinal length of reciprocating assembly 196 between end faces 240 and 242.

As discussed above, a portion 136 of fluid line 111 can be positioned within scrubbing member 198. For those embodiments, fluid line portion 136 can extend substantially between the first and second ends of scrubbing member 198. A coupler 280 can be included anywhere along fluid line portion 136 to fluidly couple fluid line portion 136 to the rest of fluid line 111.

Scrubbing member 198 can be comprised of any material that can scrub a windshield without scratching the glass. In one embodiment, scrubbing member 198 comprises a material that is softer than tempered glass according to the Rockwell Hardness Index. In one embodiment, scrubbing member 198 is comprised of one or more of: a foam pad, a chamois, a cloth, and bristles. In one embodiment, scrubbing member 198 is comprised of a high density foam. In another embodiment, scrubbing member 198 is comprised of a silicon rubber compound. In still another embodiment, scrubbing member 198 is comprised of a polycarbonate plastic. Other materials can alternatively be used. In addition, a mesh netting can be used to cover the scrubbing surfaces 270 and 272 if desired, as shown in the depicted embodiment. Furthermore, as discussed above, scrubbing member 198 can be comprised of a material that partially absorbs the washer fluid so that the scrubbing member can moisten the windshield as it passes over the windshield.

Continuing with FIG. 11, scrubbing member 198 is attached to reciprocating member 202 in such a manner that scrubbing member 198 will reciprocally move with reciprocating member 202 to thereby scrub the glass as the windshield wiper 100 moves over the windshield. This is done by attaching the top surface 264 of scrubbing member 198 to the bottom surface 224 of bottom portion 220 of reciprocating member 202. In some embodiments scrubbing member 198 is permanently attached to reciprocating member 202, while in other embodiments scrubbing member 198 is attached so as to be removable. If permanent attachment is desired, adhesives such as glues, epoxies, or other types of adhesives can be used. Other known methods for permanent attachment can also be used.

If a removable attachment is desired, a means for removably attaching scrubbing member 198 to reciprocating assembly 196 can be used. For example, in the depicted embodiment, the means for removably attaching scrubbing member 198 to reciprocating assembly 196 comprises a hook and loop fastener 282, such as, e.g., a VELCRO type of fastener, as is known in the art. Hook and loop fastener 282 comprises matching strips 284 and 286.

Strip 284 is permanently adhered to the top surface 264 of scrubbing member 198 and matching strip 286 is permanently adhered to the bottom surface 224 of bottom portion 220 of reciprocating member 202. Strip 284 has a surface comprised of either the hook or the loop material, and strip 286 has a surface comprised of the mating loop or hook material, as is known in the art. As such, when the two strips 284 and 286 are pushed together, the hook and loop surfaces engage each other, causing the two strips to attach to each other and remain attached until pulled apart, as is known in the art. Because strips 284 and 286 are respectfully adhered to scrubbing member 198 and reciprocating member 202, scrubbing member 198 is thereby attached to reciprocating member 202 until the user pries the two members apart.

Alternatively, other types of fasteners, such as releasable adhesives, screws, releasable fasteners, pins, etc. can also be used as the means for removably attaching scrubbing member 198 to reciprocating assembly 196. Other means for removably attaching scrubbing member 198 to reciprocating member 202, as are known in the art, can also be used.

Scrubbing member 198 may need to be removed and replaced periodically for a number of reasons. For example, simple wear and tear that occurs over an extended period of time of use may necessitate periodic replacement. Or a user may have scrubbing members made of different materials for different uses so as to necessitate switching scrubbing members. For example, a user may have one scrubbing member for normal use and a scrubbing member made of a stiffer material for winter use or for off-road use. The user would then want to switch scrubbing members based on the desired use.

In light of the above, a removable attachment of scrubbing member 198 to reciprocating member 202 provides some unique benefits over a permanent attachment. For example, if scrubbing member 202 is removable, then scrubbing member 202 can simply be removed from reciprocating member 202 and replaced while reciprocating member 202 remains attached to scrubber support structure 140. When the attachment of scrubbing member 198 to reciprocating member 202 is permanent, however, reciprocating member 202 is also required to be removed from scrubber support structure 140 every time scrubbing member 198 is replaced. Furthermore, reciprocating member 202 also is required to be replaced with scrubbing member 198 if the attachment is permanent.

Returning to FIG. 1, motor 144 can comprise a standard dc type electrical motor as is known in the art that is mounted to scrubber support structure 140. In some embodiments, motor 144 has a speed of between about 1,000 rpm to about 20,000 rpm, with between about 2,000 rpm to about 12,000 rpm being common. Other speeds can also be used. Lower rpms are also possible through gearing to improve torque and reduce noise, which can be a byproduct of the scrubbing action. For example, in one embodiment, motor 144 has a speed of about 24,000 rpms, but the shaft only runs at 2650 rpms after a gear reduction of 9.66:1. Other gear ratios can also be used, as discussed below. In the depicted embodiment, motor 144 is mounted to the center section 152 of scrubber support structure 140, although this is not required. Motor 144 can be mounted to scrubber support structure 140 by mounting screw, fastener, or other permanent or removable mounting means known in the art.

Figure 14:
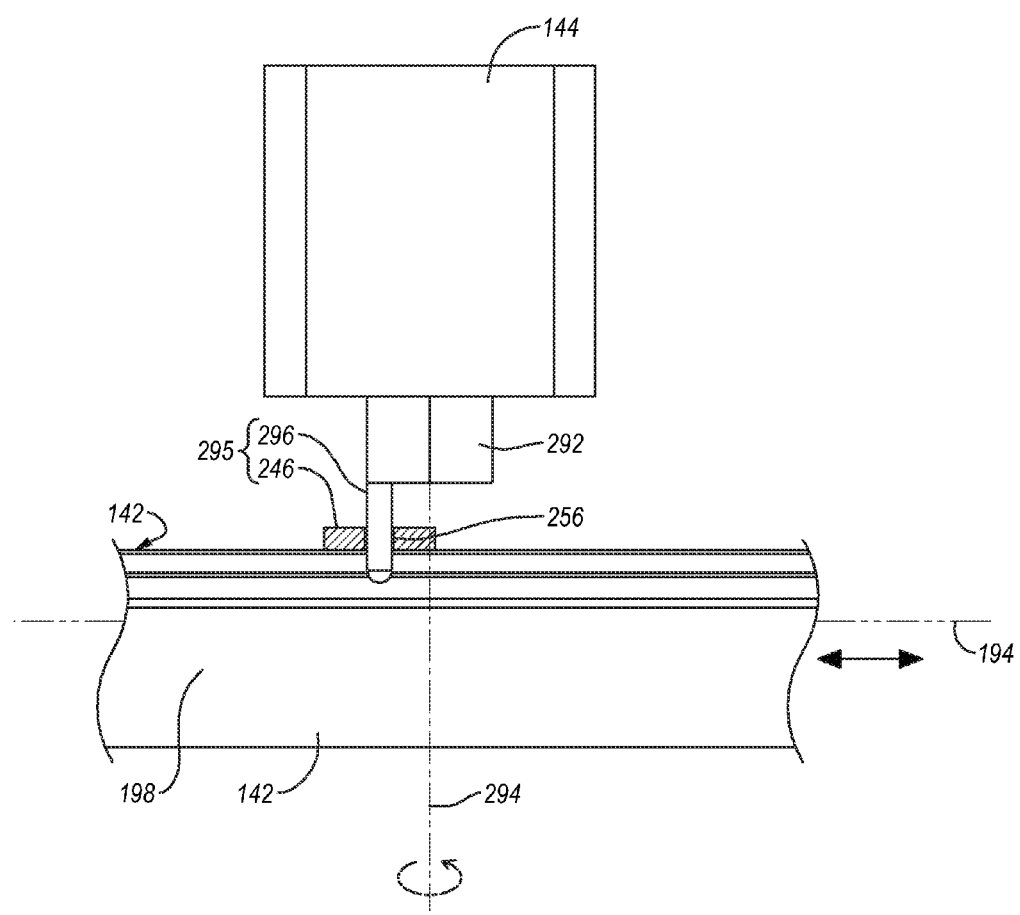
FIG. 14 is a front view of a motor engaged with the receiving member shown in FIG. 13.

Turning to FIG. 14, motor 144 has a shaft 292 extending therefrom that rotates about a rotational axis 294 when motor 144 is energized. Motor 144 is configured to be energized by the automobile battery or a portable power source, such as a battery pack, as discussed below.

Motor 144 is positioned on scrubber support structure 140 (see FIG. 2) so as to engage with scrubber element 142 and thereby reciprocally move scrubber element 142 along the central longitudinal axis 194. To do this, motor 144 is attached to scrubber element 142 through a linkage 295 which converts rotational motion of the motor shaft 292 to linear motion of the scrubber element 142. For example, in the depicted embodiment an attaching member 296 is secured to shaft 292 at a position offset from the rotational axis 294. The attaching member 296 can be attached to shaft 292 or can be integrally formed therewith. In the depicted embodiment, the attaching member 296 comprises a pin. Other types of attaching members can alternatively be used. Due to its offset from rotational axis 294, pin 296 travels in a circle around rotational axis 294 as shaft 292 is rotated.

In the depicted embodiment, motor 144 is positioned on scrubber support structure so that shaft 292 extends downward toward scrubber element 142 and pin 296 extends through aperture 256 of tab 246. By so doing, rotation of shaft 292 can cause reciprocating assembly 196 to reciprocally move along the central longitudinal axis 194 thereof as hereafter described with reference to FIGS. 15A-15D.

As described above, as shaft 292 rotates, pin 296 moves in a circle. As shown in FIGS. 15A-15D, this causes pin 296 to move back and forth between first and second ends 258 and 260 of aperture 256 while tab 246 moves laterally back and forth along the longitudinal axis 194.

Figure 15A:
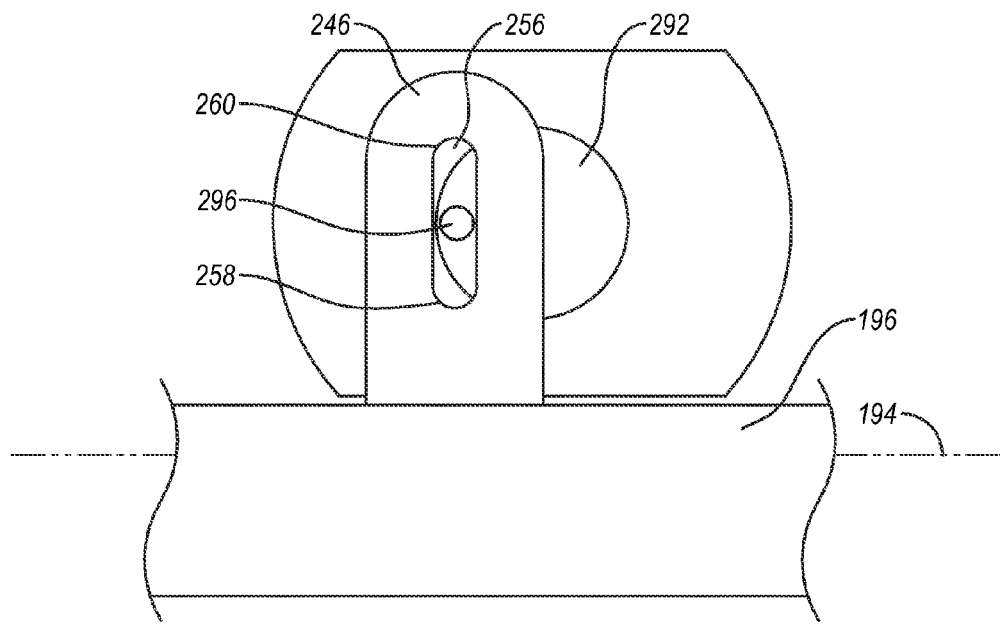
FIGS. 15A-15D are bottom views showing how the reciprocating assembly reciprocally moves as a direct result of the rotary movement of the motor shaft.

In FIG. 15A, shaft 292 is positioned so that pin 296 is at its leftmost position on the shaft. In this position, pin 296 is disposed about midway between first and second ends 258 and 260 of aperture 256 and tab 246 is in its leftmost position.

Figure 15B:
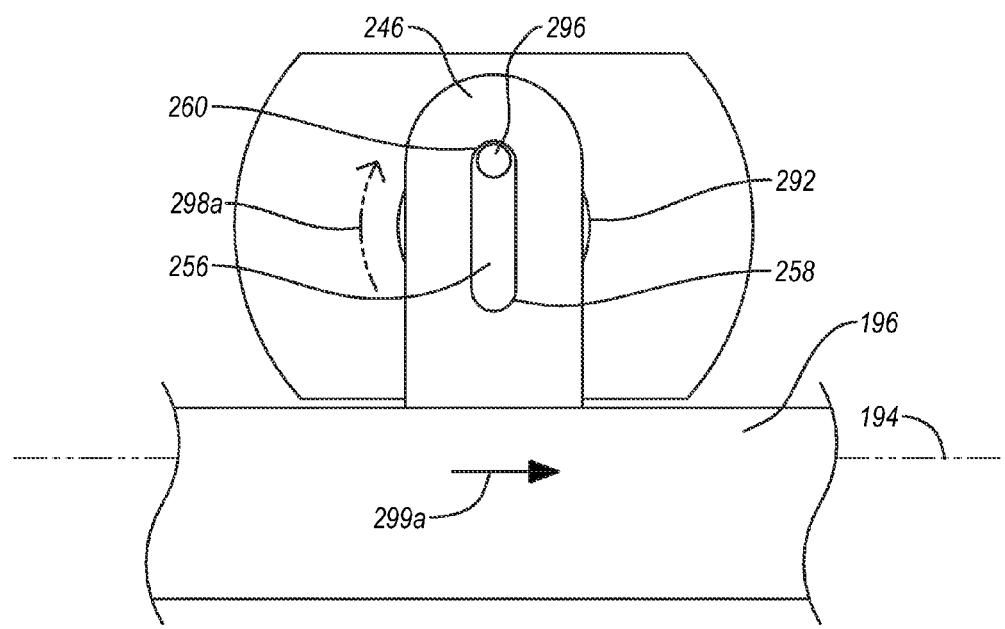

As shaft 292 rotates clockwise ninety degrees, as denoted by arrow 298a, pin 296 moves to the position shown in FIG. 15B. As a result of the rotation of shaft 292, pin 296 has now moved to the second end 260 of aperture 256 and tab 246 has moved to the right with respect to its position in FIG. 15A. Because tab 246 is attached to reciprocating assembly 196, reciprocating assembly 196 also moves to the right, as denoted by arrow 299a.

Figure 15C:
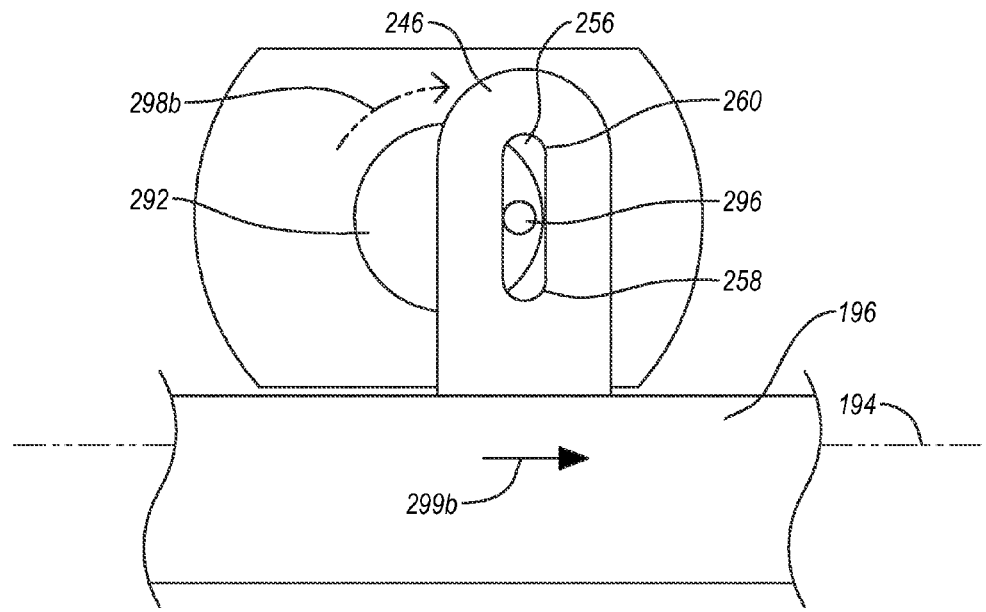

As shaft 292 further rotates clockwise another ninety degrees as denoted by arrow 298b, pin 296 moves to the position shown in FIG. 15C. In this position, pin 296 has now moved back to the middle of aperture 256 and tab 246 has moved further to the right, to its rightmost position. Again, because pin 246 is attached to reciprocating assembly 196, reciprocating assembly 196 also moves to the right, as denoted by arrow 299b.

Figure 15D:
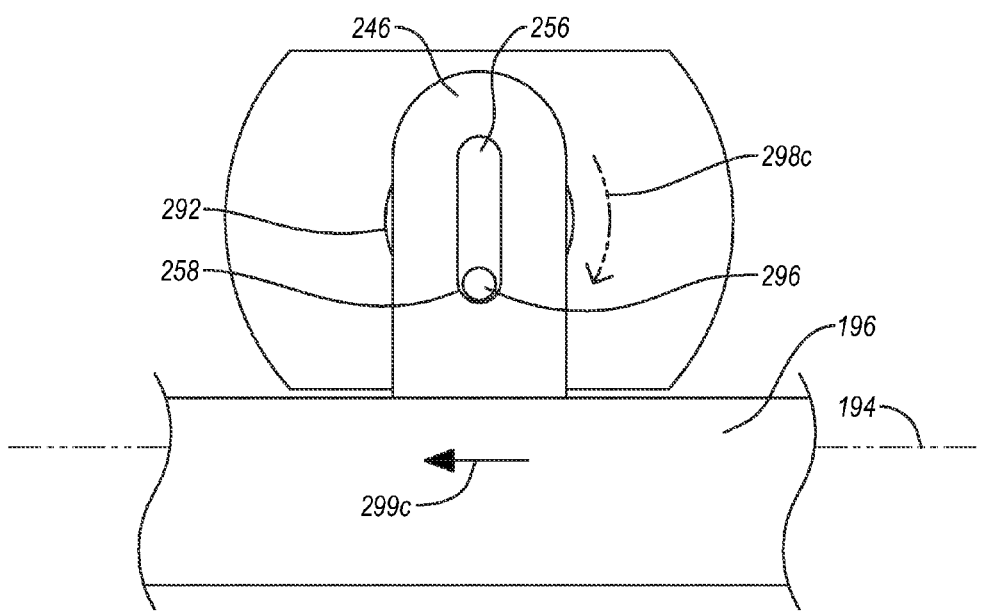

As shaft 292 further rotates clockwise another ninety degrees as denoted by arrow 298c, pin 296 moves to the position shown in FIG. 15D. In this position, pin 296 has now moved to the other (i.e., first) end 258 of aperture 256 and tab 246 has started to move back to the left. Reciprocating assembly 196 has also moved to the left, accordingly, as denoted by arrow 299c.

Finally, as shaft 292 further rotates clockwise another ninety degrees, pin 296 and tab 246 return to the position shown in FIG. 15A and the process can repeat itself. Because of the continuous rotation of shaft 292, the engagement of pin 296 and tab 246 causes reciprocating assembly 196 to be reciprocally moved along central longitudinal axis. And due to its attachment to reciprocating assembly 196, scrubber element 142 (see FIG. 14) is also reciprocally moved along central longitudinal axis 194.

Although shaft 292 is discussed above as rotating in a clockwise direction, it is appreciated that shaft 292 can alternatively rotate in a counterclockwise direction, which will also result in reciprocating assembly 196 reciprocally moving along the central longitudinal axis. In addition, although the depicted embodiment shows tab 246 extending laterally from reciprocating member 202, it is appreciated that tab 246 can alternatively be positioned so as to not extend laterally (see, e.g., tab 352 of FIG. 17A). Furthermore, the embodiment described above using pin 296 as the attaching member and tab 246 as the receiving member is only one example of a linkage that can be used with the present invention. Other linkages are also possible.

Figure 16:
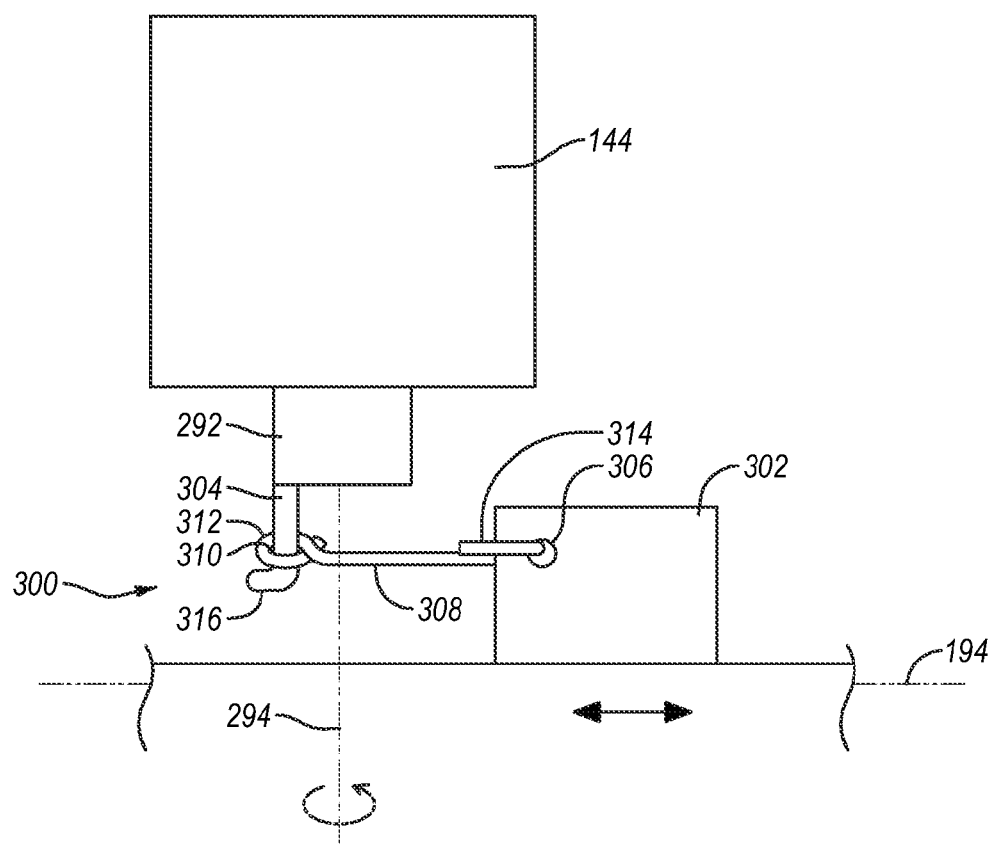
FIG. 16 is a front view of a portion of a scrubber assembly showing an alternative embodiment of a linkage.

For example, FIG. 16 depicts an alternative embodiment of a linkage 300 having a tab 302 and a pin 304 that can be used with the present invention. Tab 302 is similar to tab 246 in many respects. For example, similar to tab 246, tab 302 is attached to reciprocating assembly 196 and has an aperture 306 formed therein. However, instead of being substantially horizontal, as tab 246 is, tab 302 is substantially vertical. Similarly, pin 304 is similar to pin 296 in many respects. For example, similar to pin 296, pin 304 is positioned on shaft 292 so as to be offset from rotational axis 294. Unlike in linkage 295 discussed previously, however, pin 304 is not directly received within aperture 306 formed on tab 302. Instead, linkage 300 includes a link 308 that connects pin 304 to tab 302.

Link 308 is comprised of a wire or the like extending between a first end 312 and a spaced apart second end 314. Link 308 is looped at first end 312 so as to bound an aperture 310. Pin 304 is inserted through aperture 310. Unlike pin 296, pin 304 is bent at the end 316 furthest from shaft 292 so that pin 304 will remain within aperture 310. The other end 314 of link 308 is inserted through aperture 306 formed in tab 302. Link 308 is further bent at second end 314 to help keep link 308 disposed within aperture 306.

As shaft 292 rotates, the first end 312 of link 308 moves in a circular pattern with pin 304, which causes the second end 314 of link 308, which is attached to tab 302, to reciprocate in the longitudinal direction 194. Because of its attachment to tab 302, reciprocating assembly 196 is thus caused to reciprocally move along central longitudinal axis 194.

Figure 17A:
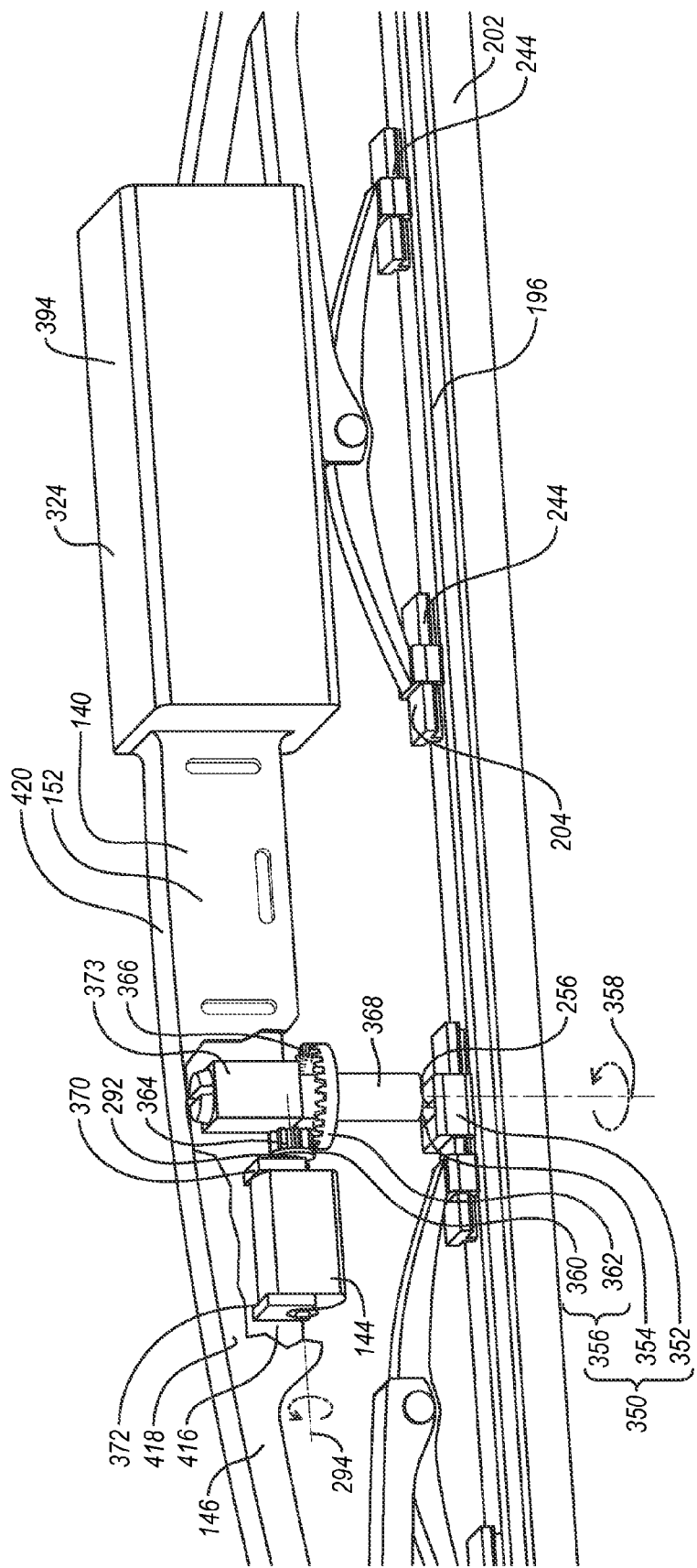
FIG. 17A is a front perspective view of a portion of an alternative embodiment of a scrubber assembly showing another alternative embodiment of a linkage.
Figure 17B:
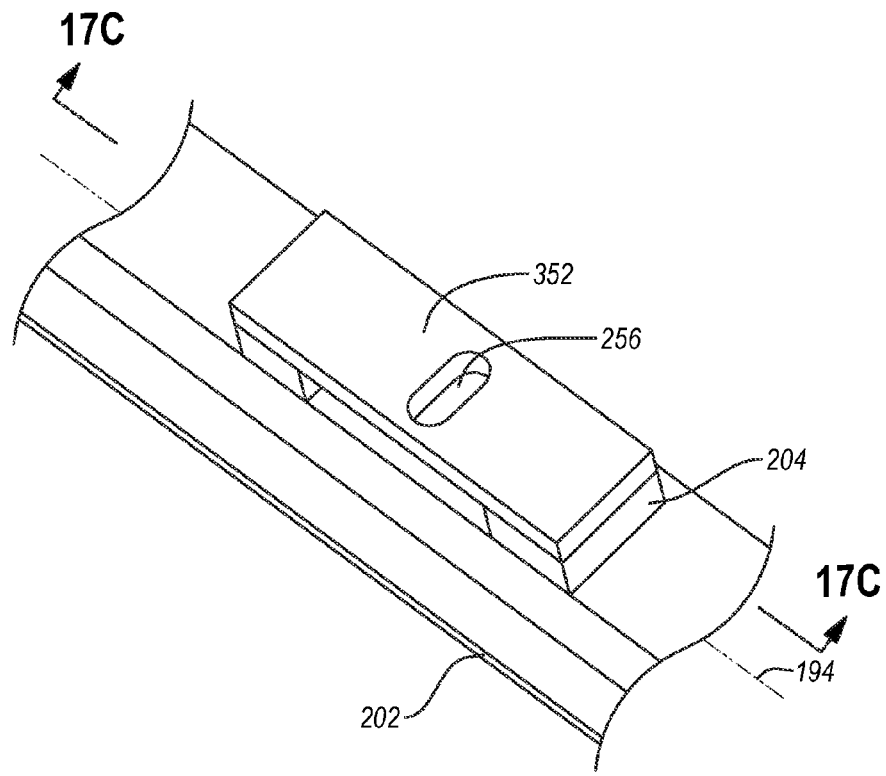
FIGS. 17B and 17C are perspective and side views, respectively, of a portion of the scrubber assembly of FIG. 17A, showing details of the tab and its attachment to the reciprocating member.
Figure 17C:
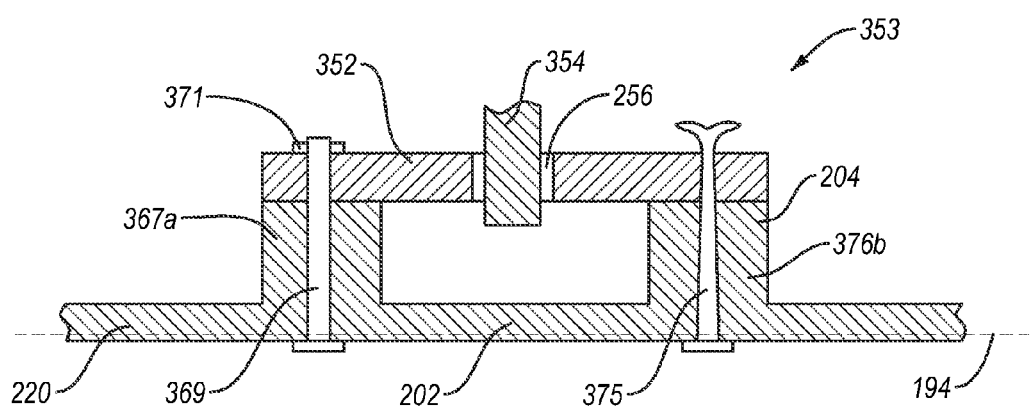

FIGS. 17A-17C depict another embodiment of a linkage 350 that can be used in the present invention. Applicant notes that reciprocating member 202 in FIGS. 17A-17C includes a top portion 204 that is broken into multiple segments 244, as discussed above. As shown in FIG. 17A, linkage 350 is designed so that motor 144 can be mounted such that rotational axis 294 is substantially parallel to central longitudinal axis 194 (FIG. 2). Similar to linkage 295, linkage 350 has a tab 352 formed in a receiving member 353 and a pin 354. However, instead of being directly secured to shaft 292, pin 354 is indirectly coupled to shaft 292 through a gearing system 356. Gearing system 356 is designed to convert the rotation of shaft 292 of motor 144 about rotational axis 294 into rotation about a rotational axis 358 that is perpendicular to rotational axis 294. To accomplish this, gearing system 356 comprises a first gear 360 attached to or integrally formed with shaft 292 of motor 144, and a second gear 362 to which pin 354 is attached.

First gear 360 is circularly shaped with gear teeth 364 positioned about the perimeter thereof. First gear 360 is directly mounted onto shaft 292 so as to rotate about rotational axis 294. Alternatively, first gear 360 can be integrally formed on shaft 292. Second gear 362 is also circularly shaped with gear teeth 366 positioned about the perimeter thereof. Gear teeth 366 are configured to mate with gear teeth 364, as shown in the depicted embodiment. Second gear 362 is mounted onto scrubber support structure 140 so that second gear 362 can rotate about rotational axis 358, which is orthogonal to rotational axis 294. Pin 354 is secured to second gear 362, either directly or through a mounting member 368, as shown in the depicted embodiment. Pin 354 is positioned so as to extend in the same direction as rotational axis 358, but to be offset from the rotational axis 358.

First and second gears 360 and 362 are positioned so that the teeth 364 and 366 enmesh. As such, as shaft 292 rotates about rotational axis 294, first gear 360 also rotates about rotational axis 294. This causes second gear 362 to rotate about rotational axis 358 due to the engaging teeth 364 and 366. The gear ratio between first and second gears 362 and 364 can be adapted as desired. In one embodiment, a gear ratio of about 10:1 is used. In other embodiments, a gear ratio of about 7:1 and about 4:1 are used. Other gear ratios can also be used. Due to its offset from rotational axis 358, pin 354 travels in a circle around rotational axis 358 as second gear 362 rotates. Pin 354 engages tab 352 to cause reciprocating motion in a manner similar to that discussed above with regard to pin 296 and tab 246 and FIGS. 15A-15D.

Continuing with FIG. 17A, because gearing system 356 converts rotational motion between perpendicular axes 294 and 358, motor 144 can be positioned so that shaft 292 extends therefrom in a direction that is substantially parallel to reciprocating assembly 196. In the depicted embodiment, gearing system 356 is positioned so that rotational axis 358 passes downward generally toward reciprocating assembly 196.

As a result, many of the components of the motor 440 and linkage 350 can be positioned directly above reciprocating member 202. For example, as shown in FIG. 17B, aperture 256 of tab 352 can be aligned directly above reciprocating member 202. As a result, tab 352 can be substantially flush with the sides of reciprocating assembly 196, as in the depicted embodiment.

Turning to FIG. 17C, to accommodate aperture 256 being positioned above reciprocating member 202, receiving member 353 can also include a pair of risers 367 positioned between tab 352 and reciprocating member 202 on either side (along longitudinal axis 194) of aperture 256. Alternatively, the risers 367 can be integrally formed on reciprocating member 202. Risers 367 allow sufficient space between tab 352 and reciprocating member 202 so that during normal operation, pin 354 has sufficient room to move within aperture 256 without the end of pin 354 contacting reciprocating member 202. To provide sufficient room for risers 367, tab 352 may be substantially longer along longitudinal axis 194 than tab 246.

To assemble receiving member 353, risers 367 are first positioned on top surface 206 of reciprocating member 202 and secured thereto. This can be accomplished by adhesive, fasteners, or other known securing devices or methods. In one embodiment, a threaded screw is used for each riser 367. The screws can be threaded up through reciprocating member 202 and into risers 367 so that the sharp end of each screw is positioned away from scrubbing member 198 so that it cannot scratch the windshield. Of course, if risers 367 are integrally formed in reciprocating member 202, risers 367 are already secured to reciprocating member 202, and this step can be omitted.

Once each riser 367 is positioned and secured to reciprocating member 202, tab 352 is positioned on top of risers 367 and secured thereto. This can also be accomplished by adhesive, fasteners, or other known securing devices or methods. In one embodiment, the same threaded screws used to secure risers 367 to reciprocating member 202 can be used to secure tab 352 to each riser 367 by threading the screws further into tab 352. In the depicted embodiment, each riser 367 is integrally formed on reciprocating member 202. A bolt 369 is inserted up through one of the risers 367a and tab 352 and secured thereto with a mating nut 371. A split pin 375 is inserted up through the other riser 367b and tab 352 and then spread at the ends to secure tab 352 to reciprocating member 202. As noted above these are examples only; other securing devices and methods can also be used.

As shown in FIG. 17A, as a result of the vertical alignment, motor 144 can be positioned within the framework of scrubber support structure 140, if desired. For example, in the depicted embodiment a pair of attachment members 370 and 372 secures motor 144 within channel 420 formed by center section 152 of main cross arm 146. Attachment members 370 and 372 each attaches to motor 144 and to side walls 416 and 418 of main cross arm 146. In this manner, motor 144 is at least partially positioned and mounted within channel 420. Support structure 373 of the second gear 362 can also be mounted within channel 420, if desired, as shown in the depicted embodiment. Of course, care must be taken to make sure that motor 144 does not interfere with the actuator and linkages of the engaging assembly that extend through scrubber support structure 140.

If desired, the placement of motor 144 and pin 354 can be reversed. That is, if desired, motor 144 can be affixed to scrubber element 142 and tab 352 can be affixed to scrubber support structure 140 so that pin 354 can extend into tab 352. Gearing system 356 can also be affixed to scrubber element 142, if desired.

Figure 18:
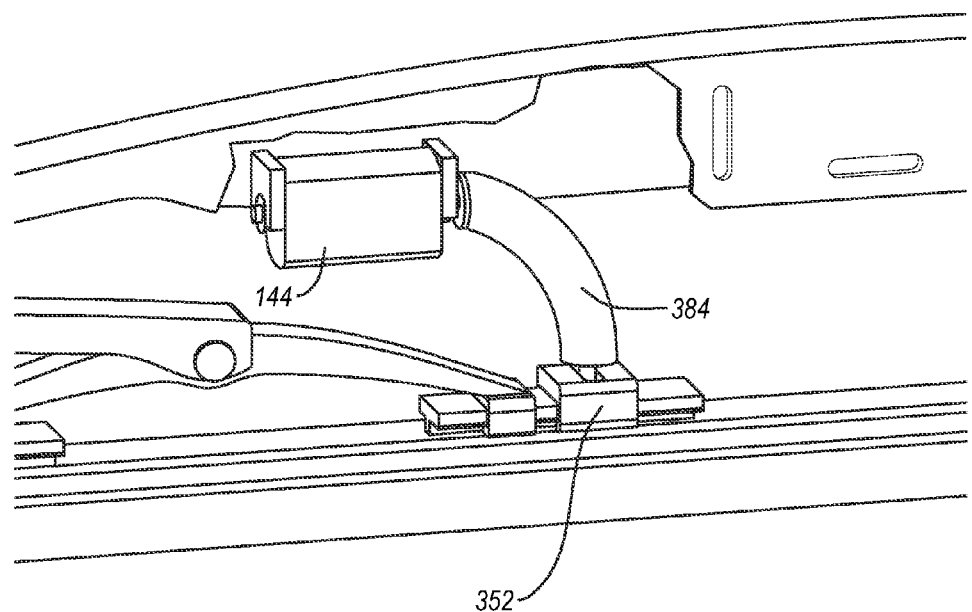
FIG. 18 is a perspective view of a motor and another alternative embodiment of a linkage.

It is appreciated that other types of gears and gearing systems can also be used in place of gearing system 356. For example, crown gears, pinion gears, and worm gears can be used, if desired. FIG. 18 shows an embodiment in which a flexible cable 384 is used with gearing being positioned within the motor 144. Other gearing systems can also be used.

In another embodiment, motor 144 can be positioned directly above tab 352 and oriented vertically so motor 144 can couple with aperture 256 without using external gearing.

Figure 19A:
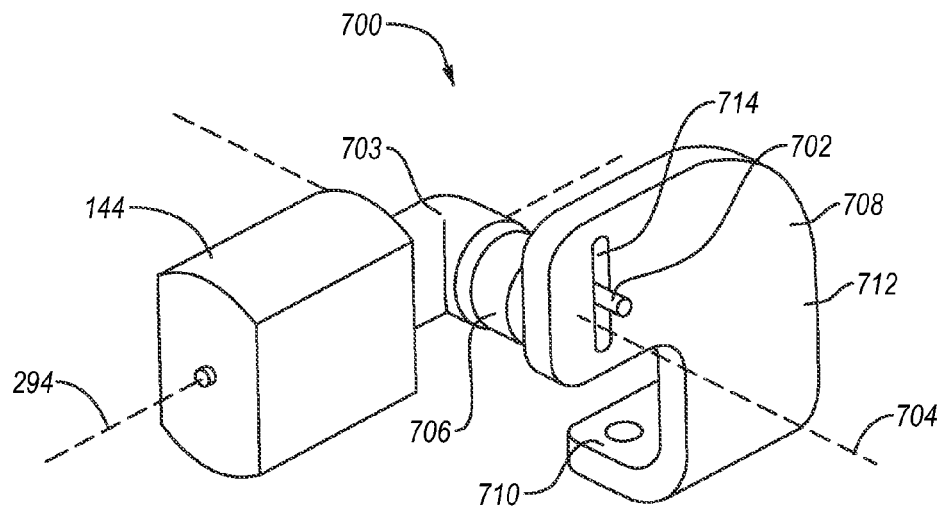
FIG. 19A is a perspective view of a motor and an alternative embodiment of a linkage.
Figure 19B:
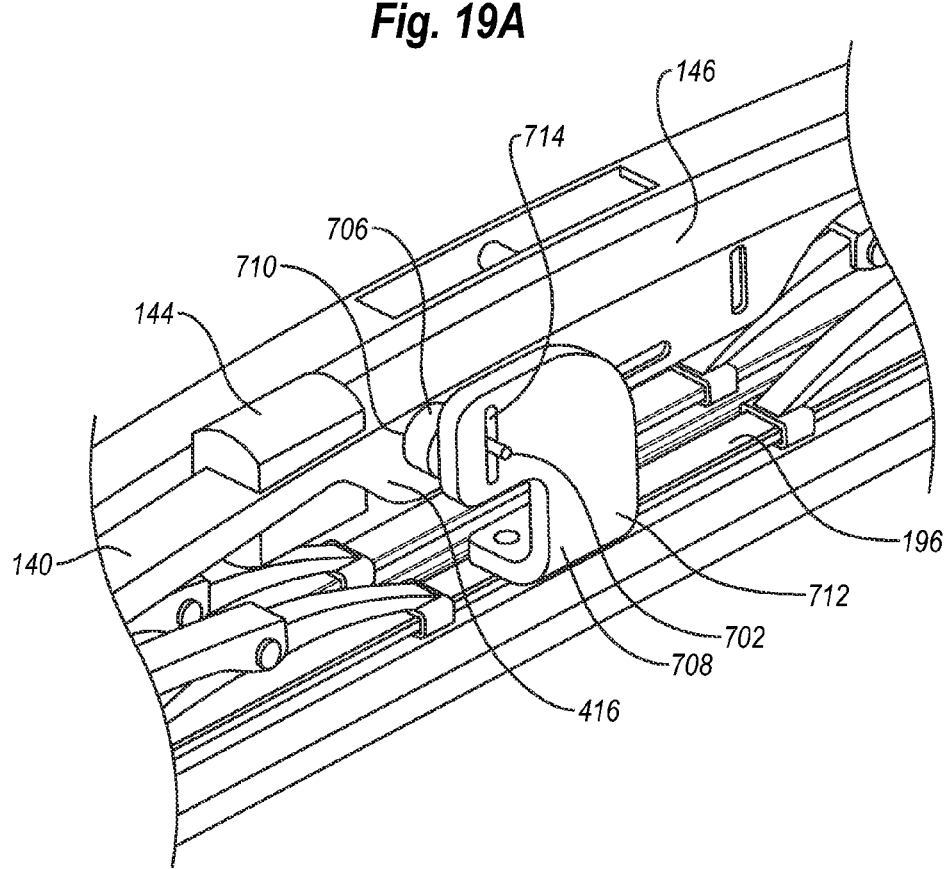
FIG. 19B is a front perspective view of a portion of an alternative embodiment of a scrubber assembly that incorporates the linkage shown in FIG. 19A.

FIGS. 19A and 19B depict another embodiment of a linkage 700 that can be used in the present invention. Similar to linkage 350, linkage 700 is designed so that motor 144 can be mounted such that rotational axis 294 is substantially parallel to central longitudinal axis 194 (FIG. 2). Also similar to linkage 350, linkage 700 has a pin 702 indirectly coupled to motor shaft 292 (FIG. 17A) through a gearing system 703 that is designed to convert the rotation of motor shaft 292 about rotational axis 294 into rotation about a rotational axis 704 that is perpendicular to rotational axis 294. However, instead of the rotational axis passing downward toward reciprocating assembly 196, rotational axis 704 passes laterally with respect to reciprocating assembly 196. That is, rotational axis 704 is substantially orthogonal to rotational axis 358 (FIG. 17A).

Similar to pin 354, pin 702 is secured to gearing system 703, either directly or through a mounting member 706, as shown in the depicted embodiment. Pin 702 is positioned so as to extend in the same direction as rotational axis 704, but to be offset therefrom. Due to the offset, pin 702 travels in a circle around rotational axis 704 as motor shaft 292 rotates.

Similar to previous embodiments, linkage 700 also includes a tab 708 that converts the rotational motion of pin 702 into reciprocating motion of the reciprocating assembly 196. Tab 708 includes a first section 710 and a second section 712 that extends orthogonally therefrom. First section 710 is configured to attach to reciprocating assembly 196. This can be done using any type of fastener or adhesive or other attaching device or method, as discussed above. Second section 712 includes an aperture 714 that receives pin 702. Aperture 714 is similar to aperture 256, discussed above, except that aperture 714 is substantially vertically oriented. Notwithstanding, aperture 714 works in a similar manner as aperture 256, as discussed above. As such, as pin 702 rotates, tab 708 converts the rotational motion to reciprocating motion that is translated to reciprocating assembly 196.

Due to the use of gearing system 703, motor 144 and/or gearing system 703 can be positioned within the framework of scrubber support structure 140, if desired, similar to the embodiment discussed above. In one embodiment, a pair of attachment members can be used to secure motor 144 within channel 420 formed by center section 152 of main cross arm 146, as discussed above (see FIG. 17A). Alternatively, as shown in the embodiment depicted in FIG. 19B, motor 144 can be integrally molded with scrubber support structure 140 in this or any other embodiment contemplated herein. Other options are also possible.

To allow mounting member 706 to extend laterally from gearing system 703, an aperture 710 can be cut out or otherwise formed through side wall 416 of main cross arm 146. Mounting member 706 can extend through aperture 710 so that pin 702 is received within aperture 714 of second section 712 of tab 708.

Other types of linkages that convert rotary to reciprocating motion can alternatively be used. Furthermore, gearing can also be used in other embodiments, including those described previously, to change the ratio and alter torque levels of rotational motion to reciprocating motion, if desired.

As noted above, various motor speeds can be used ranging from about 2,000 rpm to about 20,000 rpm. If the attaching member 296 is secured directly to the shaft of the motor, the reciprocating frequency of the reciprocating assembly will generally match the rotary speed. That is, if the motor speed is, e.g., about 3,000 rpm, then the reciprocating frequency will be about 3,000 cycles/minute or about 50 cycles per second (Hz). Of course, if gearing is used, then the reciprocating frequency is determined by the gear ratio, as is known in the art. In various embodiments, the reciprocating frequency of reciprocating assembly 196 can range between about 20 Hz to about 200 Hz with about 30 Hz to about 50 Hz being common. Other reciprocating frequencies can also be used.

In an alternative embodiment, a turbine is used in place of motor 144 to provide the rotational motion to attaching member 296. For example, U.S. patent application Ser. No. 12/705,221, filed on Feb. 12, 2010, which is incorporated herein by reference in its entirety, discloses a system using a turbine to provide rotational motion to an attaching member that can be used with the present invention. In other embodiments, a pneumatically driven turbine can be used.

Figure 20:
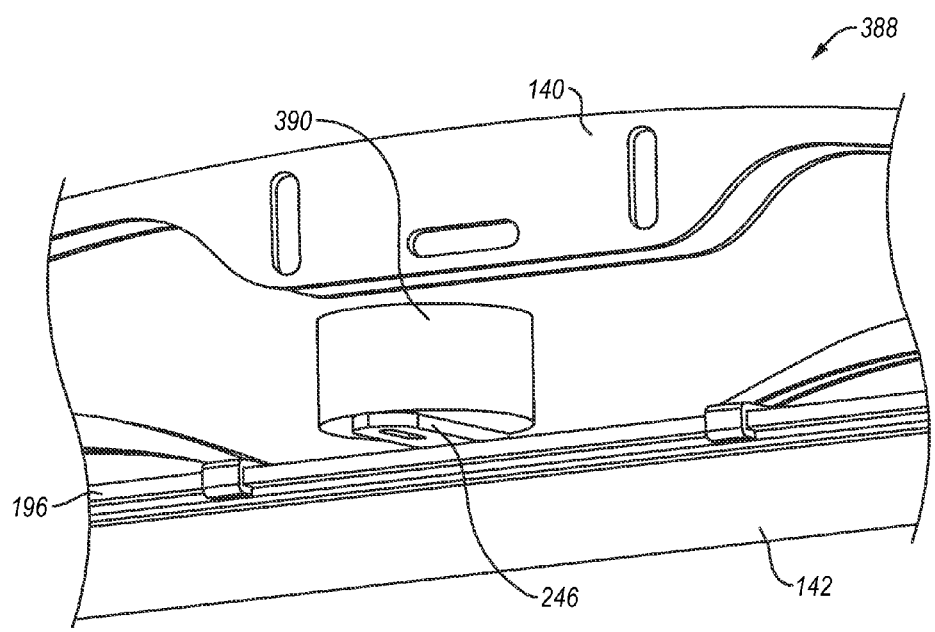
FIG. 20 is a perspective view of a portion of an alternative embodiment of a scrubber assembly that incorporates a vibrating motor.

In some embodiments, the scrubbing motion produced is a non-reciprocating motion. FIG. 20 depicts an alternative embodiment of a scrubber assembly 388 that causes the reciprocating assembly to vibrate instead of reciprocate to help clean the windshield. To accomplish this, a vibrating motor 390 is used instead of conventional rotary shaft motor 144. Instead of being secured to scrubber support structure 140 and being indirectly coupled to reciprocating assembly 196 as in previously described embodiments, vibrating motor 390 is secured rigidly to reciprocating assembly 196 (which will also be referred to herein as vibrating assembly 196 when vibrating motor 390 is used). This can be done by rigidly attaching vibrating motor 390 directly to vibrating assembly 196, or to receiving member 246, as in the depicted embodiment. In light of this, when vibrating motor 390 is activated so as to vibrate, vibrating assembly 196 correspondingly vibrates due to its rigid attachment to vibrating motor 390.

Vibrating motor 390 can be made from a conventional motor by simply adding an offset weight to the shaft thereof. Alternatively, many commercially available vibrating motors can be used in the present invention. Various vibrating frequencies can be used. In some embodiments, vibrating frequencies within the ultrasonic range (i.e., above 22 kHz) are used. Furthermore, vibrating motor 390 can be positioned anywhere along vibrating assembly 196. For example, in one embodiment vibrating motor 390 is positioned at or near first end 190 while in another embodiment, vibrating motor 390 is positioned at or near second end 192. If desired, one or more additional vibrating motors 390 can also be used. For example, a pair of vibrating motors can be positioned at opposite ends of vibrating assembly, if desired. Other configurations are also possible.

In addition, one or more vibrating motors 390 can be used in conjunction with any of the embodiments discussed previously that use motor 144. For example, one or more vibrating motors 390 can be positioned at or near first or second ends 190, 192, while motor 144 is positioned near the center of reciprocating/vibrating assembly 196. By so doing, scrubbing member 198 can use both a reciprocating motion and a vibrating motion to clean the windshield as scrubbing member 198 passes over the windshield.

Figure 21:
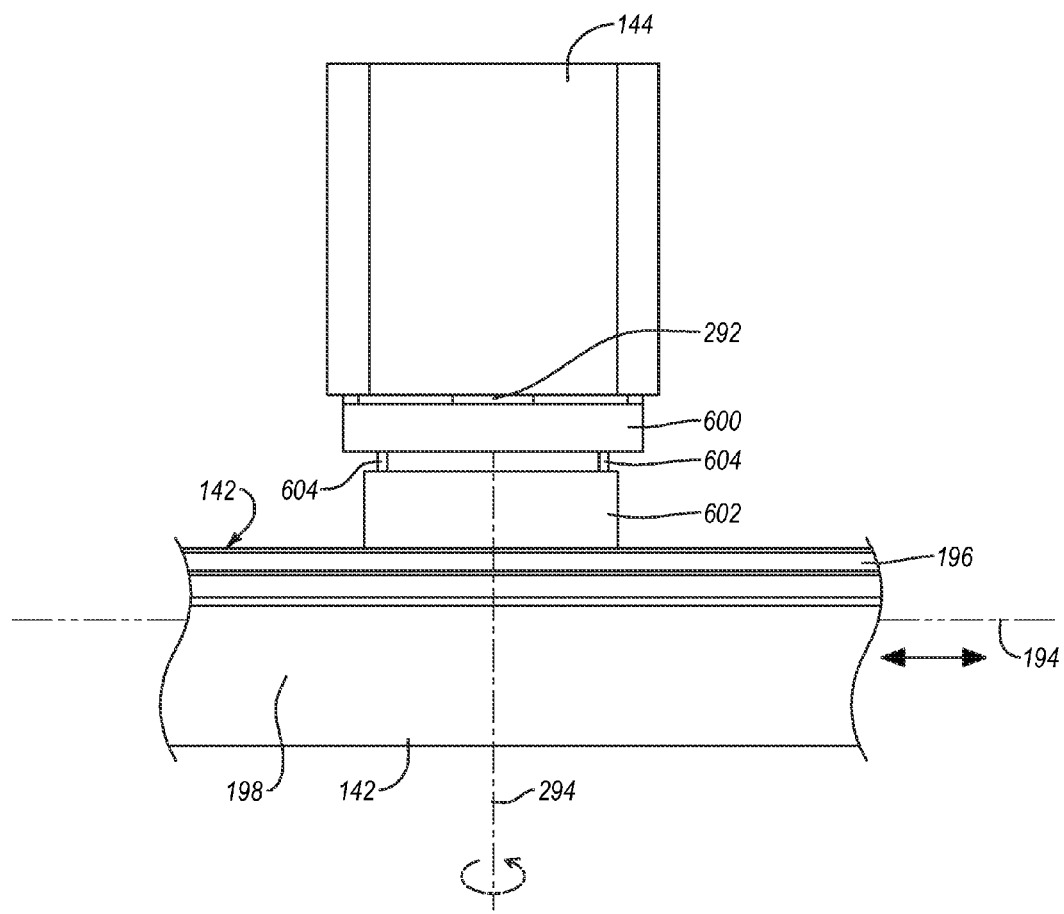
FIG. 21 is a front view of a portion of an alternative embodiment of a scrubber assembly that incorporates a rotating motor.

Other types of reciprocating and non-reciprocating embodiments can also be used. For example, FIG. 21 depicts an alternative embodiment in which a rotating assembly is used to help clean the windshield. In the depicted embodiment, a plate 590 is attached to the motor housing and a corresponding plate 592 is attached to reciprocating assembly 196. Plates 590 and 592 are generally aligned with each other and coupled by using flexible couplers 594 disposed about the periphery of the plates. Flexible couplers 594 can be comprised of rubber or other flexible materials. In addition, a weighted mass (not shown) is attached to motor shaft 292 so that the center of gravity of the mass is offset from the rotational axis 294 of shaft 292. Because of this, when motor 144 is energized and shaft 292 rotates, the offset weight of the mass causes motor 144 to slightly wobble in a generally circular fashion. This causes motor plate 590 to rotate by virtue of its attachment to motor 144, which in turn causes the scrubber assembly plate 592 to rotate in response. Thus, when motor 144 is energized, reciprocating assembly 196 rotates.

In some embodiments, motor 144 and actuator 550 are electrically connected to the battery of the automobile to which windshield wiper 100 is attached. In those embodiments, wires are strung from the battery or other electrical terminal on the automobile to motor 144 and actuator 550 through wiper arm 106. It is noted that all electrical wiring has been omitted from the drawings herein for clarity sake. In other embodiments, a power source other than the automobile battery can be used.

For example, in the embodiment shown in FIG. 17A, windshield wiper 100 further comprises a portable power source 394 that provides power to the motor 144 and/or actuator 550 through appropriate wiring or cabling. The portable power source 394 can comprise a battery pack 324 mounted to or integrally formed with the scrubber support structure 140. Battery pack 324 can be positioned anywhere on scrubber support structure 140 or wiper support structure 108. Battery pack 324 is configured to hold one or more batteries. Embodiments of the invention can be powered by conventional batteries, such as AAA, AA, C, D, or 9-volt batteries. Accordingly, any type of battery pack 324 that houses those types of batteries can be used. Furthermore, battery pack 324 can include 1 or more batteries connected in series or in parallel, as is known in the art. Other types of batteries, such as watch-type or other batteries and corresponding battery packs can also be used. In the depicted embodiment, the battery pack is integrally formed with scrubber support structure 140, although this is not required.

A number of different means are available to turn actuator 550 and motor 144 on and off so as to raise and lower scrubber assembly 102 and engage scrubber element 142. For example, one or more manual toggle switches, as are known in the art, can be electrically connected between battery pack 324 and actuator 550 and/or motor 144 to actuate the actuator and motor. The switches can be positioned on the dashboard or other locations on the inside of the automobile. In one embodiment, motor 144 automatically turns on when scrubber assembly 102 is in the lowered position. In that embodiment, only a single switch is required to move the scrubber element as engaging the motor is automatic.

The vehicle fluid line can also be configured to automatically dispense wiper fluid when the scrubber assembly is actuated. For example, in one embodiment, the washer fluid pump is automatically turned on when the scrubber assembly is lowered and automatically turns off when the scrubber assembly is raised. In another embodiment, a timer circuit can be employed to use less fluid. The washer fluid pump can still automatically turn on when the scrubber assembly is lowered, but the timer circuit can then turn off the washer fluid pump after a predetermined time. In testing, it was determined that running the washer fluid pump for as little as a couple of seconds provided enough washer fluid to clean the windshield, especially if the washer fluid line was adjacent the windshield and the scrubber member or within the scrubber member. Thus, as discussed above, the present invention can allow for much less washer fluid to be used.

Figure 22:
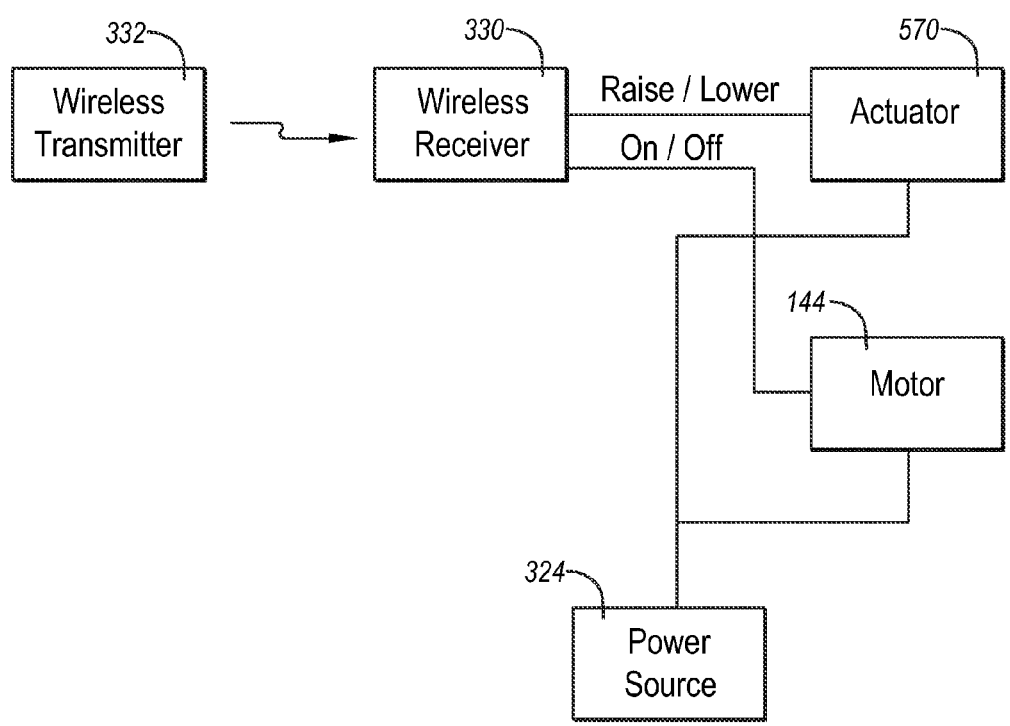
FIG. 22 is a schematic view of a remote apparatus for turning the actuator and scrubbing assembly motor on and off according to one embodiment.

In some embodiments, remote switches can be used in place of manual toggle switches. This allows actuator 550 and/or motor 144 to be actuated wirelessly. For example, FIG. 22 shows a system in which a remote motion actuated switch is used to and control the actuator and the motor. In the depicted embodiment, a wireless receiver 330, as is known in the art, is attached to scrubber support structure 140 or otherwise positioned on the vehicle and electrically connected to actuator 550. A corresponding wireless transmitter 332 is positioned within the automobile, either attached to the automobile, or freely movable therein. To conserve energy, actuator 550 can be set up so that no electrical signal is flowing therethrough, except when the scrubber element is being moved between the raised and lowered positions.

When the user desires to lower the scrubber element onto the windshield, a button on wireless transmitter 332 can be pushed or otherwise toggled, which causes wireless transmitter 332 to wirelessly send a "lower" command signal to wireless receiver 330. Wireless receiver 330 then actuates actuator 550, thereby causing the scrubber assembly to lower onto the windshield in the manner discussed above. Wireless receiver 330 also automatically actuates motor 144, thereby causing the scrubber element to reciprocally move, as discussed above.

When the user pushes or toggles the same or another button, wireless transmitter 332 can wirelessly sends a "raise" command signal to wireless receiver 330. Wireless receiver 330 then causes actuator 550 to raise the scrubber assembly off the windshield in the manner discussed above. Wireless receiver 330 also automatically causes motor 144 to disengage and the scrubber element stops reciprocating. If the vehicle fluid line is configured to dispense wiper fluid automatically, then the disengagement of motor 144 can also automatically cause the fluid line to stop dispensing wiper fluid.

Wireless transmitter 332 and receiver 330 can use a matching infrared, digital, analog, or other type of wireless link, as is known in the art. Additionally, the signal can be encoded or not, as is also known in the art. In one embodiment, transmitter 332 is incorporated into a fob or like device that the vehicle operator can carry with them when they are not in the vehicle. This can be especially useful when attempting to clean the window of snow and ice in the winter, as discussed below.

In alternative embodiments, actuator 550 and motor 144 can be automatically turned on and off so as to raise and lower scrubber assembly 102 and engage scrubber element 142. For example, in one embodiment actuator 550 and motor 144 can be automatically controlled to turn on and off by simply activating the washer fluid activator already positioned within the vehicle.

Figure 23:
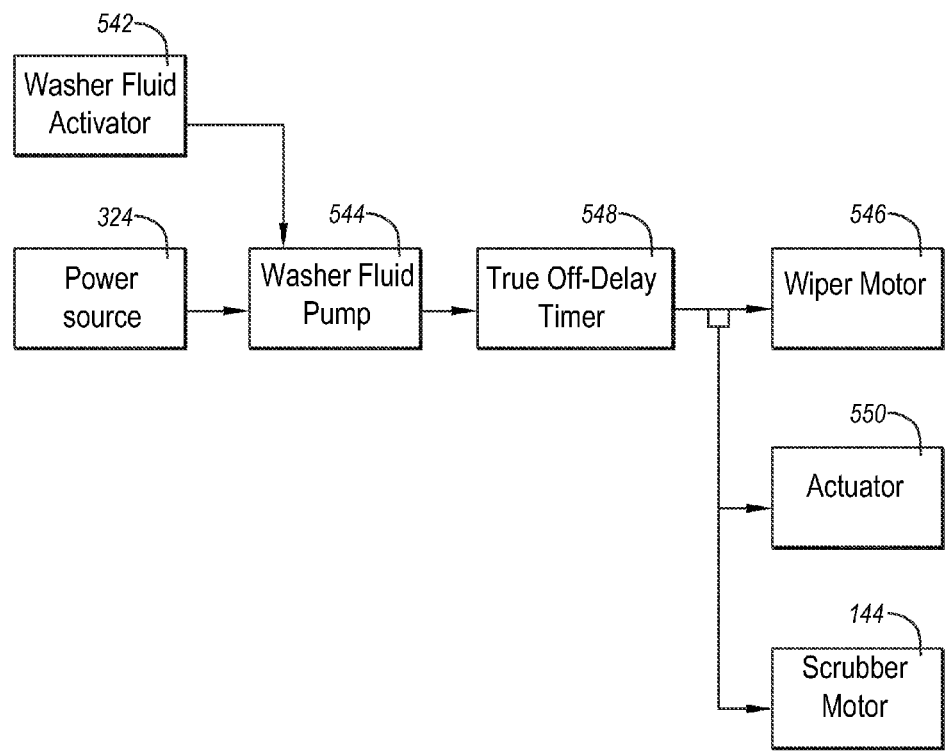
FIG. 23 is a schematic view showing how the actuator and scrubbing motor can be automatically turned on and off using a true-off delay timer according to one embodiment.

Turning to FIG. 23, in a typical automobile, when a driver engages a washer fluid activator 542 to clean the windshield, e.g., by rotating a lever or pushing a button, a washer fluid pump 544 is energized by receiving power from the power source 324 (i.e., the automobile battery), causing washer fluid to be sprayed onto the windshield. A wiper motor 546 is also automatically actuated to move the wipers across the windshield. When the driver un-engages the washer fluid activator 542, e.g., by discontinuing the rotation of the lever or the pushing of the button, washer fluid pump 544 is de-energized, thereby discontinuing the spray of washer fluid onto the windshield. However, the wipers continue to move across the windshield for a few cycles before stopping even after the washer fluid pump is de-energized. The actuation and delayed de-actuation of the wipers is typically controlled by a true off-delay timer 548 receiving its power from washer fluid pump 544.

When a true off-delay timer is energized, it immediately provides energy to the devices attached to it, thereby actuating the devices. When the true off-delay timer is de-energized, however, it continues to provide energy to the devices for a predetermined period of time before stopping. Thus, the true off-delay timer is used to delay the turning off of whatever devices are attached thereto.

As shown in FIG. 23, to automatically turn actuator 550 and scrubber motor 144 on and off, actuator 550 and scrubber motor 144 can be attached to true off-delay timer 548 already installed in the automobile. Actuator 550 and scrubber motor 144 can be attached to the true off-delay timer 548 in a number of ways. For example, a pass-through plug can be used that plugs into the output of true off-delay timer 548 so that wiper motor 546 can in turn plug into it. The pass-through plug is electrically coupled with the output of true off-delay timer 548 and with actuator 550 and scrubber motor 144 to provide the electrical connections therebetween. The pass-through plug also passes the electrical connection through between the true off-delay timer and the wiper motor.

As another example, the wires from actuator 550 and scrubber motor 144 can be spliced into the wires coupling true off-delay timer 548 with wiper motor 546. In another example, a wiring harness can be used that electrically couples true off-delay timer 548 to wiper motor 546, actuator 550, and scrubber motor 144.

Actuator 550 and scrubber motor 144 can be set to always be on when energized. For these embodiments, actuator 550 and scrubber motor 144 receive power and thus are "on" only when the wiper is actuated by spraying of the washer fluid. Thus, when the automobile driver engages washer fluid activator 542, the energizing of true off-delay timer 548 by washer fluid pump 544 causes not only wiper motor 546 to become energized, but also actuator 550 and scrubber motor 144, thereby lowering scrubber assembly 102 to the windshield and engaging scrubber element 142. When the automobile driver stops engaging washer fluid activator 542 and washer fluid pump 544 subsequently is de-activated, true off-delay timer 548 causes actuator 550 and scrubber motor 144 to remain energized with the wiper for the few cycles after deactivation of washer fluid pump 544. When scrubber motor 144 is de-energized, it simply stops working. When actuator 550 is de-energized, it can be configured to raise the scrubber assembly 102 from the windshield.

The predetermined period of time that true off-delay timer 548 remains energized after de-activation of the washer fluid pump is generally a few seconds, although other time periods are also possible. If a different period of time is desired, a separate true off-delay timer can be used so that wiper motor 546 can be controlled by a separate true off-delay timer than actuator 550 and scrubber motor 144.

Besides making the system automatically start and stop, using true off-delay timer 548 to actuate actuator 550 and scrubber motor 144 provides another benefit. In most cases, to most effectively scrub a windshield, the scrubber element should be damp. By tying the operation of the scrubber assembly to the washer fluid pump, the windshield will always be wetted when scrubber assembly is in use, thereby maximizing the scrubbing efficiency. Furthermore, for embodiments where the fluid line extends into the scrubbing element, the scrubbing element will already be moist by the time it is lowered onto the windshield and begins to be used.

A windshield wiper 100 according to the present invention can be used to replace a standard windshield wiper that is currently on a vehicle. To do this, the old windshield wiper can be removed from wiper arm 106 in the standard manner. The new windshield wiper 100 containing wiper assembly 104 and scrubber assembly 102 can then be installed using cylindrical cross member 410 as described above to attach windshield wiper 100 to wiper arm 106. If a washer fluid line is used, it can be attached to the vehicle's washer fluid pump or washer fluid line. Similarly, if vehicle power is used for wiper 100, the power cable can also be attached to the vehicle.

Once installed, windshield wiper 100 can be operated similar to a standard wiper. The vehicle operator uses the wiper controls to move the wiper back and forth across the windshield in the normal manner. When the scrubber assembly is in the raised position, the wiper works just like a standard wiper, cleaning the windshield with just the wiper blade.

When the operator desires to activate the scrubbing action of the scrubber member, the operator switches the system on by using a manual or electronic or wireless switch, as discussed above. Alternatively, as discussed above, windshield wiper 100 can be configured to operate automatically in conjunction with the cleaning cycle of the vehicle. That is, windshield wiper 100 can be configured to automatically operate when the washer fluid pump is actuated. Once the system is switched on, the servo is actuated, lowering the scrubber assembly to the windshield and thereby raising the wiper assembly with its corresponding squeegee blade off of the windshield. As noted above, this can automatically cause the scrubber motor to become energized, which causes the scrubbing member to reciprocally move as the scrubber assembly arcs across the windshield, thus providing the reciprocating scrubbing action.

When the user desires the scrubbing action to stop, the user simply switches the system off by using the same or a different manual or electronic or wireless switch. Alternatively, the system can be configured to automatically switch off, as discussed above. Switching the system off causes the servo to move the scrubber assembly to the raised position, thereby lowering the wiper assembly back onto the windshield. The motor is also de-energized, thus causing the scrubber member to stop reciprocating.

Figure 24:
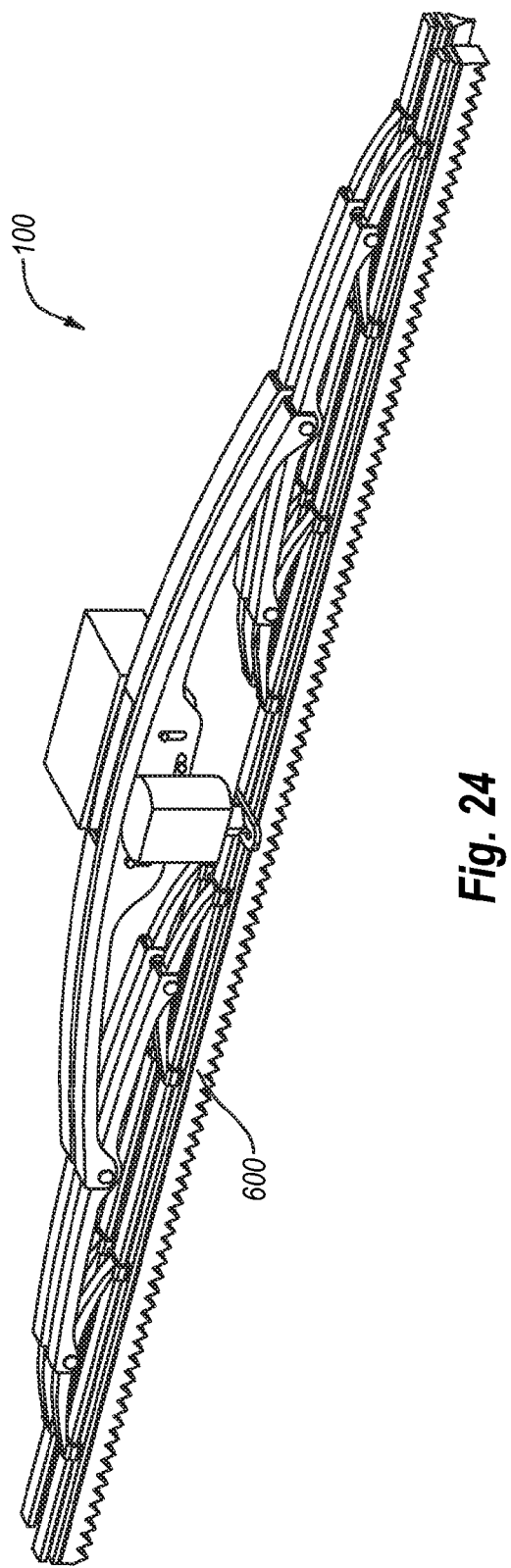
FIG. 24 is a front perspective view of a windshield wiper according to another embodiment of the present invention.
Figure 25:
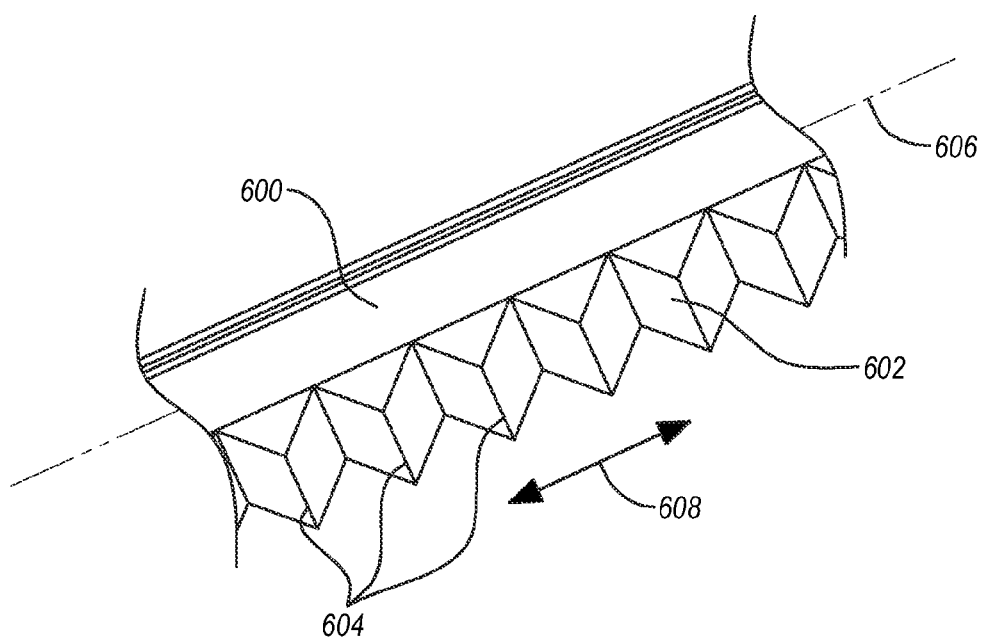
FIG. 25 is a bottom perspective view of a portion of a scrubber element that can be used to scrape ice off of a windshield.

Embodiments of the present invention can also be used for removing ice and snow from windshields. For example, FIG. 24 includes a scrubbing member 600 shaped so as to have a serrated edge. As particularly shown in FIG. 25, the scrubbing surface 602 of scrubbing member 600 has a plurality of ridges 604 that extend laterally across scrubbing member 600 so as to be substantially orthogonal to the longitudinal axis 606 of scrubbing member 600. As a result, when scrubbing member 600 is reciprocated in the direction denoted by arrow 608 as discussed above, ridges 604 move over the windshield in the direction of longitudinal axis 606. Because of this, each entire ridge 604 can contact ice or snow on the windshield to provide the maximum amount of pressure or force to remove the ice or snow. Other types of edge shapes can also be used. For example, instead of being orthogonal to longitudinal axis 606, ridges 604 can form an angle with longitudinal axis 606 so as to form a zig-zag shape. Other shapes are also possible.

Scrubbing member 600 can be made of the same types of materials discussed above with respect to scrubbing member 198. Alternatively, to better break apart ice, scrubbing member 600 can be comprised of a more rigid material, such as a polycarbonate or other polymeric compound. Other materials can also be used. So as to not damage the windshield, the material should have a lesser hardness value than glass, although this is not required. In one embodiment, scrubbing member 600 comprises a material that is softer than tempered glass according to the Rockwell Hardness Index.

Wiper 100 can be converted to or from an ice scraper by simply replacing the scrubber element, as discussed above. That is, by replacing scrubber element 198 with ice scraper scrubber element 600, wiper 100 can be used with ice. Replacing ice scraper scrubber element 600 with scrubber element 198 will convert wiper 100 back into a unit that can be used to remove bugs or other non-ice debris from the windshield.

One problem that can occur when using a windshield wiper in the winter is that the temperature can become cold enough that all or portions of the wiper can freeze. This can cause the wiper to miss portions of the windshield due to the differing windshield contours or to cause streaks to appear in the windshield as the wiper is used. Additionally, snow or ice can build up on the wiper blade in addition to the windshield, which can also cause streaks to appear in the windshield corresponding to the portions of the wiper blade that has the buildup. In many cases, the wiper blade can become stuck to the windshield due to ice buildup, especially after the vehicle has been sitting unused for a period of time, such as overnight.

In many cases, simply turning on motor 144 may alleviate many of these problems, even if scrubber assembly 102 is not lowered onto the windshield. This is because when energized, the reciprocating motion of motor 144 can cause wiper 100 to vibrate, thereby helping to remove much of the snow buildup on the wiper and possibly helping to thaw the wiper blade.

Figure 26:
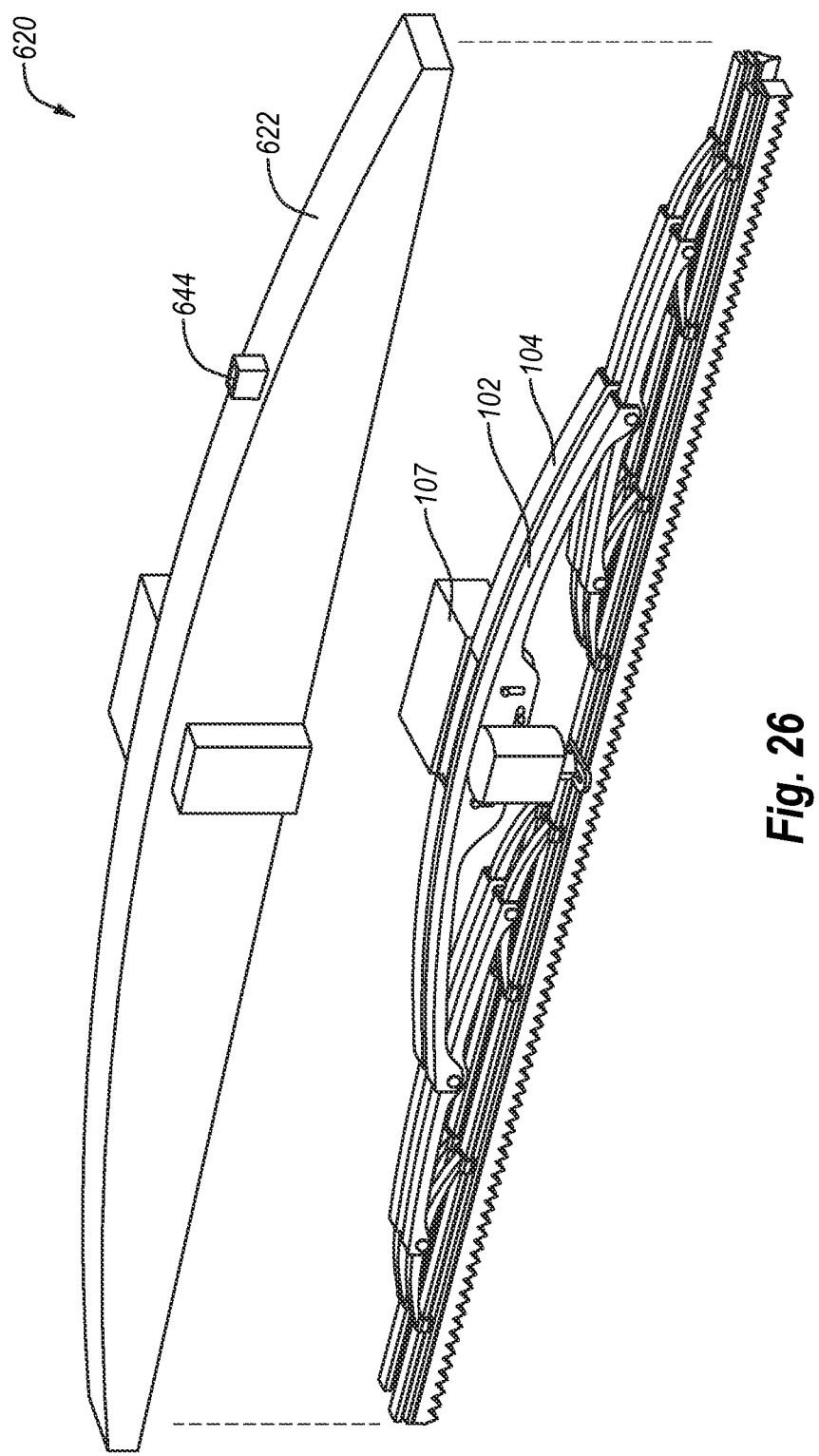
FIG. 26 is an exploded perspective view of a windshield wiper having a covering.
Figure 27:
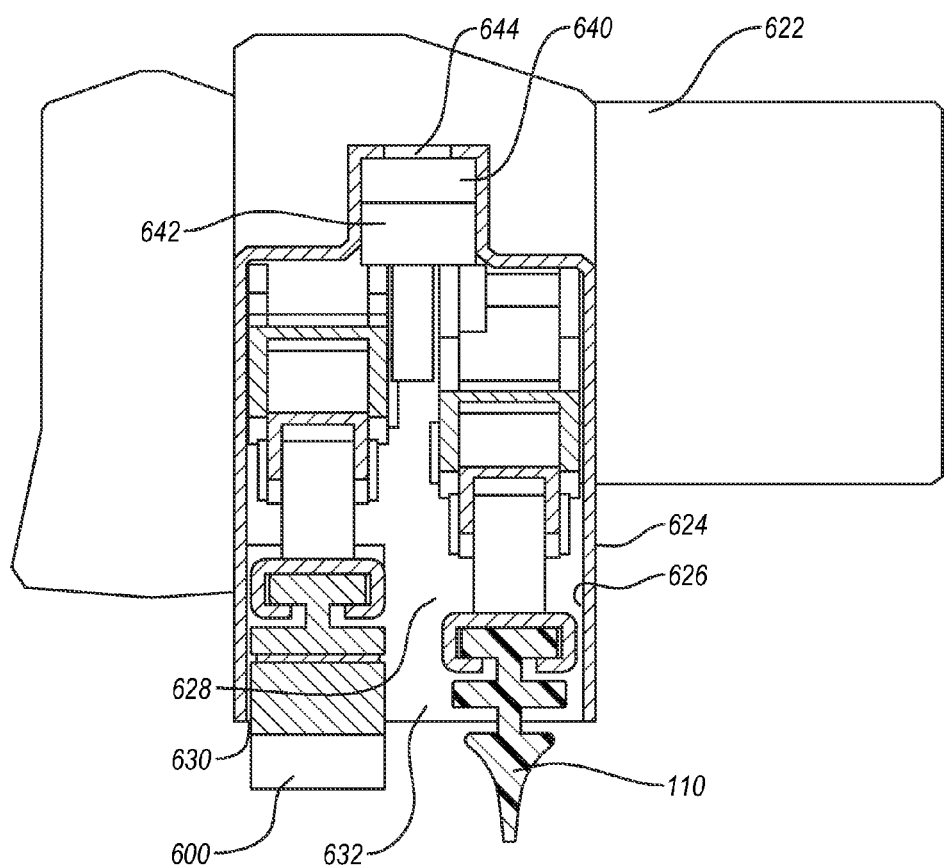
FIG. 27 is a cross sectional side view of the assembled windshield wiper of FIG. 26.

Additionally, embodiments of the present invention can include a covering. FIGS. 26 and 27 show an embodiment of a wiper 620 that includes a covering 622 disposed over wiper assembly 104, scrubber assembly 102, and engaging assembly 107. In essence, wiper 620 comprises wiper 100 received within covering 622. As particularly shown in FIG. 27, covering 622 includes an outside surface 624 and an opposing inside surface 626 that bounds a cavity 628 with a mouth 630 at an opening 632 that extends through mouth 630. Cavity 628 receives wiper 100 such that mouth 630 is positioned at the bottom portion of wiper 100. As such, wiper blade 110 and scrubbing member 600 can extend down through the opening 632 at the mouth 630. As a result, wiper blade 110 and scrubbing member 600 can contact the windshield through the mouth 630 of covering 622.

As noted above, covering 622 is configured to receive wiper 100. As such, covering 622 can be flexible and resilient to be able to take the shape of wiper 100 when wiper 100 is positioned therein. Alternatively, covering 622 can be substantially rigid and molded so as to match the general shape of wiper 100. In some embodiments, wiper 100 and covering 622 are molded together. Regardless, covering 622 allows scrubber assembly 102 to move between the raised position shown in FIG. 27 and the lowered position. Covering 622 also allows scrubbing member 600 to be reciprocally moved, as discussed above. This can be accomplished by allowing covering 622 to have a sufficient flexibility or by having the inside surface 626 of covering 622 be contoured such that the above movements can take place, especially if covering 622 is substantially rigid.

Covering 622 can be comprised of a rubber, polymeric, or other material that is waterproof and will keep the upper portions of wiper 100 free from snow and ice. Mouth 630 of covering 622 can be positioned at any distance above windshield that will allow wiper blade 110 and scrubbing member 600 to respectively contact the windshield when positioned thereat. In some embodiments, mouth 630 can be positioned between about 3 mm to about 30 mm above the windshield during use, with about 5 mm to about 10 mm being common. Other distances above the windshield are also possible.

To further aid in cold weather, a heater can be included in the wiper assembly to thaw the wiper components and thaw or melt the ice and snow on the windshield. For example, as shown in FIG. 27, a heater 640, such as a heating element or the like, can be disposed within covering 622 to heat the wiper assembly. The heater 640 can be attached to or molded into covering 622 or attached to wiper 100. Heater 640 only needs to provide a small amount of heat to thaw or melt. In some embodiments, heater 640 consumes less than about 100 watts. In other embodiments, heater 640 consumes between 50 and 200 Watts. Other power consumption values are also possible for heater 640. Heater 640 can be configured to be energized all the time or to only be energized when needed, as discussed below.

To allow for circulation of the heat generated by heater 640, a small fan 642 can also be included. The fan 642 can be positioned anywhere within covering 622, but is most likely to be positioned near heater 640, as in the depicted embodiment. When fan 642 is energized, the heat from heater 640 is circulated through cavity 628 to provide heat to a larger portion of the wiper. Similar to heater 640, fan 642 does not require much power. For example, fan 642 can also consume as little as a few watts of power. In some embodiments, fan 642 consumes less than about 100 watts. Other power consumption values are also possible for fan 642. In some embodiments, heater 640 and fan 642 combined consume less than 100 watts.

In this closed system, fan 642 can cause the heated air to circulate and remain within cavity 628 to provide heat to wiper 100 and the windshield and to keep the heated air therein. To aid in this, fan 642 and heater 640 can be positioned at or near the midpoint of wiper 100. The circulated heat helps to thaw any frozen surfaces of the wiper assembly and thaw and/or melt any ice or snow on wiper blade 110 or scrubbing member 600 due to very cold weather.

To increase circulation of the heat, an opening can be included in the covering. For example, the depicted embodiment includes a small aperture 644 formed on the top portion of covering 622 that extends all the way through covering 622 between the outside and inside surfaces 624 and 626. In some embodiments, fan 642 and heater 640 can be positioned within covering 622 at or near the site of aperture 644. In those embodiments, when fan 642 and heater 640 are energized, fan 642 can draw outside air into covering 622 through aperture 644. The air can be heated by heater 640 and moved through cavity 628 of covering 622 until the heated air exits through mouth 630. While drawing outside air into cavity 628 causes positive pressure to better move the heated air, having a closed system allows the system to heat up faster.

As noted above, in many cases the wiper blade can become stuck to the windshield due to ice buildup when the vehicle has been sitting unused for a period of time. This can be quite problematic. For one thing, when stuck to the windshield, the wiper will not move and therefore will not clear the windshield. Even worse, in some cases when the user attempts to use the wiper, the wiper arm will move, but the blade will tear and come off the wiper arm, rendering the wiper useless until a new blade can be procured.

Because of these problems, a vehicle operator will often start the vehicle, turn on the heater to heat the windshield, and then let the vehicle idle for a period of time (often 15-20 minutes or longer). This thaws the windshield and melts the ice to allow the wiper to work. However, it also wastes fuel and allows carbon dioxide and other harmful gases to be spewed into the air while the vehicle is essentially sitting still. Using embodiments of the present invention can allow the wiper to quickly become usable without causing the problems discussed above.

In contrast, using heater 640 of the present invention is a relatively fast way to free the system from the windshield in this scenario. Heater 640 can quickly thaw the wiper and melt the ice around the wiper blade so that the windshield wiper can again be used. For especially cold or thick ice, motor 144 can also be activated; the combination of the vibration and the heat should remove most ice or snow buildup on the wiper.

Figure 28:
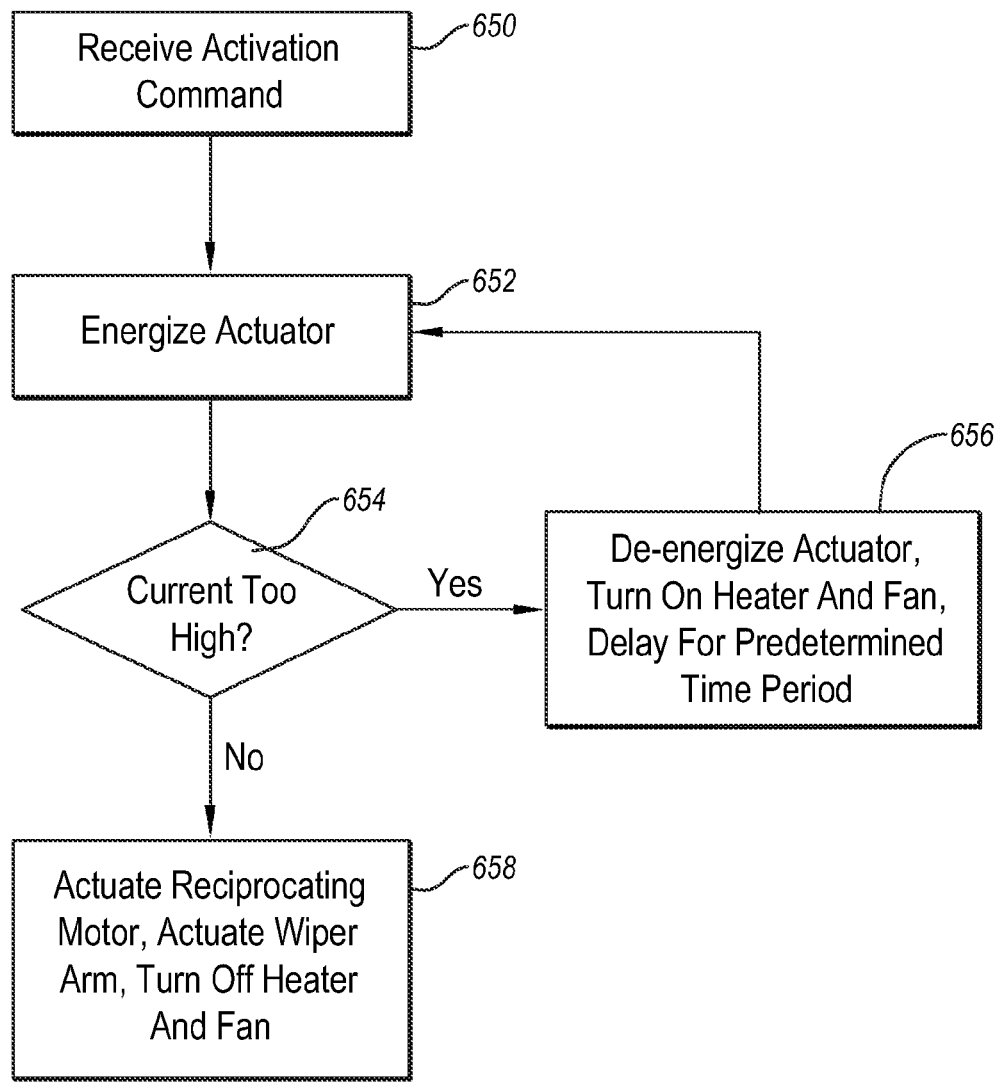
FIG. 28 is a flow chart showing a method of removing ice and snow with the windshield wiper shown in FIG. 26.

With reference to FIG. 28, one method of removing ice and snow using a control circuit is now given. The control circuit can comprise computerized components if desired. For example, the control circuit can include a controller, firmware, memory, and other electronic components, as is known in the art. Alternatively, the control circuit can be a state machine, as is known in the art, or a combination of computerized components and state machine components. Other control circuit components can also be used.

As a general rule, during normal use of the windshield wiper, the scrubber assembly will typically be in the raised state and the wiper assembly in the lowered state such that the wiper blade is contacting the windshield. In step 650, the control circuit receives a command to activate the system. The command can be sent remotely by the operator, as discussed above. As such, the operator can send the command to a cold vehicle from inside the warmth of a house, office, or other building, for example. A fob, such as is known in the art for locking and unlocking a vehicle, can be used as the remote device. The command can also be triggered by a timing device or any other manner.

In step 652, upon receiving the activation command, the control circuit energizes the actuator to attempt to raise the wiper assembly with respect to the scrubber assembly so the scrubber assembly will contact the windshield. Another way to look at it is that the control circuit attempts to lower the scrubber assembly with respect to the wiper assembly.

While energizing the actuator, the control circuit monitors the amount of current being drawn by the actuator to determine if the current rises and remains above a predetermined level, as shown in Step 654. If the actuator cannot lower the scrubber assembly or raise the wiper assembly, the current will spike due to overexertion of the actuator. This will occur if the wiper blade is stuck to the windshield; that is, because the wiper blade is stuck to the windshield, the wiper assembly cannot be raised and the scrubber assembly cannot be lowered by the actuator. This can also occur if the gearing for the lift system is frozen. If the current were to remain at the elevated level, the actuator would likely eventually burn out and/or the wiper blade would eventually be damaged or torn. Other damage is also possible.

Therefore, as shown in step 656, if the current remains above the predetermined level, the control circuit turns off the power to the actuator so that the actuator will not burn out and so that damage will not occur to the wiper blade. The control circuit can also turn on the heater and fan so that heated air will circulate through the cavity and across the wiper blade to thaw the ice that is on and adjacent to the wiper blade. If desired, the control circuit can also energize the scrubber motor even though the scrubber assembly is not lowered. This will vibrate the wiper.

After a predetermined period of time, such as, e.g., thirty seconds or a minute, the control circuit returns to step 652 and again energizes the actuator. Other predetermined periods of time can also be used. The cycling process between steps 652 and 656 can continue until the control circuit determines in step 654 that the current level remains below the predetermined amount when the actuator has been energized, indicating that the actuator was successful in raising the wiper assembly and lowering the scrubber assembly to the windshield.

With the scrubber assembly in the lowered position (i.e., when it has been determined that the power has not spiked), the control circuit continues with the removal of ice and snow from the windshield, as shown in step 658. The control circuit actuates the motor to begin reciprocating the ice-breaking scrubber element and actuates the wiper arm motor to cause the wiper to move in its normal arc across the windshield. If desired, the heating element and fan can be turned off, although in some embodiments, the heat may still be desired within the cavity, and those devices can remain on.

In some embodiments, the heating element and/or fan are automatically turned on whenever the wiper is actuated and can remain on for the entire time that the wiper is used. In other embodiments, the heating element and/or fan can be configured to be on only when the scrubber assembly is in the lowered position. In still other embodiments, the heating element and/or fan can be configured to be on only when the scrubber assembly is in the raised position. Other configurations for the heating element and fan usage can also be used.

The above method yields many benefits. For example, as noted above, the wiper can be activated remotely while the operator is still within a warm environment. Furthermore, the ice and snow can be removed from the windshield quickly and efficiently. Finally, the vehicle does not waste gas and further harm the environment with harmful emission gases because the vehicle does not need to be started during the ice removal process. Another benefit is that the operator can easily tell when the vehicle is ready because the windshield becomes free of ice and snow and the wiper begins moving across the windshield.

Sometimes during use, ice and/or slush may build up on the wiper, even after the windshield has been cleared of ice and snow by the scrubbing element. This often occurs, e.g., when it is snowing during use of the vehicle, even when the windshield is warm. In one embodiment, the motor can be actuated when the scrubbing element is or is not contacting the window to help remove the ice and/or slush from the wiper, as noted above. Vibrations from the motor can help to loosen the ice and slush so they will more easily fall off of the wiper, even when the scrubbing element is not contacting the windshield. In embodiments that include a covering, the vibrating waves can be amplified in the corresponding wiper and/or the heater can be activated.

In all of the embodiments discussed above, mounting brackets have been used to attach the wiper blade and scrubber element directly to the secondary cross arms. However, conventional supports tend to not provide an even force against the windshield along the entire wiper. Especially when the wiper is moving over windshields whose contours change as the wiper moves. To remedy this problem, adapters can be used in embodiments of the present invention to help the wiper blade and/or the scrubber element better contact the windshield.

Figure 29A:
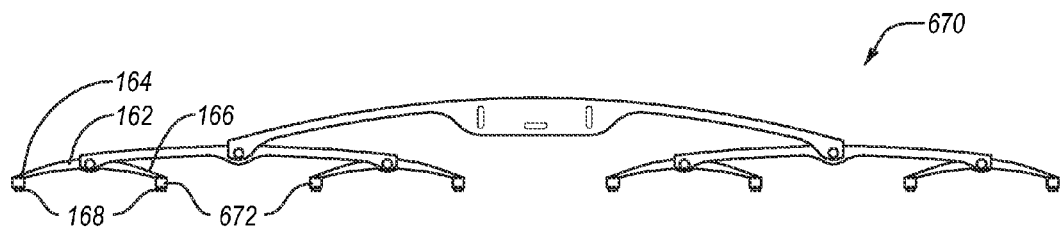
FIG. 29A is a front view of a scrubber support structure according to another embodiment.

For example, FIG. 29A shows an embodiment of a scrubber support structure 670 in which adapters 672 are positioned between mounting brackets 168 and secondary cross arms 162. That is, each mounting bracket 168 is attached to or formed with an adapter 672, which is attached to or formed with one of the ends 164, 166 of the secondary cross arms 162.

Figure 29B:
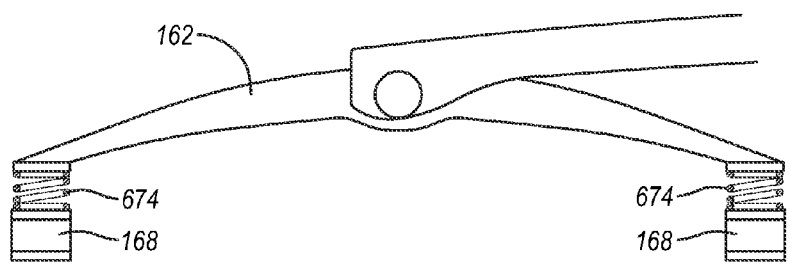
FIGS. 29B-29D are front views of a portion of the scrubber support structure shown in FIG. 29A showing various alternative scrubbing element mounting adapters.

Adapters 672 can be comprised of various materials and can take various forms. For example, FIG. 29B shows an embodiment having adapters 672 that are each comprised of a small coiled spring 674. Each spring 674 can provide a small force acting to push the scrubber element onto the windshield, yet has some give in it to allow for windshield contour differences between adjacent springs. In one embodiment, springs 674 can be selected so that the amount of force associated with each spring can be different than one another. In one embodiment one or more of the springs 674 are individually adjustable so that the amount of force for each spring can be varied. This embodiment can be used for many different vehicles; each spring 674 can be adjusted to match the unique contours of the windshield for the particular vehicle. A flat or other type of spring can alternatively be used. Springs can be of any size and type desired.

Figure 29C:
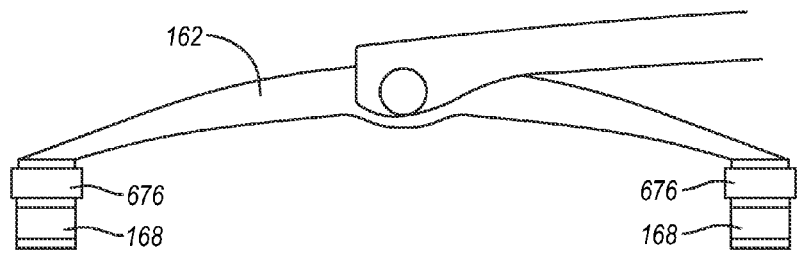

FIG. 29C shows an embodiment having adapters 672 that are each comprised of a flexible pad 676. Similar to the springs 674, each pad 676 can provide a small force to the scrubber element yet also allow some give. In addition, pads 676 can also allow for some lateral movement of the scrubber element. This can be useful when using a rotating assembly, such as rotating assembly 196 shown in FIG. 21. Flexible pads 676 can be made of rubber, a rubber compound, or any other compressible material. Flexible pads 676 can be of any thickness desired. Different thicknesses of pads can be used at different positions to customize the force to match the particular windshield.

Figure 29D:
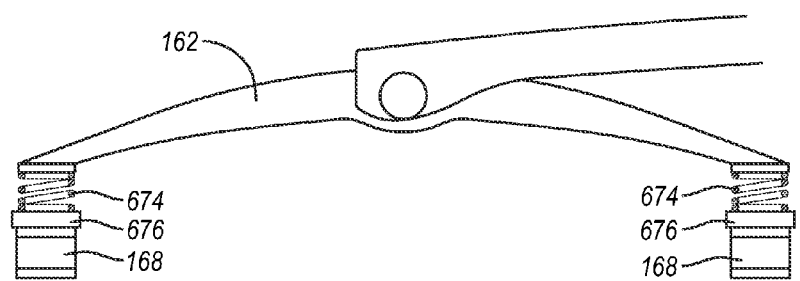

FIG. 29D shows an embodiment having adapters 672 that are each comprised of a combination of spring 674 and flexible pad 676. This combination can give a combination of the benefits of each component. Other types of adapters are also possible. Although the above discussion is related to using adapters 672 with scrubber support structure 670, it is appreciated that adapters 672 can also be used with wiper support structures. That is, adapters 672 can also be used to provide the desired forces to wiper blade 110. Furthermore, any other portion of the wiper support structure 108 or scrubber support structure 140 can also use adapters. For example, spring steel or the like can be used for any of the arms on wiper support structure 108 or scrubber support structure 140.

Figure 30:
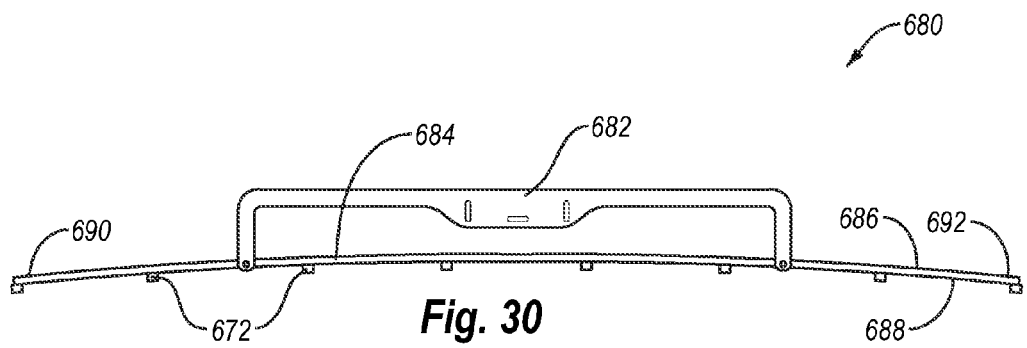
FIG. 30 is a front view of a scrubber support assembly according to another embodiment.

In some embodiments, adapters can provide enough support and force to scrubber support element and/or wiper element to be able to omit one or more cross arms. For example, FIG. 30 shows an embodiment of a scrubber support structure 680 in which the primary and secondary cross arms have been omitted. Instead, scrubber support structure 680 includes a main cross arm 682 and a single primary cross arm 684 attached thereto. Main cross arm 682 can be similar to main cross arm 146, although this is not required. Primary cross arm 684 has a top surface 686 and an opposing bottom surface 688 that span the length of scrubber support structure 680 from a first end 690 to a second end 692. Bottom surface 688 of primary cross arm 684 is configured to face the windshield. Bottom surface 688 can be substantially flat between first and second ends 690 and 692 or have a concave shape, as in the depicted embodiment. Other shapes can alternatively be used.

A plurality of adapters 672, such as those discussed above, are attached to the bottom surface 688 of primary cross arm 684. Adapters 672 are spaced substantially evenly along primary cross arm 684, although that is not required. Although not shown, the scrubber element can mount directly to adapters 672 or to a mounting bracket attached to the adapters, as discussed above. During use, the combination of the curvature of primary cross arm 684 and the force of adapters 672 causes the scrubber element to contact the windshield across the entire width of the scrubber element. In one embodiment, adapters 672 have differing force values, as discussed above. In one embodiment, the force values of one or more of the adapters 672 are adjustable.

Figure 31:
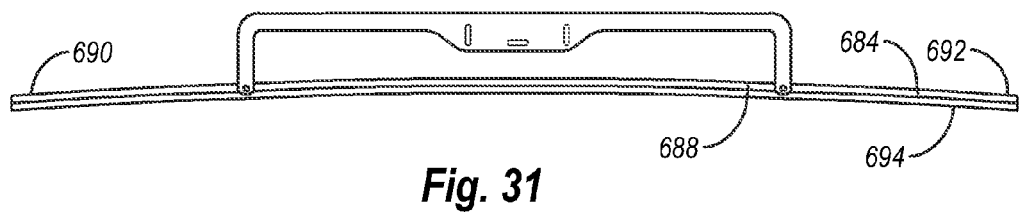
FIG. 31 is a front view of a scrubber support assembly according to another embodiment.

In one embodiment, the scrubber element is attached to primary cross arm 684 without the use of any adapters. For example, FIG. 31 shows an embodiment of a scrubber element 694 that is glued or otherwise attached directly to bottom surface 688 of primary cross arm 684. In this embodiment, primary cross arm 684 is comprised of a thin piece of flexible, resilient, spring steel that is concave between first and second ends 690 and 692. Other materials can also be used for primary cross arm.

Figure 32A:
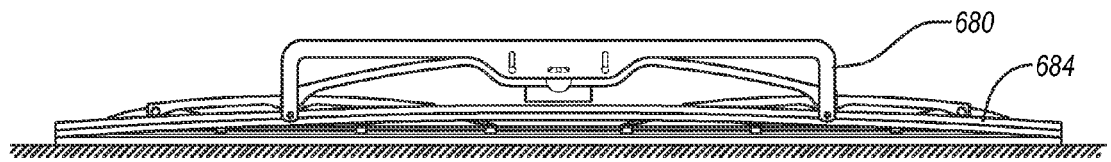
FIGS. 32A and 32B are front views of a windshield wiper that incorporates the scrubber support assembly shown in FIG. 31, showing the scrubber support assembly in the raised and lowered positions, respectively.
Figure 32B:
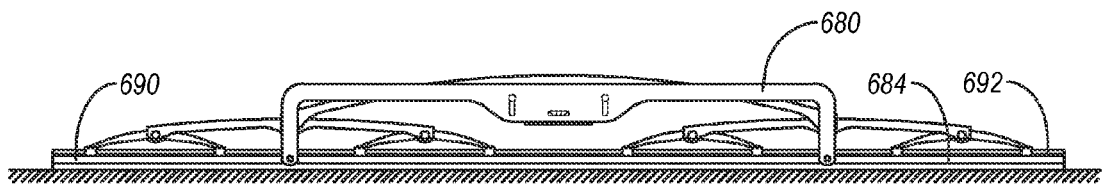

Turning to FIG. 32A, when scrubber support structure 680 is in the raised position, primary cross arm 684 is above the windshield and in the concave position shown in FIG. 31. When the servo is actuated and scrubber support structure 680 is moved to the lowered position as discussed above, primary cross arm 684 contacts the windshield and flattens out due to the force exerted by the ends 690 and 692 of primary cross arm 684 against the windshield, as shown in FIG. 32B. Because of the initial concave shape of primary cross arm 684, the force exerted by primary cross arm 684 at the ends 690 and 692 thereof is greater than at the center portion thereof. As such, scrubber element 694 can have a greater cleaning force at the ends 690 and 692 thereof to, e.g., compensate for the lack of direct support in the ends of the scrubber element. When the scrubber support structure 680 is moved back to the raised position, primary cross arm 684 can return to the concave shape shown in FIG. 32A due to the resiliency of primary cross arm 684.

Although the most obvious application of the windshield wiper and scrubber assemblies described herein is the personal automobile, other applications are also available. For example, the windshield wiper and scrubber assemblies described herein can also be used in commercial vehicles, such as trucking, construction, and farm vehicles; military and other government vehicles; aviation vehicles, such as commercial and private aircraft and support vehicles; trains; boats; and any other vehicle which incorporates a wiper to clean a windshield through which an operator or passenger views. Other uses may also be possible.

The invention as described herein provides many benefits to a vehicle operator. Embodiments of the windshield wiper as described herein can easily replace an existing windshield wiper on the vehicle or the scrubber assembly can simply be added to the existing windshield wiper with minimum installation effort. Little, if any, electrical wiring changes are needed and the scrubbing mechanism of the inventive wiper can be activated simply by motion of the windshield wiper. The scrubbing member is easily replaceable, as are the batteries needed to operate the motor.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An automated method of using a windshield wiper on a windshield, the windshield wiper having a wiper assembly and a scrubber assembly, the method comprising:
   in response to activation of a washer fluid activator:
   lowering the scrubber assembly of the windshield wiper to the windshield and raising the wiper assembly of the windshield wiper off the windshield, the scrubber assembly comprising a scrubber support structure and an elongated scrubber element movably attached to the scrubber support structure, the scrubber element having a central longitudinal axis extending in the elongate direction between a first end and a spaced apart second end;
   reciprocating the elongated scrubber element of the scrubber assembly back and forth along the central longitudinal axis; and
   while reciprocating the elongated scrubber element, moving the windshield wiper across the windshield along a prescribed arcuate path such that the reciprocating motion of the scrubber element is generally parallel to the windshield and generally perpendicular to the prescribed arcuate path as the windshield wiper moves across the windshield, the acts of lowering, reciprocating, and moving being automatically performed for a predetermined period of time.

2. The method recited in claim 1, wherein the predetermined period of time is controlled by a true off-delay timer.

3. The method recited in claim 1, further comprising, after the predetermined period of time, raising the scrubber assembly off the windshield and lowering the wiper assembly to the windshield.

4. The method recited in claim 1, wherein the wiper assembly comprises:
   a wiper support structure; and
   a wiper blade attached to the wiper support structure.

5. The method recited in claim 4, wherein the scrubber assembly further comprises a motor mounted to the scrubber support structure, the motor engaging with the scrubber element to reciprocate the scrubber element along the central longitudinal axis.

6. The method recited in claim 5, wherein raising and lowering the scrubber assembly to the windshield are performed by an engaging assembly coupled with the wiper assembly and the scrubber assembly.

7. The method recited in claim 6, wherein the engaging assembly comprises:
   an actuator attached to the wiper support structure or the scrubber support structure; and
   linkages coupling the wiper support structure to the scrubber support structure.

8. The method recited in claim 7, wherein the actuator comprises a servo rotationally coupled with a crank.

9. The method recited in claim 7, wherein the actuator comprises a motor coupled with a plurality of rack and pinion gear assemblies.

10. The method recited in claim 7, wherein the linkages comprise a plurality of connecting pins.

11. The method recited in claim 7, wherein rotational motion by the actuator causes the scrubber assembly to be raised and lowered linearly with respect to the windshield.

12. The method recited in claim 7, wherein the actuator comprises a rotatable crank having a crank pin and the linkages comprise a plurality of connecting pins, the crank pin being slidably positioned in an elongate first slot in the scrubber support structure that is substantially parallel to the longitudinal axis and the connecting pins being positioned in elongate second slots in the scrubber support structure that are substantially orthogonal to the longitudinal axis such that rotation of the crank causes the crank pin to move along the first slot and the connecting pins to move along the second slots.

13. The method recited in claim 10, wherein the connecting pins are slidably disposed within slots in the scrubber support structure.

14. An automated method of using a windshield wiper on a windshield, the windshield wiper having a wiper assembly and a scrubber assembly, the method comprising:
   in response to activation of a washer fluid activator:
   lowering the scrubber assembly of the windshield wiper to the windshield and raising the wiper assembly of the windshield wiper off the windshield, the scrubber assembly comprising a scrubber support structure and an elongated scrubber element movably attached to the scrubber support structure, the scrubber element having a central longitudinal axis extending in the elongate direction between a first end and a spaced apart second end;
   moving the windshield wiper across the windshield along a prescribed arcuate path; and
   reciprocating the elongated scrubber element back and forth along the central longitudinal axis while moving the windshield wiper across the windshield along the prescribed arcuate path, such that the central longitudinal axis remains generally parallel to the windshield and generally perpendicular to the prescribed arcuate path as the windshield wiper moves across the windshield.

15. The method recited in claim 14, wherein the acts of lowering the scrubber assembly to the windshield, moving the windshield wiper across the windshield, and reciprocating the elongated scrubber element are performed for a predetermined period of time, and the method further comprises after the predetermined period of time, raising the scrubber assembly of the windshield wiper off the windshield and lowering the wiper assembly of the windshield wiper to the windshield.

* * * * *